(12) United States Patent
Baum

(10) Patent No.: US 11,868,913 B2
(45) Date of Patent: *Jan. 9, 2024

(54) SYSTEM, APPARATUS AND METHOD FOR SUPPORTING FORMAL VERIFICATION OF INFORMAL INFERENCE ON A COMPUTER

(71) Applicant: Eric Burton Baum, Princeton, NJ (US)

(72) Inventor: Eric Burton Baum, Princeton, NJ (US)

(*) Notice: Subject to any disclaimer, the term of this patent is extended or adjusted under 35 U.S.C. 154(b) by 171 days.

This patent is subject to a terminal disclaimer.

(21) Appl. No.: 17/493,990

(22) Filed: Oct. 5, 2021

(65) Prior Publication Data

US 2022/0027771 A1 Jan. 27, 2022

Related U.S. Application Data

(63) Continuation of application No. 16/020,162, filed on Jun. 27, 2018, now Pat. No. 11,170,312, which is a
(Continued)

(51) Int. Cl.
*G06N 5/04* (2023.01)
*G06N 5/048* (2023.01)
(Continued)

(52) U.S. Cl.
CPC ............ *G06N 5/048* (2013.01); *G06N 5/022* (2013.01); *G06N 7/01* (2023.01); *G06Q 10/101* (2013.01)

(58) Field of Classification Search
CPC .......... G06N 5/02; G06N 5/025; G06N 5/048; G06N 7/02; G06N 5/022; G06N 5/006;
(Continued)

(56) References Cited

U.S. PATENT DOCUMENTS 6,105,018 A * 8/2000 Demers ............ G06F 17/30312
7,739,671 B1 6/2010 Hinchey et al.
(Continued)

FOREIGN PATENT DOCUMENTS

EP 1081593 A2 3/2001

OTHER PUBLICATIONS

"Vaccine Safety: Examine the Evidence," American Academy of Pediatrics Apr. 2013.
(Continued)

*Primary Examiner* — Dave Misir
(74) *Attorney, Agent, or Firm* — Lerner David LLP

(57) ABSTRACT

System, apparatus and method may permit users to collaboratively engage in inference on a computer and visualize structure of that inference, and provide a formal verification system for informal argumentation and inference. The system and method may generate and allow for modification of graphical structures that represent sequences of structured rational argumentation; and automatically monitor, compute and represent ratings or scores of nodes within the structure; indicate whether a node is supported by a chain of argumentation that has not been validly rebutted. The graphical structures may be displayed to bring into focus contentious and significant underlying points within an argument, and simulate the effects of alternative resolutions of these contentious points. The graphical displays may provide a transparent verification to other users of the state of what can be demonstrated and refuted, allow discovery of weak or missing points in a logical argument, and allow rational inference by users.

18 Claims, 27 Drawing Sheets

Related U.S. Application Data continuation of application No. 14/738,199, filed on Jun. 12, 2015, now Pat. No. 10,043,134.

(60) Provisional application No. 62/081,823, filed on Nov. 19, 2014, provisional application No. 62/034,574, filed on Aug. 7, 2014, provisional application No. 62/012,682, filed on Jun. 16, 2014.

(51) Int. Cl.
*G06N 5/022* (2023.01)
*G06Q 10/101* (2023.01)
*G06N 7/01* (2023.01)

(58) Field of Classification Search
CPC ... G06N 7/005; G06F 17/30958; G06F 3/048; G06F 9/44; G06F 9/45; G06Q 50/18; G06Q 10/101
USPC .................................. 706/46–47, 56, 52, 60
See application file for complete search history.

(56) References Cited

U.S. PATENT DOCUMENTS

| | | | |
|---|---|---|---|
| 8,438,229 B2 | 5/2013 | Razdow | |
| 2005/0108036 A1 | 5/2005 | Andreoli et al. | |
| 2005/0203924 A1* | 9/2005 | Rosenberg | G06F 17/30696 |
| 2007/0005520 A1* | 1/2007 | Eick | G06N 7/005 |
| | | | 706/12 |
| 2008/0222279 A1 | 9/2008 | Cioffi et al. | |
| 2009/0144302 A1 | 6/2009 | Baldwin | |
| 2009/0228478 A1* | 9/2009 | Steichen | G06Q 99/00 |
| 2009/0248601 A1* | 10/2009 | Bar-Ilan | G06F 17/10 |
| | | | 706/46 |
| 2010/0217717 A1* | 8/2010 | Overby | G06Q 10/00 |
| | | | 705/311 |
| 2011/0140360 A1* | 6/2011 | Golie | A63F 3/04 |
| | | | 273/292 |
| 2011/0320374 A1 | 12/2011 | Wang et al. | |
| 2014/0108321 A1 | 4/2014 | Buchanan et al. | |
| 2015/0100520 A1* | 4/2015 | McDonald | G06N 5/02 |
| | | | 706/11 |
| 2015/0220580 A1* | 8/2015 | Pitsos | G06F 17/30705 |
| | | | 707/690 |
| 2015/0229698 A1* | 8/2015 | Swan | G06Q 10/101 |
| | | | 709/203 |
| 2016/0148159 A1* | 5/2016 | Coffing | G06Q 10/10 |
| | | | 705/301 |

OTHER PUBLICATIONS

Aspinall, David, "Proof General: A Generic Tool for Proof Development," Oct. 1999, http://222.dcs.ed.ac.uk/home/da.

Biemann, Chris, "Chinese Whispers—an Efficient Graph Clustering Algorithm and its Application to Natural Language Processing Problems," Proceedings of the First Workshop on Graph Based Methods for Natural Language Processing, Jun. 9, 2006, pp. 73-80, Association for Computational Linguistics.

Brin, David, "Disputation Arenas: Harnessing Conflict and Competitiveness for Society's Benefit," (2000).

Examination Report No. 3 for Standard Patent Application 2015277503 dated Apr. 13, 2018.

Extended European Search Report and Written Opinion for EP 15810342.4 dated Apr. 6, 2018.

International Search Report and Written Opinion for Application No. PCT/US2015/035641 dated Sep. 11, 2015.

Keen, Steve, Debunking Economics, Zed Books (2011).

Klein, Mark, "How to Harvest Collective Wisdom on Complex Problems: An Introduction to the MIT Deliberatorium," MIT Center for Collective Intelligence Feb. 25, 2008.

Nastase, Vivi et al., "A survey of graphs in natural language processing," Natural Lanuguage Engineering, vol. 21, No. 5, pp. 665-698 (Cambridge University Press).

New Zealand First Examination Report for Application No. 727504, dated Jun. 21, 2017.

Rushby J. M., et al. A Less Elementary Tutorial for the PVS Specification and Verification System, Technical Report CSL-95-10, Aug. 22, 1996.

Rushby, John, "The Ontological Argument in PVS," Computer Science Laboratory CAV Workshop Fun with Formal Methods, Jul. 13, 2013.

Tews, Hendrick, "Proof Tree Visualization for Proof General" http://askra.de/software/prooftree/ Aug. 2011.

The Coq Proof Assistant, http://coq.inria.fr/ Feb. 22, 2011.

Walton, D., "How to Refute an Argument Using Artificial Intelligence"; Studies in Logic, Grammar and Rhetoric 23(36); Apr. 2011, pp. 123-154; available on the internet at: http://pbc.biaman.pl/Content/25579/Studies36-srodek.pdf.

* cited by examiner

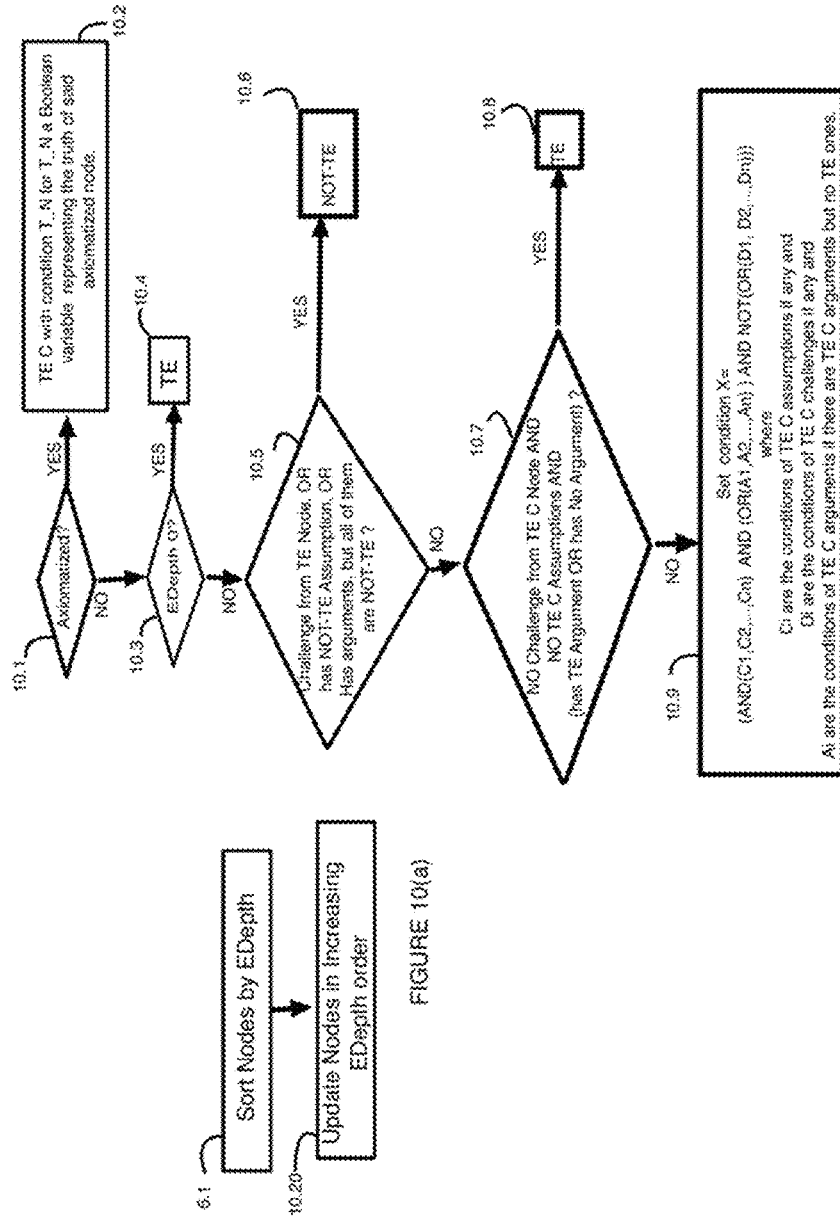
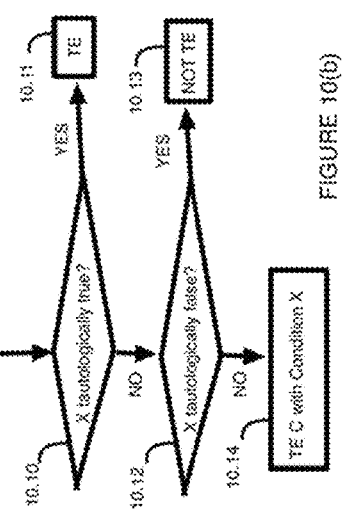

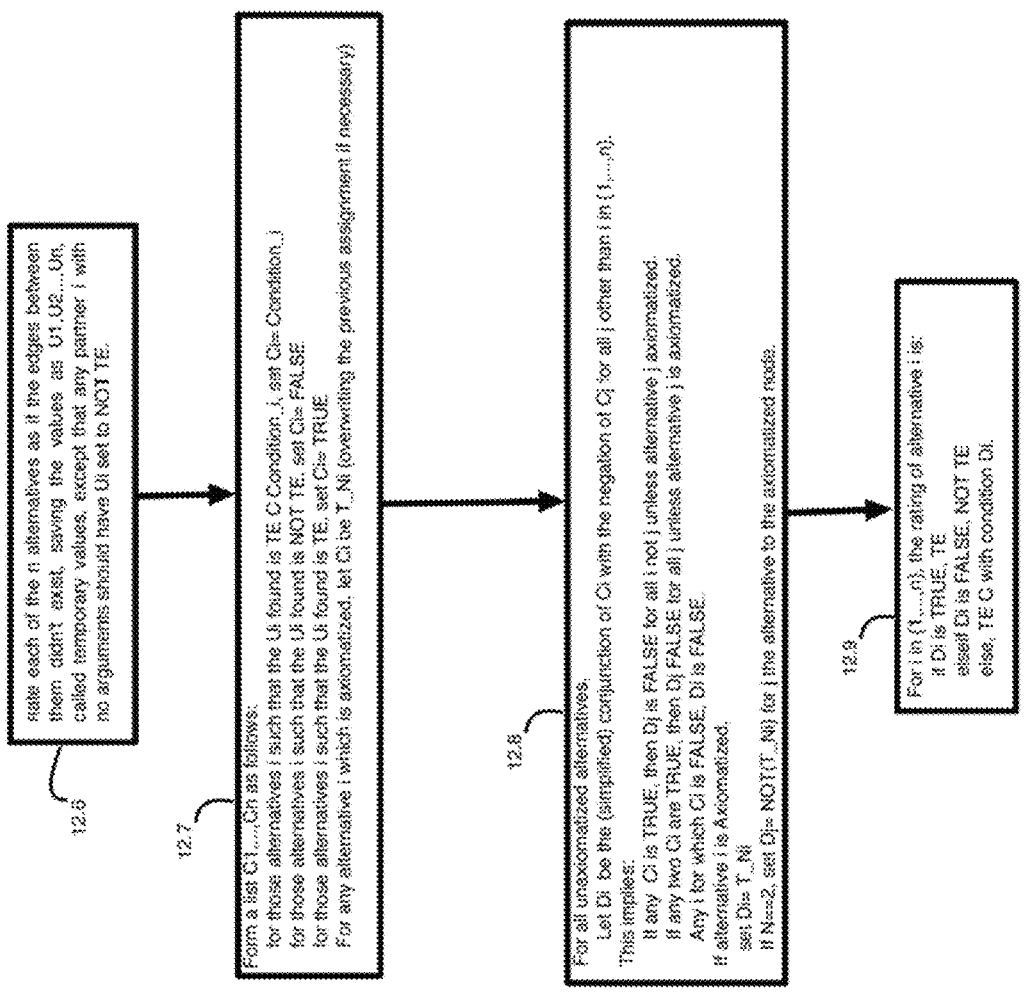
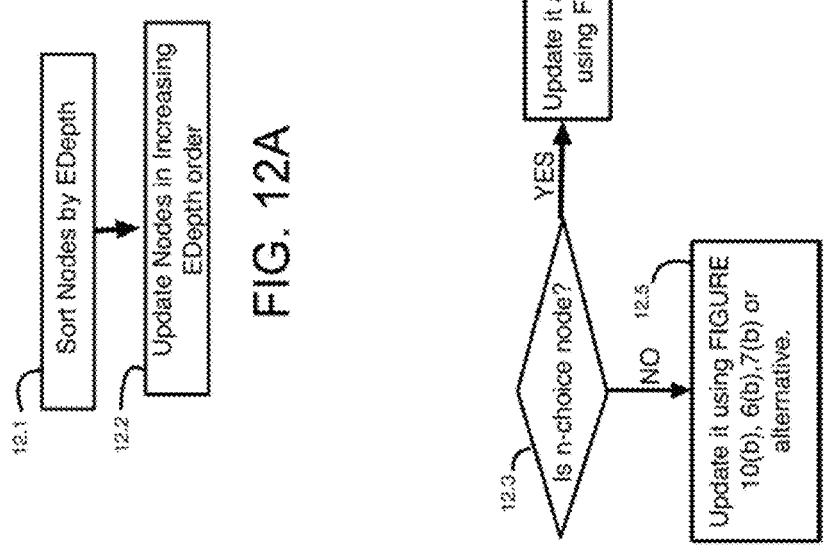
FIG. 12A
FIG. 12B
FIG. 12C

*15.1 Climate to warm .5 degree C by 2100. EL=.9
*ARG:*17.9 Planet Warming 100 years. EL=0.9
Chal 17.12 A priori unlikely EL=0.2
?Arg: *17.30 Glaciers melted EL=0.9 CHAL *17.19 EL=0.8
Arg: 17.16 GCM's say warming EL=0.2
Arg 17.31 Overwhelming consensus EL=0.2
Arg 15.9 GCMs imply EL=0.2

FIG. 18C

*15.1 Climate to warm .5 degree C by 2100. EL=.9
*ARG:*17.9 Planet Warming 100 years. EL=0.9
Cha:17.12 A priori unlikely EL=0.2
?Arg: *17.30 Glaciers melted EL=0.9 CHA *17.19 EL=0.8
Arg: 17.16 GCM's say warming EL=0.2
Arg 17.31 Overwhelming consensus EL=0.2
Arg 15.9 GCMs imply EL=0.2
*17.9 Planet Warming 100 years. EL=0.9
*ARG:*17.11 Glaciers Melted EL=0.9
*ARG:*17.10 Other Evidence EL=0.9
*OCH:17.12 A priori unlikely EL=0.8
*RES:15.1 Climate to warm .5 degree C by 2100 EL=0.9

FIG. 18D

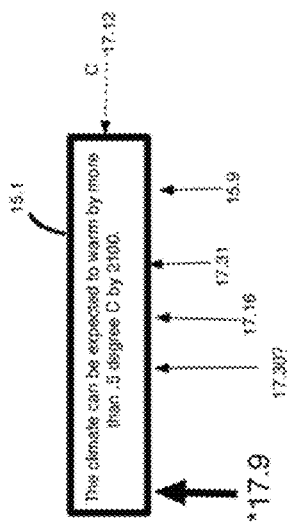

FIG. 18A

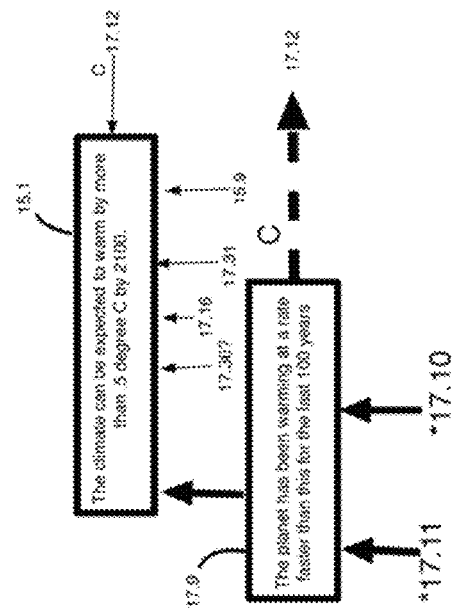

FIG. 18B

*15.1 Climate to warm .5 ⟶ [The Climate can be expected to warm by more than .5 degree C by 2100] 19.1
 *ARG:*17.9 Planet
 Cha:17.12 A priori unlikely EL=0.2
 ?Arg: *17.30 Glaciers melted EL=0.9 CHA *17.19 EL=0.8
 Arg: 17.16 GCM's say warming EL=0.2
 Arg 17.31 Overwhelming consensus EL=0.2
 Arg 15.9 GCMs imply EL=0.2

*17.9 Planet Warming 100 years. EL=0.9
 *ARG:*17.11 Glaciers Melted EL=0.9
 *ARG:*17.10 Other Evidence EL=0.9
 *OCH:17.12 A priori unlikely EL=0.8
 *RES:15.1 Climate to warm .5 degree C by 2100 EL=0.9

FIG. 19A

*15.1 Climate to warm .5 degree ⟶ [Edit / Challenge / View / Delete / Add Assumption of / Add Argument for / Challenge Result Of / Add Result to / Abort / Respond / Assumptions / Display Graph] 19.2 EL=0.9
 *ARG:*17.9 Planet Warming 100 years. EL=0.9
 Cha:17.12 A priori unlikely EL=0.2
 ?Arg: *17.30 Glaciers melted EL=0.9 CHA *17.19 EL=0.8
 Arg: 17.16 GCM's say warming EL=0.2
 Arg 17.31 Overwhelming consensus EL=0.2
 Arg 15.9 GCMs imply EL=0.2

*17.9 Planet Warming 100 years. EL=0.9
 *ARG:*17.11 Glaciers Melted EL=0.9
 *ARG:*17.10 Other Evidence EL=0.9
 *OCH:17.12 A priori unlikely EL=0.8
 *RES:15.1 Climate to warm .5 degree C by 2100 EL=0.9

FIG. 19B

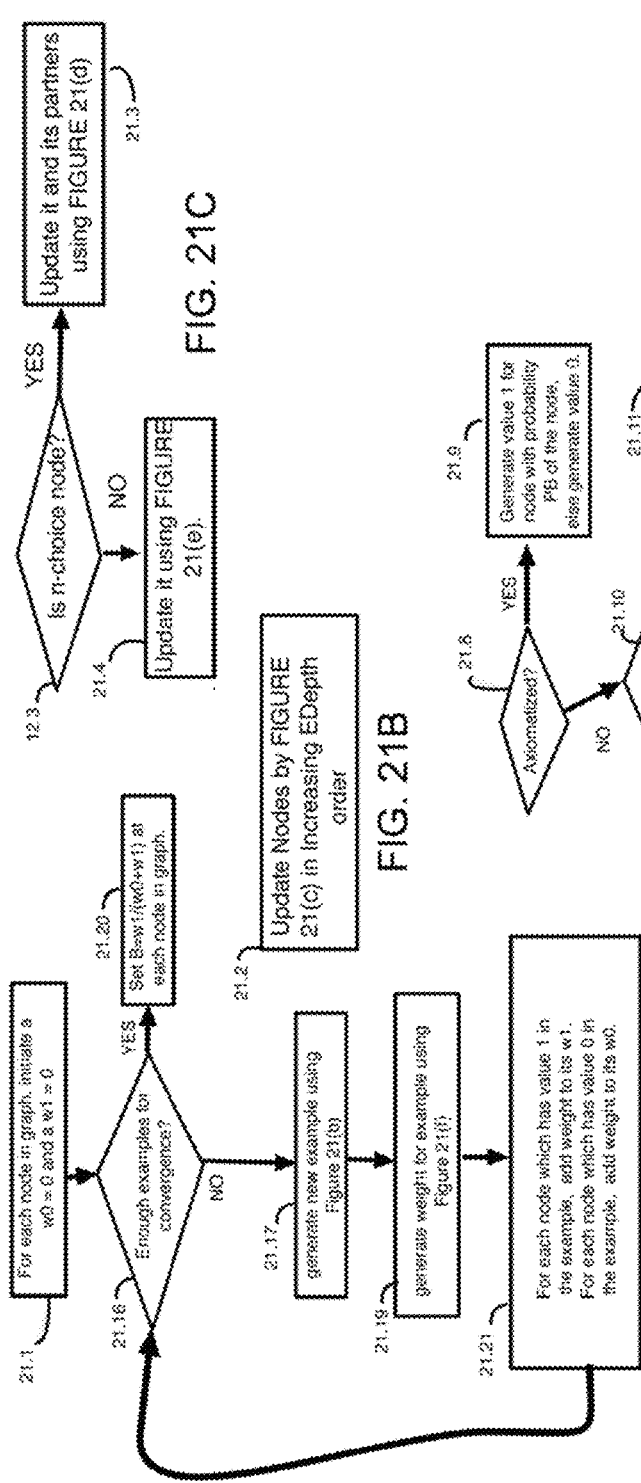
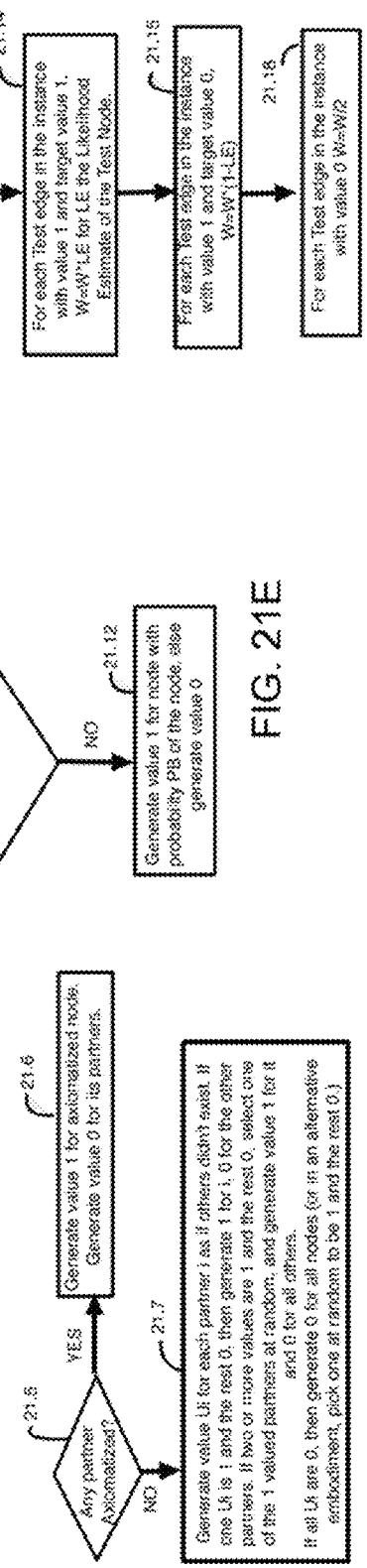

SYSTEM, APPARATUS AND METHOD FOR SUPPORTING FORMAL VERIFICATION OF INFORMAL INFERENCE ON A COMPUTER

CROSS REFERENCE TO RELATED APPLICATIONS

The present application is a continuation of U.S. patent application Ser. No. 16/020,162, filed on Jun. 27, 2018, which is a continuation of U.S. patent application Ser. No. 14/738,199, filed on Jun. 12, 2015, which claims benefit to U.S. Provisional Application No. 62/012,682, filed on Jun. 16, 2014, U.S. Provisional Application No. 62/034,574, filed on Aug. 7, 2014, and U.S. Provisional No. 62/081,823, filed on Nov. 19, 2014, the disclosures of which are hereby incorporated herein by reference.

BACKGROUND

In numerous areas from Vaccine Safety to Climate Change to Neoclassical Economics, dissenters argue that the scientific literature proves the majority view is wrong, that the scientific literature actually implies very different conclusions than those normally believed and taught. Moreover, numerous historic examples are known even within the hard sciences and away from policy questions, where the substantial majority of scientific opinion was confused for a period about what the actual import of the scientific literature was, as dissenters of the day already understood. Whether the dissenters turn out to be right or wrong in the current set of controversies, it is unfortunate that the literature is in a state where what is known, is so little transparently resolved. How is one to judge who is right, save by reading and understanding the literature myself, a time consuming and error prone process requiring sophisticated training?

Any serious scientific literature contains hundreds or thousands or more published papers. Determining what the logical import of all those papers might be pertaining to a question such as: "Should we expect the world to warm 2 degrees Celsius in the next decades?" is a problem for which there is currently no good solution. One method society uses to deal with problems like this is appointing expert panels like the International Panel on Climate Change, but such panels are expensive to run and may be subject to group think and/or political influence, and in any case clearly have not inspired universal confidence in the results of their pronouncements.

Moreover, there is a substantial literature indicating that such problems may be caused or exacerbated by underappreciated aspects of human group psychology. For example, in *The Crowd*, an 1895 book that greatly influenced world leaders in the 20th century, Gustav Le Bon pointed out that what he called a "psychological crowd" would often form, in which the individuals comprising it would lose much of their rationality, deferring to others' judgment in the crowd, and jump from image to image in constructing arguments without properly checking whether one step logically follows from the other. Isolated individuals may exist in the crowd who perceive the flaws in the crowd's reasoning, but they may often be unable to make their voices heard by the majority that assumes the crowd is right.

Therefore, there exists a need to address phenomena like those Le Bon described which have afflicted society quite broadly.

SUMMARY

This disclosure provides system, apparatus and method for formalized verification of informal arguments, in which whether some statements may rationally be believed given the current state of knowledge may be established and displayed in a transparent way.

Mathematicians may often wish to establish whether some theorem can be proved given some axioms. One may often write a proof as a series of arguments establishing lemmas from the axioms and then arguments that establish the final result based on lemmas. Having written out such a proof, however, other mathematicians may need to read and understand it to know if there are any flaws in it, and sometimes there may be error. Formal verification systems like the Coq and the PVS programming languages permit some proofs to be written in mathematically precise terms by skillful programmers so that the proof of each lemma and the proof of the final result can all be automatically verified, and the program by displaying this result may give other mathematicians who haven't read and understood all the details more confidence in the validity of the result.

This disclosure provides system, apparatus and method that can be used for a loosely analogous process in informal inference, and can be used to discover and transparently display whether statements of interest should be rationally believed given the available evidence, for example, whether the statement "Vaccines are Safe" should be rationally believed given what is published in the scientific literature, and to what confidence level it should be believed.

To that end, the system may support the ability of users to construct argument trees in which arguments may be entered in natural language text (or possibly including data, for example images or graphs or links). These arguments may expand into graph-like structures as do the formalized proof structures in mathematics, because a user may enter some statements of axioms or assumptions, and some arguments that may depend on these assumptions and that may be said to be arguments for the validity of some other statements—analogous to lemmas in formal mathematics, and so on finally giving an argument or arguments for the final result. As actually verifying the arguments are correct may be impossible even in principle, the disclosure may treat the entered (received from users) arguments and statements as black boxes. Users may enter what they choose because the system does not analyze their entries to perform verification. Instead of verifying that the arguments are correct, the system may support the ability of other users to challenge arguments. The system may compute and display whether statements that have been entered and arguments that have been entered may have been established based solely on arguments that have not been challenged, and using statements that nobody disputes or has argued for the negation of.

With these capabilities of the disclosure, confidence may be provided to observers that statements have a consensus: statements for which there is an argument nobody disputes using only components (statements and arguments) nobody disputes. The system may provide the confidence only by verifying no essential challenges have been made, by maintaining an updated list of what statements and arguments are validly established without challenge at any point in their demonstrations.

In one embodiment, when challenges are made, users may edit the challenged arguments in response. In fact, it may be expected that a challenge against an argument will include an argument against or question about said challenged argument. The challenged argument may then be edited or expanded in response to the question, after which the challenge would no longer be considered, assuming the challenger agreed that the solution was responsive and removed her challenge. A counter challenge may also be made against the challenge itself, or against demonstrations offered for its validity. These counter challenges may explain in what way the initial challenge was mistaken, or in conjunction with an edit of the challenged argument, explain in what way the challenged argument has now been corrected. In this way, the system may support the editing and evolution of argument trees, seeking to establish as much as the users may be able to agree to, and setting out as well where their differences lie.

In a further embodiment, the system may further or alternatively calculate, update, and display which statements and arguments that have been entered are established using only arguments and statements that haven't been validly challenged. A statement has been validly challenged, when it has a challenge that is established using only statements and arguments that have not themselves been validly challenged. The definition is reached because eventually one comes to nodes (which may each correspond to a statement, argument, challenge, citation, assumption, or test) that have not been challenged at all. This concept allows challenges to the challenge argument itself or to its assumptions or to their arguments' assumptions to restore the not-validly-challenged status of a statement, e.g., a rating of Tentative Establishment (TE). What such rating may certify is that if a node (and hence its corresponding declaration or statement) is Tentatively Established, there is a proposed line of argumentation proving it where nobody has been able to raise and defend a chain of argumentation against any link of the argument tree establishing the node, except for challenge arguments that are themselves in turn refuted at a critical point in their counter-argument by a Tentatively Established counter-counter argument against them.

According to an aspect of the disclosure, all of the arguments and statements and challenges entered may be described as a graph, using a model that considers arguments as having one or more result statements, and zero or more assumption statements, and draws directed edges from a node corresponding to a given argument to a node or nodes corresponding to its result statement or statements, and draws directed edges to the argument node from nodes corresponding to any of its assumption statements. The graph likewise may be used to display challenge arguments, which may be an argument a result of which is the claim some other declaration and its associated node are invalid. Challenge arguments may correspond to a node with a directed edge toward the node they are challenging, and directed edges from nodes corresponding to the challenge's assumptions and/or its' own challenges and/or arguments for its own validity and/or in some embodiments other classes of statements such as citations or tests or suggested edits. Statements including result statements may themselves also be arguments for other results, or assumptions of other arguments or results, or challenges to or tests of other results, so that arguments may be supported by other arguments and the graph may be a number of edges deep.

In according with an aspect of the disclosure, a system may include a processing device configured to: receive information indicating statements and arguments, which statement of the statements is an intended result of an argument, and which statement of the statements is an assumption of an argument; receive information indicating challenges to the statements or the arguments; establish a correspondence between the statements and the arguments to nodes in a graph; and rate whether a first node of the nodes is established by an argument graph using only assumptions and arguments that are not validly challenged.

As argument graphs are challenged and edited, it may be anticipated that the argument graphs may become more detailed, with more explicit intermediate steps, and thus that the system may facilitate better construction of argument graphs. At any given time there may be a ready visual display of what portions of the graph are established using arguments of a given unchallenged status—for example, established using only argument subgraphs that are not validly challenged. This may facilitate cooperative inference over time, refining the product and making clear at any given time what may be agreed upon.

In one alternative, the disclosure may provide a number of mechanisms to avoid problems associated with users who may post frivolous challenges, for example duplicating challenges that had previously been posted and rebutted or that had no comprehensible argument at all, or post non-responsive responses, just responding pro-forma to remove a challenge without actually addressing its concern, forcing another user to waste time reestablishing the challenge. For example, the system may be often be used within a closed group, such as an individual working things out for himself, or the employees of a company, or members of a society, or among professional scientists, or members with a log-in at a particular web-site who may even have been forced to use real names in order to get a log in. Challenges and Edits may be tagged with the name of a user, and users actions may also be available to be read, so that users may be concerned about their reputation. This may motivate collaborative rather than destructive behavior. Users may all genuinely be interested in collaboration to arrive at truth. Also, the system may refuse to accept challenges not supplied with an argument of some minimal length, or that passes a spam filter, and likewise may refuse to accept responses that do not make edits. The system may also support reports that some responses or users are frivolous, allowing the graph or the system to be cleaned by purging one or the other, in the event a decision to do so is made by a moderator or, some embodiments may support a vote of users on whether a node is frivolous. It is also worth noting that by soliciting a group of learned and motivated collaborators to construct the graph giving many interesting conclusions for a field, using the embodiment, one may construct a transparent representation of what is and is not demonstrated within the field.

As graphs are edited, it may become difficult to post a substantive challenge, or when a difficult challenge is posted, to post a response that the user may believe is valid, because all the rational arguments and responses that anybody can think of, have already been posted. At this point what can be established about the question may be laid out on the graph, and it may be a useful and transparent publication of the same. Note that it may be easier for users or observers, or moderators if any were employed, to judge whether a challenge is substantive or a response is substantive, than it would be for them to judge whether an argument is correct or not. Thus, the system may serve to facilitate the confidence of the users in the ultimate results as well their appreciation of the relative merits and abilities of the other users.

In another alternative, the system may also facilitate the teaching and learning of critical thinking and argumentation. To propose a strong argument graph for some proposition, one may wish first to think of the arguments for that proposition, and the assumptions they are making, and the arguments for those assumptions, and the counter-arguments against or challenges to the argument or the proposition or the assumptions of the argument, and the challenges to the challenges, and so on. The system may provide a means for students to diagram all these pieces of an argument and indeed a field or subject, and to receive direct feedback from teachers or other students on what they had missed or where their points were less than logical in the form of challenges or suggested edits at these points in their argument.

The system may facilitate the posting of rewards for successful or non-trivial challenges so that someone wishing to establish a statement is proved could boast that nobody had been able to disrupt its status even with a reward offered, and so that someone wishing to recruit researchers to establish such confidence on a question of their interest could do so. A non-trivial challenge or other node may be defined in various ways, but in particular it may be defined depending on the embodiment as one that changes the establishment status of the root node of the graph, or the topic node of the graph, or some significant designated node, when said non-trivial challenge (or in some embodiments, other node) is posted onto the graph. Another criteria that may be considered important is that in order to be considered successful or non-trivial and qualify the node itself may be required to be tentatively established for a period of time, or for a high fraction of a period of time, such as being tentatively established at least ¾ of the time for a month.

A conjunction of the above conditions, changing the status of the root when posted and remaining TE for ¾ of the time for 3 months or some other threshold on maintaining tentative establishment status, may comprise a test for reward qualification. Alternatively it may for example be one that results in at least some number of nodes being added to the graph before it is resolved, or at least some amount of text being added to a node, or which results in at least some period of time passing before anyone responds. Payment of rewards for successful responses or challenges may also be useful to recruit industry experts to build a reliable and well vetted set of inferences.

The system may also support paying rewards to users who post public graphs that gain large numbers of viewers, and whose average posted public graph gains a higher number of viewers than some threshold, such as higher than half the public graphs posted do. A condition such as this may reward users who provide interesting content and defend their graphs interactively and avoid cluttering the field with distracting graphs nobody cares about. The relative importance of the two factors may contribute to the reward. Such rewards may include permission to post a number of new public graphs, thus seeding the field so that a majority of new graphs may be created by individuals skilled at creating interesting ones.

It is also possible that users posting frivolous responses may be identified using spam filter technology or by a moderator and removed from the group. The system may also support the ability of users to view the graph, or of a moderator to display the graph, with the challenges of a particular user or set of users expunged.

In one alternative, the system may provide the ability to compute the establishment status of all of the nodes under the hypothesis that one or more challenges are ignored, or under the hypothesis that one or more nodes are considered True and unchallengable and any challenges of such "axiomatized nodes" may be ignored by the rating update. Such determination may be referred to as axiomatizing the node or nodes, or the axiomatized nodes are stipulated or postulated, because users may behave as if it was an axiom that this node or nodes are True and that any challenges of them are wrong. The system may then compute and display the status of all the nodes under this assumption, but it may carry along a notation indicating the axioms that have been assumed. As a result, users, for example, may be able to analyze problems such as the validity of a statement like "There is a 50% chance the earth will warm 2 degrees by 2100" down to a set of small sub-questions on which they fundamentally disagree. Then those or other users may be able to see, on a display, that the argument graph for the conclusion may be not validly challenged except for challenges on certain specific underlying points, and users may then choose to believe the conclusion or not after evaluating the specific challenged point(s) and the argument(s) challenging them for themselves, without however having to evaluate the rest of the scientific literature.

It may be noted that in some embodiments, the system may compute a rating of "tentatively established" (TE) as described above, that depends on the last challenge or argument added. Even after a debate has been ongoing for a while and a large graph is built and has been relatively stable for a while, a new challenge or a new argument can change the TE status of the conclusion. As such, the term "tentatively" is used in the name of the subject status. An advantage of the system is showing which conclusions may be logically drawn using argument graphs that nobody has objected to in a way that has not yet been rebutted in a way nobody has validly objected to. A result or argument or challenge may be tentatively established when there is a chain of argumentation for it, such that every challenge proposed to any critical link in said chain of argumentation, is itself challenged in some critical link in its own chain of argumentation by a challenge that is tentatively established, so that the challenge proposed to a critical link is itself rated NOT Tentatively Established. Here the chain of argumentation may include arguments and assumptions and challenges, and an argument, assumption, or challenge may be considered a critical link in the argument if it may be necessary for the chain of argumentation to imply that said result or argument or challenge is true in a model of logic.

The system may provide an alternative rating, or "citation rating", for nodes in which the nodes may only be considered Tentatively Established if they are established by argument graphs grounded in citation nodes and have demonstrations not validly challenged by arguments grounded in citation nodes. If users then restrict citation nodes to a certain class, e.g., nodes citing a paper in the peer-reviewed literature, then the rating may transparently display which nodes can be rationally demonstrated by arguments based wholly on nodes in this class, e.g., in the peer-reviewed literature.

For example, when a node or a statement is established by an argument graph, the argument graph may be a subgraph of the full graph that users have constructed. For example when a node or a statement is established by an argument graph using only assumptions and arguments that are not validly challenged, this does not preclude validly challenged assumptions and arguments elsewhere in the graph. It does intend that there may be a subgraph composed of assumptions and arguments that are not validly challenged (including by nodes in the full graph) that establish said node or statement.

Some embodiments may provide for the re-use of nodes in one graph that have already been used in another graph, and may treat such a node as joining the two graphs so that if the node is validly challenged in one graph it becomes NOT-TE in the other (unless it is axiomatized in the other), and if it has an argument in either graph it needs at least one TE argument in some graph to be considered TE and it may have the same assumptions in both graphs. A node's ancestor subgraph may be the subgraph (of the union of graphs} comprising those nodes that are the node's ancestors in any graph. When the node is imported, its ancestor subgraph (the subgraph (of the union of graphs} comprising the nodes that are said imported node's ancestors in any graph) may be imported as well, but may not be displayed unless a user selects a button to expand said imported node. Whether it is displayed or not, the imported ancestor subgraph may be used by the system as a normal part of the graph in computing ratings of the node.

In an alternative embodiment, the system may provide propagation of a numerical rating to nodes, that may for example represent an estimate of the likelihood the statement associated with the node holds, or the confidence with which it should be believed.

The disclosure may provide a system where it can be established and displayed that a chain of arguments and results ends in a given claim, in such a way that it is demonstrated that no user has been able to look at any link or assumption in the chain and raise an objection that has not been resolved. To this end, a system may provide users with capabilities to create structured arguments, issue challenges, and to respond to challenges by editing arguments and by counter-challenging; and may maintain and display as this is done a status for the nodes, statements, and/or arguments indicating whether they are at present established using only arguments and statements that have not been validly challenged. In one embodiment, if some users have raised objections to certain points, the system may allow the critical objections to be isolated and displayed to users, and to support the calculation and display of the consequences of alternative assumptions about the resolution of these questioned points, to what can be established throughout the graph.

In one embodiment, this disclosure pertains to a computer system to assist a user or users in inference, and in communication and display of the inferences and their proofs or arguments in a transparent manner so that users may easily read them out and/or verify them. In the event of multiple users, the system may provide a platform guiding collaboration, and protect against interference if some of the users are malicious or less competent. It may be used online to coordinate efforts of multiple users. It may also be designed to avoid and deal with quirks of group psychology that may impact inference of groups and individuals in groups. It may also provide a resolution or negotiation method to produce those inferences that disputing or skeptical parties may transparently verify and agree to, and to help identify and isolate what underlying points they differ on.

In some embodiments, the aspects of the disclosure may be used in one or more fact checking websites, where people may be able to come for verifiable and reliable answers to such issues, or for the purpose of contributing to the publication of such verifiable and reliable answers. The disclosure also may be used by corporations and other large organizations doing strategic planning, to avoid getting caught in crowd-think blunders. In addition, the disclosure may be used by individuals, to organize their thoughts and make sure they have not missed anything. Further, aspects of the disclosure may be used to teach or study the art of critical thinking.

The aspects of the disclosure may advantageously provide a tool that supports informal inference using natural language in contexts where users can only manage less formal arguments, but which at least ensures there are no logical holes in the argument that any person or system can spot. Also the disclosure may further support, in cases where disputants cannot ultimately agree, their ability to agree on as much as possible, and to refine the remaining disagreement to critical underlying points, and make transparent on what underlying points the difference lies and the evidence for the respective sides.

In accordance with the present disclosure, a system and method is disclosed for conducting inference with the assistance of a computer system that maintains additional data and meta-data in order to create, display, label, and modify tree or graph-like structures relating to the inference. These structures are used to update, calculate, and display scores or ratings pertaining to statements or arguments used in the inference or about which the inference is regarding. In one embodiment, the computer system may permit one or more users to edit a common inference graph, to challenge arguments in it, to respond to challenges, to assume challenges are mistaken or statements or arguments are true and monitor the consequences this assumption has for other inferences, and to view updated ratings of nodes in the tree. A rating maintained for nodes of the graph may be computed to indicate whether the statement may be established using only arguments and assumptions that are not validly challenged, that is not challenged by arguments or statements which themselves fulfill criteria for being established.

In another embodiment, another score or scores may also be computed that indicates which nodes are implied using only arguments and assertions that are not challenged by a similarly unchallenged argument and for which there is not a negation node that is similarly implied, except for this score there are a set of named challenges and/or named arguments, and/or statements that may be used even though they are challenged. This embodiment may allow users to see what the results would be under various hypotheses about disputed points. Users may be motivated to use the system to try to prove and disprove various statements, and the system may transparently indicate whether an argument tree for a statement has been constructed that has not been cogently refuted, and thus that everybody may agree they do not know how to cogently refute. In cases where a logical argument for or against some proposition cannot be established to everybody's satisfaction, the system may provide the capability to cogently identify and refine and transparently display the underlying points on which users cannot agree and display as well how alternative outcomes of these underlying disputes may affect the validity and demonstrability of said proposition and other statements entered into the system.

For example, the disclosure may allow users to recognize and prevent in the future logical holes, for example, that may commonly go unspotted at lower levels in numerous real world inference trees, causing immense real world inefficiency and harm that our disclosure will allow.

In one embodiment, the system may provide for other scores for nodes to be computed including estimates of a likelihood associated with a node, computed using only propagation along arguments and statements not challenged, or computed using scores depending on an interaction of challenged and unchallenged nodes in a framework where challenges may be looked at as proposing an alternative likelihood for the statement. This embodiment may also be used as a framework for negotiating likelihood estimates the users may agree on, and may be used to compute likelihoods with certain challenges axiomatized (disregarded for the calculation) just as in the above embodiments.

The system may maintain a file or database representing the current state of inference, including data indicating the current rating of proposed inferences, and data about user entries.

The system may offer users a menu of options, including entering text or data into fields or uploads, where a label such as "argument" or "result" or "challenge" may be attached to particular fields on a display. In one embodiment, drop down menus may be provided where some of the alternatives are greyed out depending on the context so that they may not be selectable by the user, and other alternatives are offered in black. When one of these is selected by the user, the system may display a window with fields into which text and/or data may be entered or files uploaded pertaining to particular objects. The embodiment may support entries in one or the other categories that may be labeled on a display: arguments, results, assumptions, responses, tests, suggested edits, citations, choice nodes, negations, and/or challenges. As users add and change entries, the system may keep a structured record of the entries, and display same. The editing permissions the users are given may constrain them to constructions consistent with mapping into graphical structures that the system maintains and may display a depiction of. This structured record may have a graphical form, in which each argument may be associated with a node from which there is a directed edge to another node with which a result is associated, and to which there may be directed edges of a first type from zero or more nodes with which assumptions are associated. A second type of inward-directed edge to nodes corresponding to an argument may come from nodes corresponding to challenges with which may be associated challenge arguments. In an illustrative embodiment, users may also create nodes corresponding to the negation of the statement corresponding to another node, and the system may connect these with bi-directed edges. In other embodiments, the system may configure n-choice nodes, which include n nodes connected with bi-directed edges and treated as a unit for rating purposes, with an intent that one of the n alternative nodes is true (so that establishing the truth of one establishes and necessitates establishing the falsehood of the others). The users may be offered a graphical display allowing them to navigate through the structured record. The users may be prompted to enter statements, and arguments and choices according to a logic implemented into the system. As users update, create, and modify entries, the system may propagate one or more scores or ratings to other nodes on the graph and their associated statements or arguments. In another embodiment, the system may assign a rating that takes values "tentatively established" (TE) or "not tentatively established" (NOT-TE) or "tentatively established subject to condition" (TE C) by an algorithm implemented by a processing device of the system. The algorithm may determine that a node is tentatively established if there is an argument for it that is not validly challenged and that has all its assumptions tentatively established, and there is no negation or alternative node for it having the same properties, where a challenge may be said to be "valid" if its challenge node itself fulfills the criteria for tentative establishment. The rating of a node is its "status".

The different types of nodes and edges may correspond to different argument types, and the rating algorithm may treat them differently, thus allowing users to construct different representations and view different ratings. Suggested Edit nodes may be used to suggest changes to other nodes or their associated data or edges, and may be taken to not affect the status of the target node. Test nodes may be used in a probabilistic rating, so that the Test edge may not affect the status of its target, but may affect another rating dubbed "Belief". Citation nodes may be considered a sub-type of argument nodes, but may be intended to be used to link to peer reviewed publications, for example. Their outgoing edge may be treated as an argument edge, or as otherwise specified by the user to be a challenge, assumption, etc. Citation nodes may have a particularly important role in another alternative rating that may be supported called Citations rating, which rates a node Tentatively Established if it is supported by a demonstration grounded entirely on citations, and not validly challenged at any critical point in the demonstration, where again a challenge is valid if it is Tentatively Established by the same standard.

In one embodiment, the system may provide a display on which the users may be able to view the ratings of the nodes as they modify the argument graph and may thus direct their efforts to the critical parts of the graph. Users may be able to transparently read out whether conclusions have been "tentatively established" (TE) or not according to the entries up to the present time (and may be able to using a variety of update methods). Users may also be able to respond to certain challenges by hypothesizing or stipulating they are neglected, and compute the tentative-establishment status under the counter-factual situation that the challenge was withdrawn or refuted, and/or that a node and its corresponding statement has been established and the system then assigning to pertinent nodes a status of tentative-establishment subject to condition (TE C). This capability of the system may, for example, let policy makers viewing a complex argument constructed by opposing teams, see what the key underlying points the opposing teams are actually disagreeing on (rather than, for example, seeing only two different conclusions) and how the different results would turn out under different hypotheses regarding these underlying sub-issues and what the arguments for and against the sub-issues are.

In accordance with one embodiment, an apparatus may include a processing device configured to: receive first information indicating statements and arguments, and which statement of the statements is an intended result of an argument; receive second information indicating challenges to the statements or the arguments; establish a correspondence between the statements and the arguments to nodes in a graph; and rate whether a first node of the nodes is established by an argument graph using only arguments that are not validly challenged.

In accordance with one embodiment, an apparatus may include a processing device configured to: receive first information indicating nodes in a graph and directed edges, said edges indicating which first node of the nodes provides an argument for another node of the nodes, which second node of the nodes provides an assumption for another second node of the nodes, and which third node of the nodes provides a challenge to another third node of the nodes; receive second information indicating text or data associated with the nodes; rate a first edge of the edges as established when the first edge originates at an established node of the nodes; and rate a node of the nodes as established (i) in a case when each incoming assumption edge thereof is established and no incoming challenge edge is established, and (ii) in a case when at least one incoming argument edge exists, at least one of the at least one incoming argument edge exists is established.

In accordance with one embodiment, an apparatus may include a processing device configured to: receive first information indicating nodes and directed edges of a graph, said edges indicating which first node of the nodes provides an argument for another node of the nodes, which second node of the nodes provides an assumption for another second node of the nodes and which third node of the nodes provides a challenge to another third node of the nodes; receive second information indicating text or data associated with the nodes; and determine a belief for each respective node estimating (i) a likelihood that each incoming assumption edge thereof is from a true node, (ii) when the node has at least one argument edge, at least one of the at least one argument edge is from a true node, and (iii) no incoming challenge edge thereof is from a true node.

In accordance with one embodiment, a method may include receiving, by a processing device, first information indicating statements and arguments, which statement of the statements is an intended result of an argument; receiving, by the processing device, second information indicating challenges to the statements or the arguments; establishing, by the processing device, a correspondence between the statements and the arguments to nodes in a graph; and rating, by the processing device, whether a first node of the nodes is established by an argument graph using only arguments that are not validly challenged.

BRIEF DESCRIPTION OF THE DRAWINGS

FIGS. 10(a) and 10(b) show flow charts for rating with axiomatization.

FIGS. 12(a), 12(b) and 12(c) show flow charts for rating with n-way nodes.

FIGS. 18(a), 18(b), 18(c) and 18(d) illustrate simpler subgraph depictions that may be shown to users.

FIG. 19(a) shows the hypertext display of FIG. 18(d) with the mouse pointer hovering over the first line, and the system then displaying the full version of the content associated with the node on a pop-up.

FIG. 19(b) shows an example in which the hypertext display of FIG. 18(d) is being right-clicked on the first line. The display then pops a menu that the user may select from to take actions pertaining to the node.

FIGS. 21A-21F shows a flow chart for the evaluation or Update of Beliefs.

FIG. 25 is a screenshot showing the graph of FIG. 11 with Citations rating turned on.

DETAILED DESCRIPTION

Figure 1:
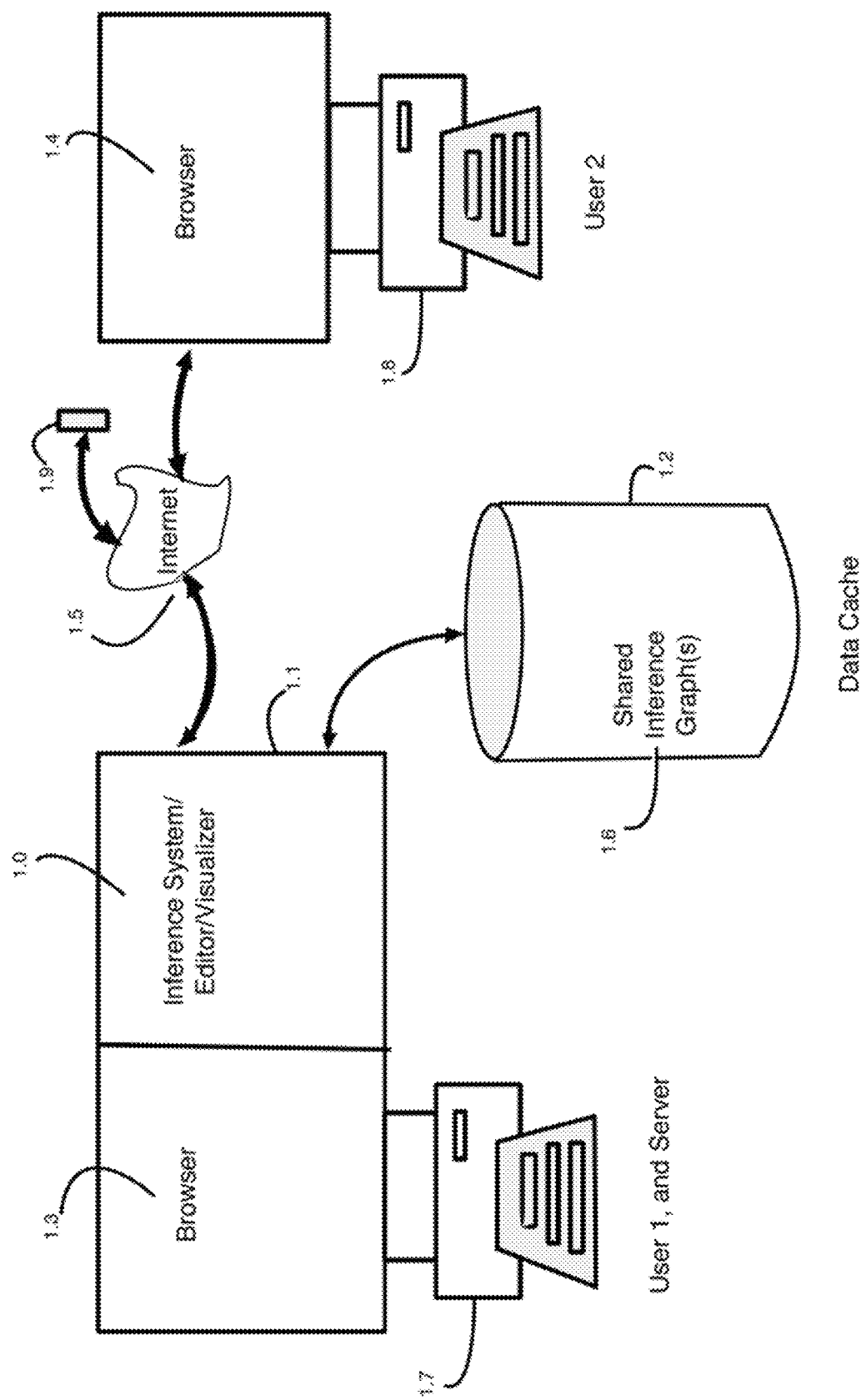
FIG. 1 depicts an illustrative embodiment of a system for conducting and displaying inference, showing a client implementation and constitutive elements in accordance with the present disclosure.

FIG. 1 depicts an illustrative embodiment of a system for conducting and displaying inference, showing a client software implementation and constitutive elements in accordance with the present disclosure. FIG. 1 depicts 2 users, but it is understood that the disclosed system supports an arbitrary number of users. The communication network 1.5 in the image is the internet, but other means could be used to transfer data. Also shown is a data cache 1.2, where the system may store data pertaining to user entries and the graphical representation thereof 1.6. The inference support system 1.0 is shown as running on a computer 1.7, in this case User 1's, which may also represent a server, and storing data in the data cache. In the illustration the users are using browsers 1.3 and 1.4 (possibly with plug-ins) to access the Inference system running on a computer or to view graphical displays it maintains. Alternatively they may use specific client software loaded onto their machines for the purpose of accessing the inference system, or they may run the Inference system locally, or the inference system may itself run on a browser or as a plug-in on a browser.

In another embodiment, certain aspects of the system may be run on the local machines, such as User2's computer 1.8 and certain aspects of the system are run on central server, which may be represented here by User1's computer 1.7. For example, as the user locally edits the graph, the system may locally (1.8, 1.4) run a graph arranging algorithm to display the graph in a pleasing and informative layout, while it may perform the calculations of rating updates and belief value score updates for the nodes on the graph at the central computer 1.7 and send the updated information to the local computer 1.8 for display. Or alternatively, the ratings' updates may be computed locally as well. An illustrative embodiment runs locally on a user's browser, where the user may edit, view, and interact with local copies of the graph, and may run as well at a server 1.7. Some functions may be performed at the local machine, and some at the server. The system may maintain a copy of the graph and argument being edited, which is a shared copy. As a local copy is edited, it may differ from the shared copy which may be at a central data cache represented by 1.2 or on a central server, represented here by 1.7. When the user saves the edited graph, it may be saved back to the central server or central data cache and replace the shared copy there, becoming available to other users to view, edit, or interact with. Alternatively the user may save-as the local graph, and have it be saved on the central data cache as a common graph available to others for download, viewing, or editing, without necessarily over-writing the existing graph. 1.9 shows a tablet or smart phone or other mobile computing device which may also be capable of interacting with the system much as 1.8 is.

It is to be understood by those of ordinary skill in the art that the system 1.0, which is described below as performing data processing operations, may be software, hardware, such as a circuit or circuitry, or any combination of hardware, including circuitry, and software. In addition, the system 1.0 may suitably contain a memory storage area, such as RAM, for storage of data and instructions for performing processing operations in accordance with the present disclosure. Alternatively, instructions for performing processing operations can be stored in hardware in one or more of databases in the system 1.0.

It will be further understood by those of ordinary skill in the art that the system 1.0 may be implemented as an apparatus including a processor and memory, or may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

Figure 2B:
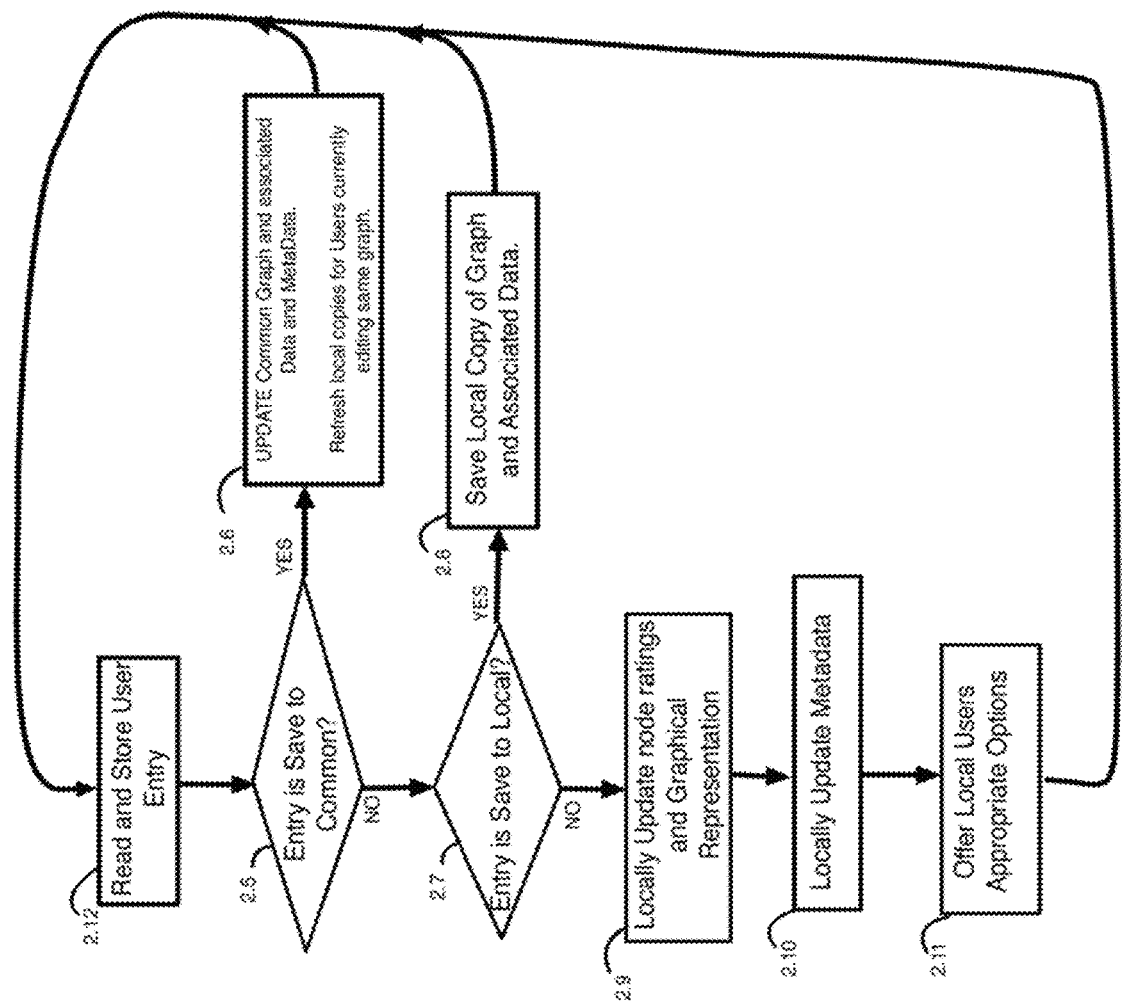
FIGS. 2A and 2B shows a flowchart for the operation of the system.
Figure 2A:
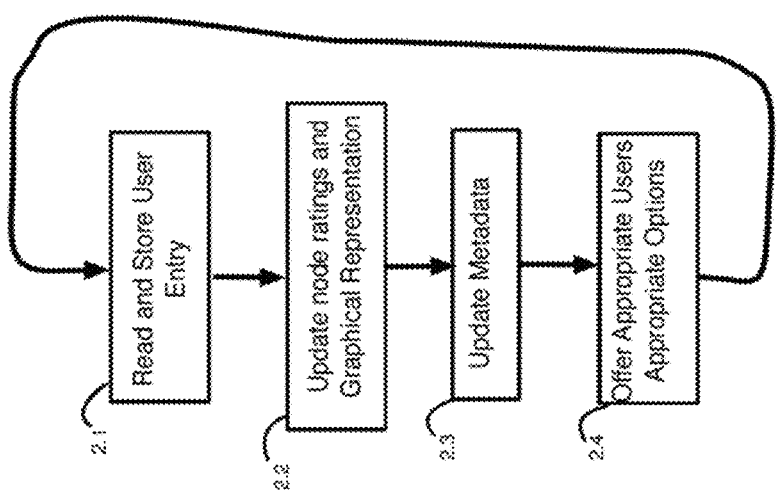

FIG. 2(*a*) shows a flowchart for the operation of the system. The system may accept a user entry at block 2.1. Then the system updates a graphical representation according to the structure appropriate to the user entry that is received at block 2.2. Users may enter data or text into one or more provided fields associated with a node and the system may store this data and associate it to the node and may display it to users or provide users means to edit it. Users may indicate to the system how a node is to be connected to other nodes, for example whether it is to be an argument for a particular declaration at a particular node. User entries may be constrained by the editor to indicate how the edit creates or changes the graphical structure in a modality the system is programmed to understand and support. For example, the system may refuse to accept the creation or edit of an argument node, unless some existing statement node has been designated as its result or some string of text has been entered into its result field, and may create a new result node having the entry as statement if one does not already exist that has the entry as its statement. The system at block 2.2 may also compute and update one or more ratings or scores for the nodes and/or edges of the graph, and update the representation accordingly. The system may update metadata associated with the nodes and edges of the graph, such as who has permission to edit the node at block 2.3, or such as maintaining for the nodes a history of when the node last changed from TE status or how long it has been TE status. Such data may be useful to users for estimating the stability of edited argument graphs.

Then the system may offer appropriate users appropriate options, at block 2.4. For example, all users may be able to view all nodes, and some users may be able to edit or challenge nodes, which will result in the system looping to block 2.1 Users may be able to edit nodes they have created corresponding to arguments or statements they are authoring, and to challenge nodes of others or suggest edits of them by attaching a suggested edit node to them, but may be prevented from editing the nodes authored by others in some embodiments.

The above discussion may maintain a single common graph that multiple users may edit in real time, seeing updates as they are made by themselves or other users. Alternative methods of handling concurrency may be used. FIG. 2(B) details an illustrative embodiment which maintains multiple versions of a common graph. There may be a current version of the common graph that may be viewed by multiple users. The current common version may be saved at a server, for example, the server 1.7. When users access the system and view the graph from their computer 1.8 or other device (such as a smart phone 1.9) a copy may be made and displayed on their local machine 1.8, or 1.9 for example displayed on their browser 1.4. When a user enters a command or some text or data at block 2.12, the system may ask at block 2.5 whether the user request was to save his local version to the common version, changing the common version if the local user has made edits to the graph locally. If yes, then at block 2.6 the system may update the common version, changing it, and may refresh the copy of the common graph on the computers or other devices of other users currently editing or viewing it. If they have made local changes, it may offer to save a local copy of their changes before refreshing. In alternative embodiments the system may alert users that the graph has changed on disk, so that they may refresh, rather than refreshing for them. Or it may refresh, and alert that it has refreshed, but an edit window that the user may have open editing a node, may not be refreshed. When the local user hits the "save changes" button on said edit window, the system may rewrite the local graph (after it had been refreshed to be current with the common graph) by making the changes to this node, or adding the particular node or edges that had been entered into said edit window. So the changes may in this way be made after the changes of another user have been incorporated. If the user then saves his local graph to the common graph, the common graph will also contain both edits.

The system may refuse to update the common graph if local users try to save with a graph that does not reflect the most recently saved change on the common graph by another user. Other means of handling concurrency and avoiding collisions may be familiar to those versed in the art.

Note that the system may in an alternative embodiment allow users to make changes on their local graph, and deny them from saving those changes to the common graph by checking before saving whether the user has permission to save the changes before saving them at block 2.6.

If the user entry is not Save to Common, then at block 2.7 the system determines if it is Save to Local? at block 2.8. The system may save a local copy of the local version of the graph and associated data, for the users convenience, for example at block 1.8.

If the user entry is neither save to local nor common, at block 2.9, the system next locally updates the graphical representation, and associated stored data, performing changes the user entry may have specified, and performs node rating updates for the local graph. (These ratings updates may or may not be physically performed on the local machine 1.8, but may be performed in some embodiments on a server 1.7 by sending the local graph information and receiving back the computed updates. This may be done, for example, if some rating update scheme was secret to avoid copying of the software by users.)

The metadata may also be locally updated at block 2.10. Next, once updates have been done, local users are offered appropriate options. The options may depend on the user— for example users may have permission to view or edit some graphs but not others, or to edit some nodes but not others. Or in some embodiments, users may offer buttons or permissions to take actions on the local copy of the graph, but may be warned that certain actions cannot be saved to the common graph.

When a user makes some entry based on the options offered at block 2.11, the system responds again at block 2.12.

In an illustrative embodiment, the system may display to users via a browser on their computer a searchable list of existing graphs and/or allow them to start a new graph. The system offers a button users may click to start a new graph and also supports users right-clicking with their mouse on virtual canvas or whitespace on the browser window (surrounding a drawn graph, or in whitespace provided for one to be drawn). Upon the right-click the system presents a dropdown menu including as an option "New Graph". Dropdown1, the Layout dropdown, is shown in the upper right of screen shot of FIG. 3, where the system has drawn it in response to a user right-clicking on the white space.

Figure 3:
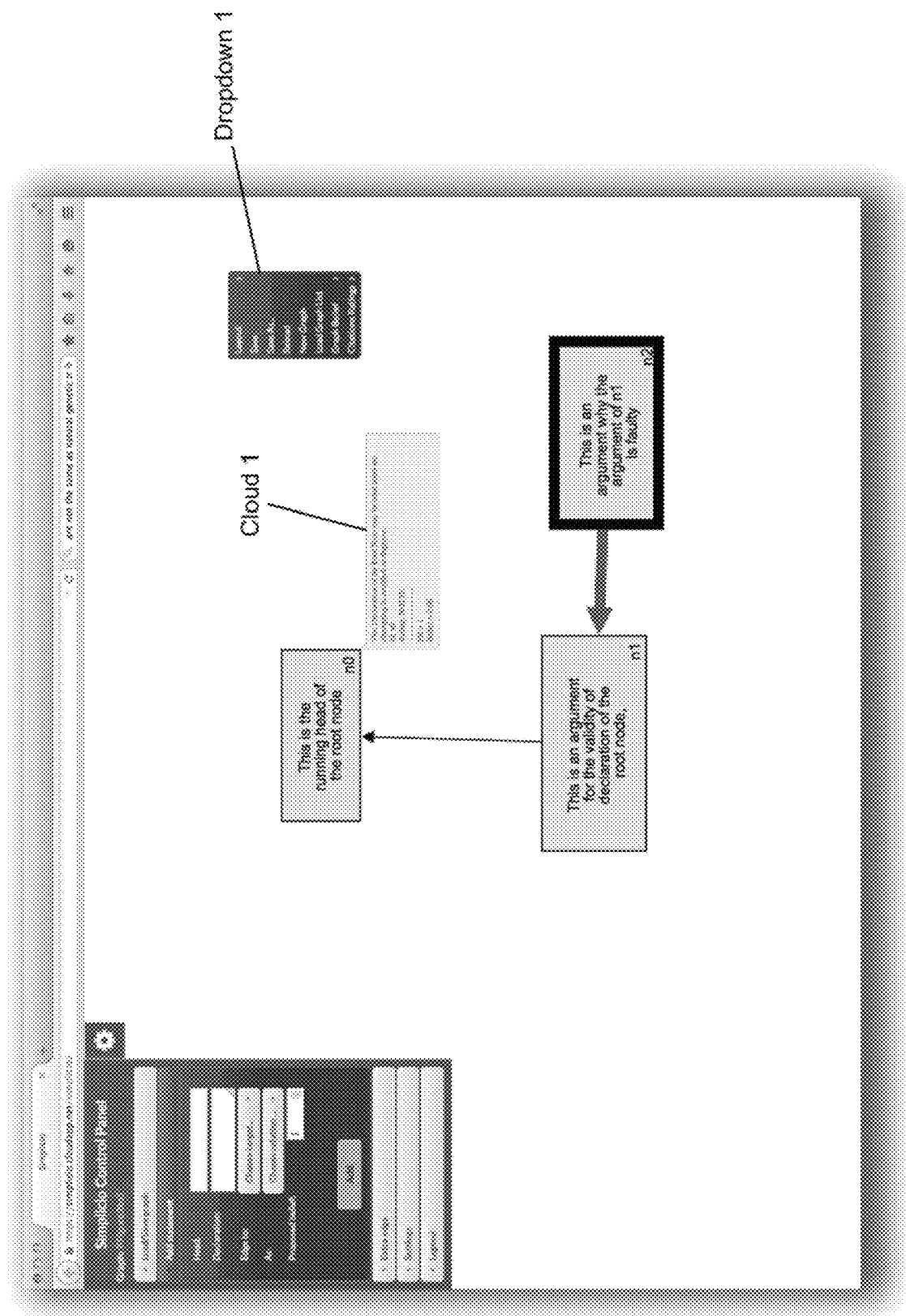
FIG. 3 shows a screenshot of an embodiment displaying a graph being edited.
Figure 4:
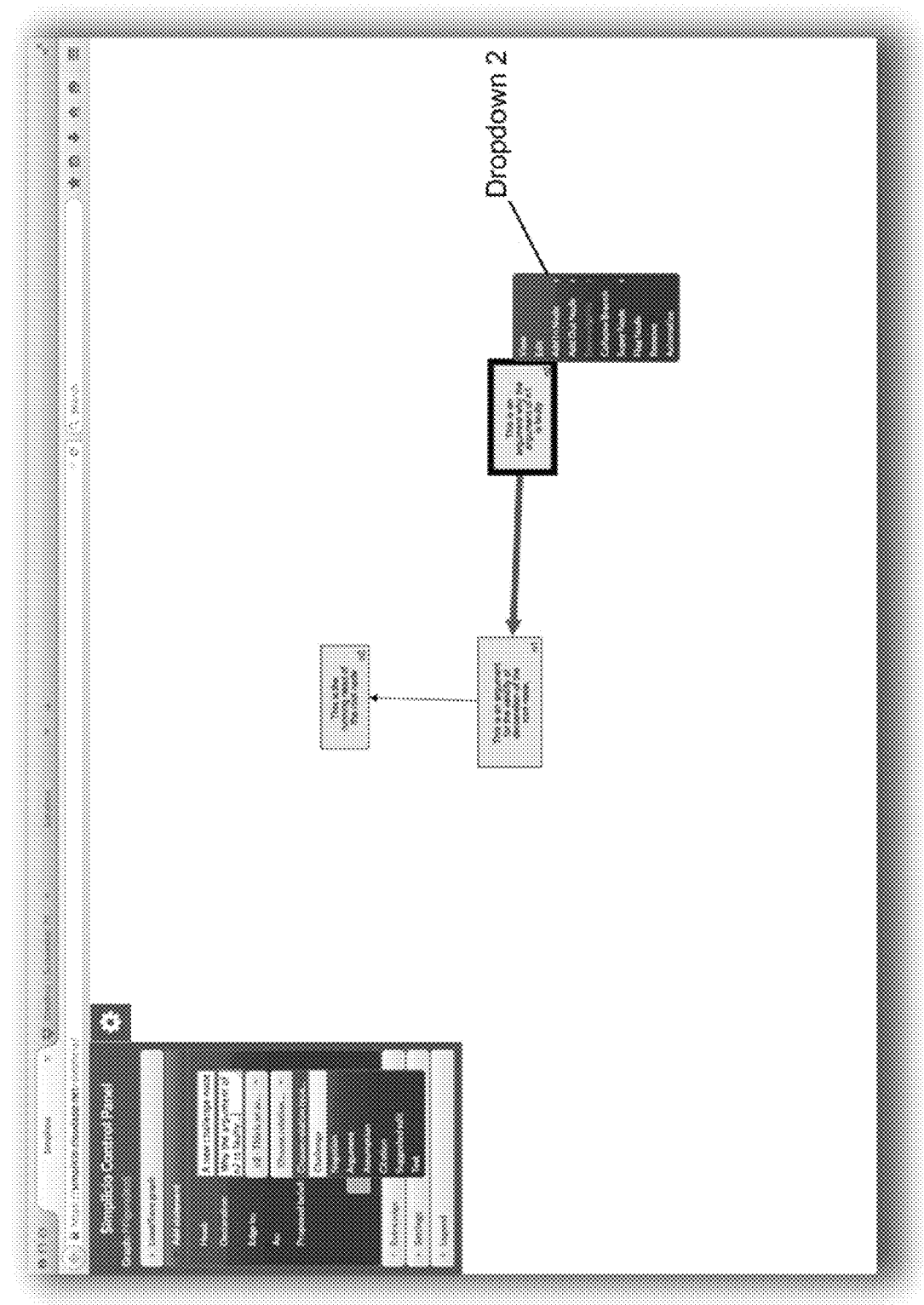
FIG. 4 shows a screenshot of the embodiment of FIG. 3 after further editing.

In response to said user input, the system then displays the selected graph or (if New Graph was selected, whitespace in which a new graph may be created), and displays a control panel to users, as well as drop downs to users who right-click on the white space (Dropdown1) or on the nodes of the displayed graph (Dropdown2) or on the edges of the displayed graph (Dropdown3). FIG. 3 shows a screen shot with the control panel on the left and showing Dropdown1, the Layout dropdown, a dropdown menu created by a right-click on the white space. The saved graph "PFigure3to5" has previously been selected by the user and displayed by the system. It includes nodes n0, n1, and n2 and the edges between them as displayed. On the control panel, Controlpanel1, labelled Simplicio Control Panel, there are buttons for Load/save graph, Add statement, Extra edge, Settings, and Legend. When one of these buttons is selected, it displays to the user a further set of options. For example, as illustrated in FIG. 3, the Add statement button has been selected, causing the system to display a field into which the user may enter or paste a Head: (or running head) for the node, a field into which the user may enter (or paste) a Declaration for the node, a button for "Edge to" that drops down into a list of target options, which may be the list of nodes already on the graph being edited (or may allow selection of nodes on other graphs). It also contains a button for "As:" that when selected may drop down into a menu displaying a set of node and/or edge types. FIG. 4 is a screenshot with the As: button selected showing the Choose Relation Type dropdown menu (Dropdown4) that includes Challenge, Negation, Argument, Assumption, Citation, Suggested Edit, and Test. (Shown open in FIG. 4). The panel with the "Add statement" button selected may also contain one or more fields and/or selectors in which the user may enter numbers representing estimates of beliefs or likelihood values, for the node and if it is a test node for its target. In FIG. 3 a Proposed Belief is shown with a selector that allows the user to enter or select numbers between 0 and 1. The panel also may contain a button "Add".

Also pictured in FIG. 3 is a rectangle cloud1 "The declaration of the root node may state . . . " that the system draws in response to the mouse hovering over a node, in this case n0, in which the system depicts the Declaration that has been entered into said node n0, its ID, rating (NOT TE in this case), PB, and a Belief, which is a numerical estimate the system has computed based on arguments and challenges of the likelihood declaration has been established.

Also shown in FIG. 3 is the Layout dropdown menu the system displayed in response to a user right-click on the white space (Dropdown1). It contains selectable items for Layout, which if selected may offer a further drop down menu Dropdown11 of alternative graph arranging algorithms that may be used to view the graph redrawn in various ways, Save, which may save changes that have been made to the local version of a shared graph to the common version, Save As, which if selected may allow the user to select a new name to save the edited graph under, thus not overwriting the common graph but potentially starting a new common graph if the user selects to share it or save it in public format, Reload, which may recopy the common graph on the local copy, wiping out local edits that have not been saved, New Graph, which may present new white space to begin construction of a new graph, for example by subsequently using the control panel to add a root node to start said new graph, Load Graph List, which may show the user a list of existing graphs and/or a search bar to allow her to select an existing graph to view or edit, Graph Belief, which may allow the user to toggle on or off the computation of belief values for the nodes, and Citations Ratings, which may toggle on or off using the "citations ratings" scheme that may be described below rather than the standard status (Tentative Establishment) Rating. If Citations Ratings are turned on, the system may evaluate the nodes of the graph according to the citation ratings procedure and draw the graph accordingly.

FIG. 4 is a screen shot of the system of FIG. 3 after the user has written "a new challenge node" in the Head field and "Why the argument of n2 is faulty . . . " in the Declaration field. She has selected n2 as target in the "Edge To:" dropdown, and is in the process of selecting "Challenge" as the edge type in the "As:" field with the Choose Relation Type dropdown menu. This dropdown menu showing edge types is shown still open.

When the Add button is selected, the system may display on the graph the new node, which may be the only node if the graph had been previously new, or which the system may have attached to the graph being edited with the new node attached with an edge of the selected type to the selected target. (This may in this embodiment have updated the data representing the local version of the graph in local memory.) The new node may be displayed as an icon with the running head entered displayed on it. The color of the edge may depend on its type.

Figure 5:
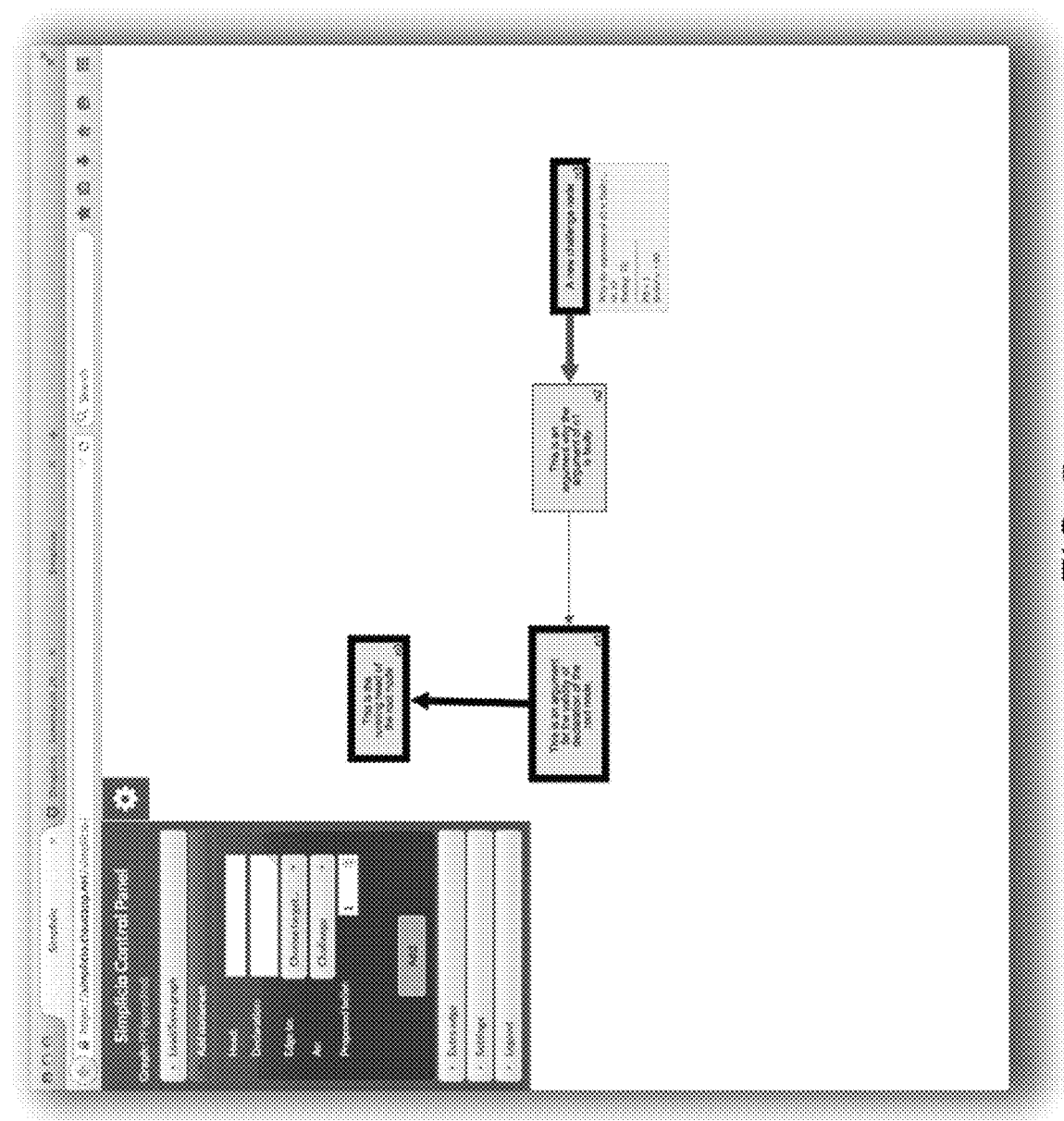
FIG. 5 shows a screenshot of the embodiment of FIG. 3 after further editing.

FIG. 5 shows a screenshot after the Add button is pushed in the situation of FIG. 4. The new node n3 has been added challenging the target n2. The edge running from n3 to n2 is a Challenge edge as shown by its red color (as is the edge running from n2 to n1). The node n2 has the declaration and the running head as entered. In response to the mouse pointer hovering over the node n3, (done in creating FIG. 5, but the mouse pointer itself is not shown because the screenshot doesn't capture it), the system displays its declaration "Why the argument of n2 is faulty . . . ", its ID, its rating, its PB, and its Belief, which is a numerical rating calculated as described below by the system for each node when the likelihood calculations are turned on.

Alternatively, the user could have used the rightclick dropdown menu shown open in FIG. 4 to create a new node. FIG. 4 shows open the View dropdown menu Dropdown2 produced by a right click on node n2. The user could use it to create a new node by selecting AddInNode, in which case the system would present a dropdown menu Dropdown5 (not shown) to select the edge type to connect the new node by, and if he selected challenge the system would pop a window with fields like those in the panel into which he could enter the running head and declaration and Proposed Belief for the new node. If instead he selected AddOutNode, the system would attach the new node to the graph by an edge pointing the opposite direction, so that the node he had rightclicked on (n2 in FIG. 4) would be challenging the new node not challenged by it. Alternatively the user could choose View, in which case the system may pop a window showing the contents of the node (running head, declaration, rating, proposed belief, belief, and in some embodiments other stored data or meta-data such as owner, creator, date of creation, etc.) as a web page, with images rendered and videos playable and hyper-links active, if users have entered such into the node. The option Extra edge to is shown grey-ed out (and thus the system would not register if the user tries to select it) because no node has been selected. If a node had previously been selected (by clicking on it with the mouse) the Extra edge to option may be displayed without being greyed out, and if selected may offer the user an additional drop down to choose the type of edge, which it would then insert into the graph structure between said node and said previously selected node.

Alternatively the user could choose the option Edit from the dropdown menu Dropdown2 illustrated in FIG. 4, in which case the system would respond by popping an edit window for the selected node, n2 in the case of FIG. 4, and allow the user to edit the running head and declaration and other fields associated with said node.

It may be noted that the provision supporting users to add extra edges between existing nodes, or to add outgoing nodes to an existing node, may allow them to use a node simultaneously as an argument for one other statement and a challenge to another, and potentially an assumption of a third and fourth etc. The embodiment may allow a flexible structure to construct an argument or disputation tree, but maintains data describing the relationship of the various statements and arguments entered by the users, and may as each additional change or edit is made, update the ratings of the nodes in the system to reflect the logical status of the statements according to the challenge and argument and assumption edges added to the graph.

Other options include Flag Node, which would flag the node as Frivolous for possible removal by a moderator or after a vote, Remove, which would remove the node from the graph, Axiomatize, which would set an axiomatization flag for the node, axiomatizing the node as will be described below, Collapse Branch, which would change the display by collapsing all the ancestors of the node, and Super Node which would drop a menu of options Dropdown6 for creating a Super Node structure that may be useful for displaying alternative views of the graph and which may be described later.

At this point in FIG. 5, the graph as shown may be a local copy on the user's computer, displayed in his browser. Another centrally stored graph 1.6 may not have been updated. The centrally stored graph (and the data it represents) may still look as it was when it was downloaded and displayed in FIG. 3. If the user saves the graph, for example using the load/save graph button in the dashboard, Controlpanel1, or by right clicking on the whitespace and selecting Save or SaveAs from the Layout dropdown dropdown1 as shown in FIG. 3, a centrally stored inference graph 1.6 may be updated so that other users may be able to view and further edit the graph. The user may also have an option to save a local copy without updating the central shared graph.

It may be that the dropdown menu items may not be the same for all users, and that some options may be grayed out or not shown if the user does not have permission to select the action or the option is otherwise inappropriate. For example in FIG. 3 the "Extra edge to" option is grayed out and can't be selected. If another node had been previously selected by clicking on the display, then the Extra edge to option would not be grayed out, but instead if selected would show a drop down menu to select the edge type, and when that was selected would add an extra edge of the selected type from n2 to the selected node.

Other issues that would cause graying out of nodes may include lack of permission. The nodes may be associated with users who have privileges to edit them, typically the node's creator or the graph's creator or users selected by them, and other users who rightclick on a node they do not have permission to edit may see the Edit option missing or grayed out. The system may store data (metadata) for every node, edge, and graph, indicating which users should be permitted and supported to select which options, including viewing, editing, removing, and/or flagging, each such object.

The system may also impose some constraints on the graphs that it allows users to build. The system may not allow users to construct an edge that causes the graph to have a cycle. The system may check which edges if added would create a loop that can be followed around in the direction of the edges, and if an edge would create such a loop may refuse to add it or may gray out the alternative so the user is not permitted to select it.

Likewise the system may show a drop down menu when an edge is right-clicked, Dropdown3, which may allow the user to select options of move, remove, or challenge the edge. Challenging the edge may insert a small "virtual argument"-type node in the middle of the edge, and may pop a window to allow the user to edit a challenge node, and may then attach the challenge node by a challenge edge pointing from the challenge node to the virtual argument node in the middle of the challenged edge. The virtual argument node may then be edited by users to become a normal argument node, if any user chooses to do so to answer the challenge. For example, if a user rightclicks on the virtual argument node, the system may show him the drop down menu and allow him to edit the node.

The virtual argument node may be treated as an ordinary argument node by the rating system, and hence since it is challenged may be rated NOT-TE initially. Its distinguishing feature is that its Declaration and Running Head are empty, having not yet been edited by a user. Its implication is that its parent (the node the challenged edge originates at) in fact implies its result (the node that was the target of the challenged edge), which now forms two edges, one from the parent to said virtual argument node, and an outgoing one from the virtual argument node to the target node. See FIG. 15 discussed in detail herein.

Thus an embodiment may offer support for users to select actions that build and edit a graph comprised of nodes and directed edges. The nodes and edges may consist of different types, including challenge, argument, assumption, test, suggested edit, citation, and in some embodiments other types such as virtual argument, forced or n-way choice, and negation. The nodes may have associated fields where users can enter data, which may include fields with titles such as: running head, declaration, proposed belief, Likelihood Estimate, Likelihood given target true, Likelihood given target false. The system may save this data associated with each node and use it to maintain a graphical representation and display it to users upon various commands as exemplified above.

As users enter data, the system updates a graphical representation that may be called the Inference Tree or Inference Graph, assigning a rating or score to nodes. A rating, which sometimes is called the status of the node, may be maintained. It is particularly easy to describe the computation of status in embodiments or in graphs where the features of axiomatization and negation nodes or forced-choice nodes are not included. Additionally in the below discussion, Test edges and Suggested Edit edges are ignored for the purpose of computing the status rating of the nodes. The Test and suggested edit nodes themselves are rated, but they do not influence the rating of the nodes their Test and Suggested Edit edges point at. Test edges are influential in some embodiments of ratings and alternative statuses that may be used, for example in the illustrative embodiment the test edges influence the update of Belief as may be described below. But in the embodiments described, the Test edges do not affect the status of Tentative Establishment.

In graphs where no nodes have been axiomatized, or in embodiments without axiomatization, the status rating may take one of two values that we call Tentatively Established or TE and Not Tentatively Established or NOT-TE.

In such embodiments, the rating process may start at the leaves, nodes in the graph with no incoming edges (except they may have incoming Test or Suggested Edit edges, which may be ignored for the purpose of rating calculations.)

In FIG. 3, the only leaf is node n2. The system rates leaves as Tentatively Established and draws their nodes with dark thick (bold) edges. It also considers outgoing edges from TE nodes to be TE and draws them thick and bold, like the challenge edge from n2 to n1 in FIG. 3.

After the leaves are rated, the rating process iteratively proceeds to another node in the graph having the property that all its incoming edges (not counting Test, or Suggested Edit, edges) are from nodes that have already been rated. Those nodes that have one or more edges pointing to a given node are referred to as said given node's parent nodes. As each node is rated, until every node is rated, there must always be an unrated node all of whose parents have been rated, because the graph has no loops. (One such node may be generated by picking any unrated node and following back along edges to unrated parents until reaching an unrated node with no unrated parent.) In the example of FIG. 3, after the leaf n2 is rated, the node n1 may be rated, and then the node n0 may be rated.

When a node is rated, or reference is made to updating its rating, it is rated as TE if all of its incoming challenge edges are NOT-TE (thin), all of its incoming assumption edges are TE (bold), and if it has any incoming argument edges at least one of them must be TE (bold). Otherwise, the node is rated as NOT-TE. If it is TE, the system may draw the node with a bold boundary and its outgoing edges in bold, and if it is NOT-TE the system may draw the node thin and its outgoing edges thin.

In FIG. 3 it is noted that n2 is TE because it is a leaf (EDepth 0), n1 is NOT-TE because it has an incoming bold challenge, and n0 is NOT-TE because its only incoming argument is NOT-TE (thin). In FIG. 5 it is noted that n3 is TE because it is a leaf, n2 is NOT-TE because it has an incoming bold Challenge, n1 is TE because its only incoming Challenge is thin and it has no arguments or assumptions, and n0 is TE because its incoming argument edge is bold.

Note that in FIG. 4, the Declaration of the Root has not been Tentatively Established, because somebody has raised a reason why its only argument is wrong. However, in FIG. 5, a user has explained why the argument against said argument is wrong in turn. Thus based on FIG. 5, the Root is Tentatively Established. There is an argument explaining why it is true, and every argument explaining what's wrong with said argument, has itself been validly rebutted.

Figure 6B:
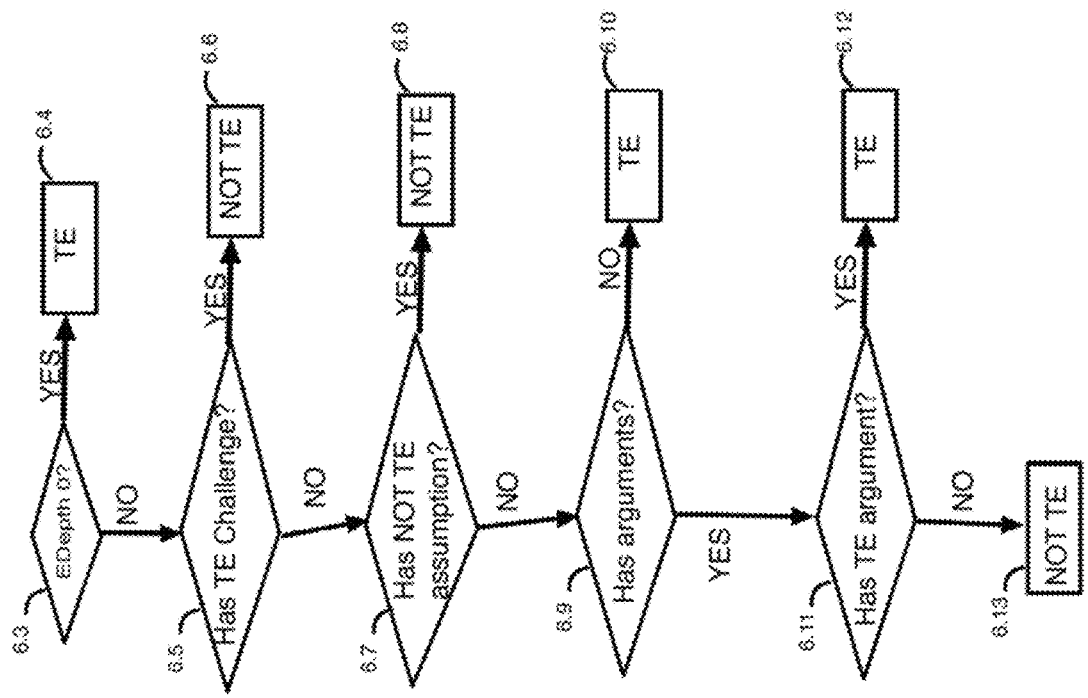
FIGS. 6(a) and 6(b) show flowcharts for a rating algorithm for "status".
Figure 6A:
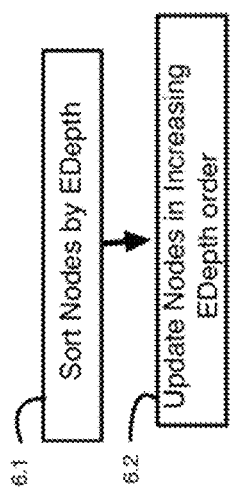

The Rating process is further spelled out with reference to FIGS. 6(a) and 6(b). The EDepth of a node is defined to be the length of the longest path (number of edges) in the graph that runs along the direction of the edges and ends at said node (not including paths that go over Test edges or Suggested Edit edges, or visit more than 2 of a set of n-choice nodes or visit a negation twice in embodiments that include them). So the Edepth of node n3 is 0, of node n2 is 1, of node n1 is 2, and of node n0 is 3, in FIG. 5.

Referring to FIG. 6(a), at block 6.1 the nodes in the graph are sorted by EDepth. Then the nodes are processed in order of increasing Edepth, updating each as it is processed according to FIG. 6(b), at block 6.2

In block 6.3, the processing device determines if the node is Edepth 0, a leaf. If yes, the processing device rates the node TE at block 6.4. If not, the processing device determines if it has a challenge edge incoming from a TE node at block 6.5. If so, at block 6.6, it is NOT-TE.

If not at block 6.7, the processing device determines if it has an assumption edge incoming from a NOT-TE node. If so, it is NOT TE, at block 6.8. If not, at block 6.9, the processing device determines if it has any arguments at all. If not, at block 6.10, the processing device rates it TE. If so, the processing device determines if any of the arguments are TE at block 6.11. If yes, at block 6.12, the node is rated TE. If not, at block 6.13, the node is rated NOT-TE.

The rationale for configuring the system to update ratings like this is that the rating shows (graphically) whether a node has an argument that is not validly challenged and has all of its assumptions also similarly established. A node is TE if it has no TE challenge and all of its Assumptions are TE and if it has any argument, at least one argument is TE. If it has no arguments at all, but has not been validly challenged, the node is considered an argument for itself, and is rated TE. If it has arguments that are NOT-TE, then a TE argument is demanded because users have felt it necessary to supply arguments, and other users had reasons why the arguments supplied were not valid. (If users feel the node actually provides its own argument, they may add a node to so argue.)

In FIG. 3, note that node n2 is outlined in bold, and the challenge edge from n2 to n1 is bold, but nodes n1 and n0 are not bold, and the edge from n1 to n2 is not bold. The bold indicates the status of the node. The embodiment outlines in bold the nodes that are TE, and in thin boundary the nodes that are NOT-TE. Node n2 is bold, and TE, nodes n1 and n0 and NOT-TE. The system renders in bold and considers TE edges outgoing from TE nodes. This is according to FIG. 6. n2 is rated first because it is Edepth 0, and it is TE because it is Edepth 0. N1 is rated next because it is EDepth 1 (since the longest path to it follows the edge from n2 to n1), and it is NOT-TE because it has a TE challenge, cf. blocks 6.5 and 6.6. N0 is rated last, because it is EDepth 2, and it is NOT-TE because its only argument is NOT-TE, cf. block 6.13. Then in FIG. 5, the Challenge n3 is TE, block 6.4, so n2 is NOT-TE, block 6.6, and n1 is TE, block 6.10, since it has no TE challenge and has no arguments or assumptions, and n0 is TE because it now has a TE argument 6.12.

The rating process in this embodiment is straightforward graphically. Start at leaves, and iteratively update a node all of whose parents have already been updated. Leaves are bold (TE) and their outgoing edges are bold. An incoming bold red edge makes a node NOT-TE. If there are none, then an incoming thin blue assumption edge makes a node NOT-TE. If there are none then if there are incoming black argument or citation edges, at least one of them must be bold or the node is NOT-TE, but if there are no incoming arguments, or there is an incoming bold argument, the node is TE.

Figure 7B:
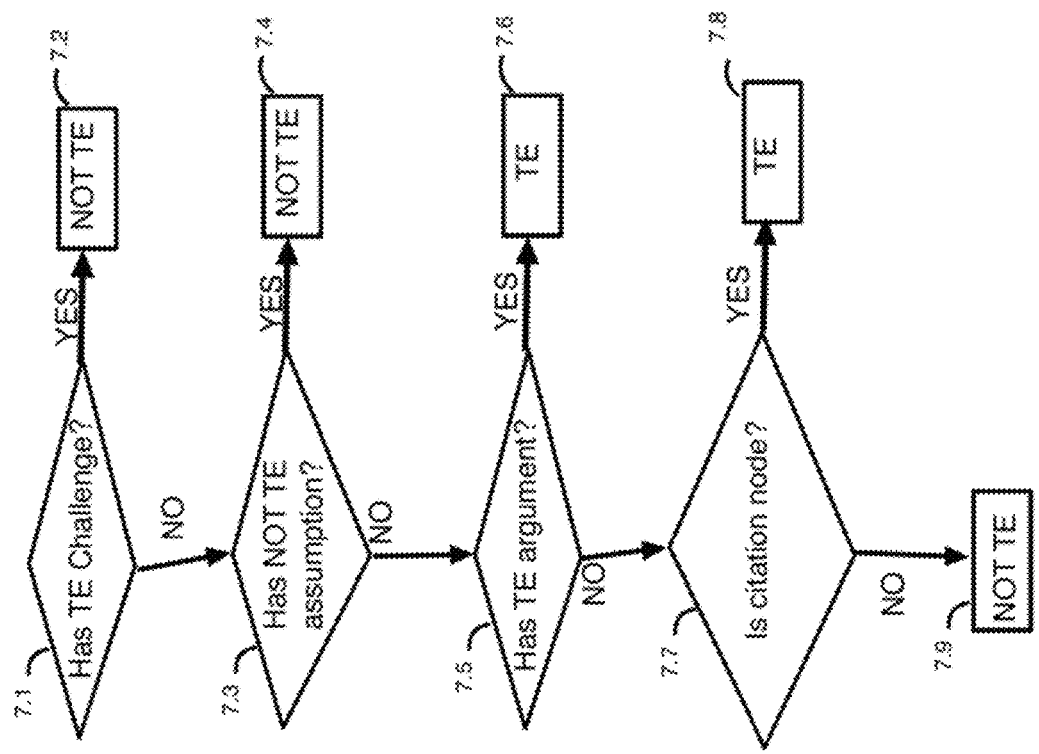
FIGS. 7(a) and 7(b) show flowcharts for an alternative node rating algorithm "Citations Rating".
Figure 7A:
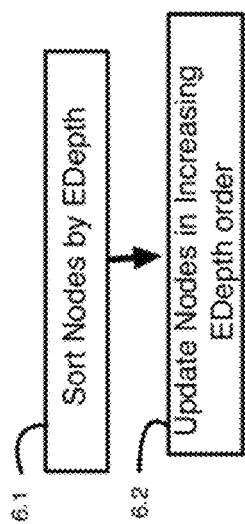

Alternative rating systems may be supported. For example, the "Citations Ratings" option in the illustrative embodiment may be discussed with reference to FIGS. 7(*a*) and 7(*b*). Citations Ratings differs in that it demands every node actually have a TE argument to be TE, or else that it be a citation node. Citation nodes are a type of node. Users may be instructed or agree that Citation nodes should contain and/or represent a link and/or a citation to a paper in the peer-reviewed literature. FIG. 7(*a*) is identical to FIG. 6(*a*), and the system goes through the nodes in the same order updating, but updating using FIG. 7(*b*) (not FIG. 6(*b*)). In FIG. 7(*b*), the system first asks if the node has a TE Challenge, at block 7.1. If yes, it is NOT TE, at block 7.2. If NO, at block 7.3 the system determines if it has a NOT-TE assumption. If so, then it is NOT TE at block 7.4. If not, then the system asks if it has a TE argument at block 7.5. This may include an incoming TE argument edge from an argument node or an incoming TE argument or citation edge from a citation node, as the system may treat citations a special type of argument node.

If yes, it is TE, at block 7.6. If not, then the system determines at block 7.7 if the node is a citation node. If it is, at block 7.8, it is rated TE. Otherwise, it is NOT TE. At block 7.9

This alternative rating scheme demands a node actually have an incoming Argument (or citation) edge from a TE node, or itself be a TE citation, before it is considered TE.

Note that when a citation node is added by an edge to an existing node, the edge may be considered to be an argument edge. When the system determines whether a node has an argument in FIG. 6 or 7, arguments include citation nodes that are the node's parent.

A motivation for the design of citations rating may be that, assuming users use citation nodes to link to the peer-reviewed literature, the embodiment of FIGS. 7(*a*) and 7(*b*) only considers nodes TE if they are grounded in the peer-reviewed literature. Either they themselves represent a peer reviewed article, or they are based on a chain of argumentation grounded on the peer reviewed literature and not validly challenged by any argument grounded on the peer reviewed literature. Alternatively, users may adopt another definition of citation nodes (and possibly rename them) so in this way it is possible for users to restrict TE status to arguments grounded in alternative base criteria of their agreement.

Figure 8:
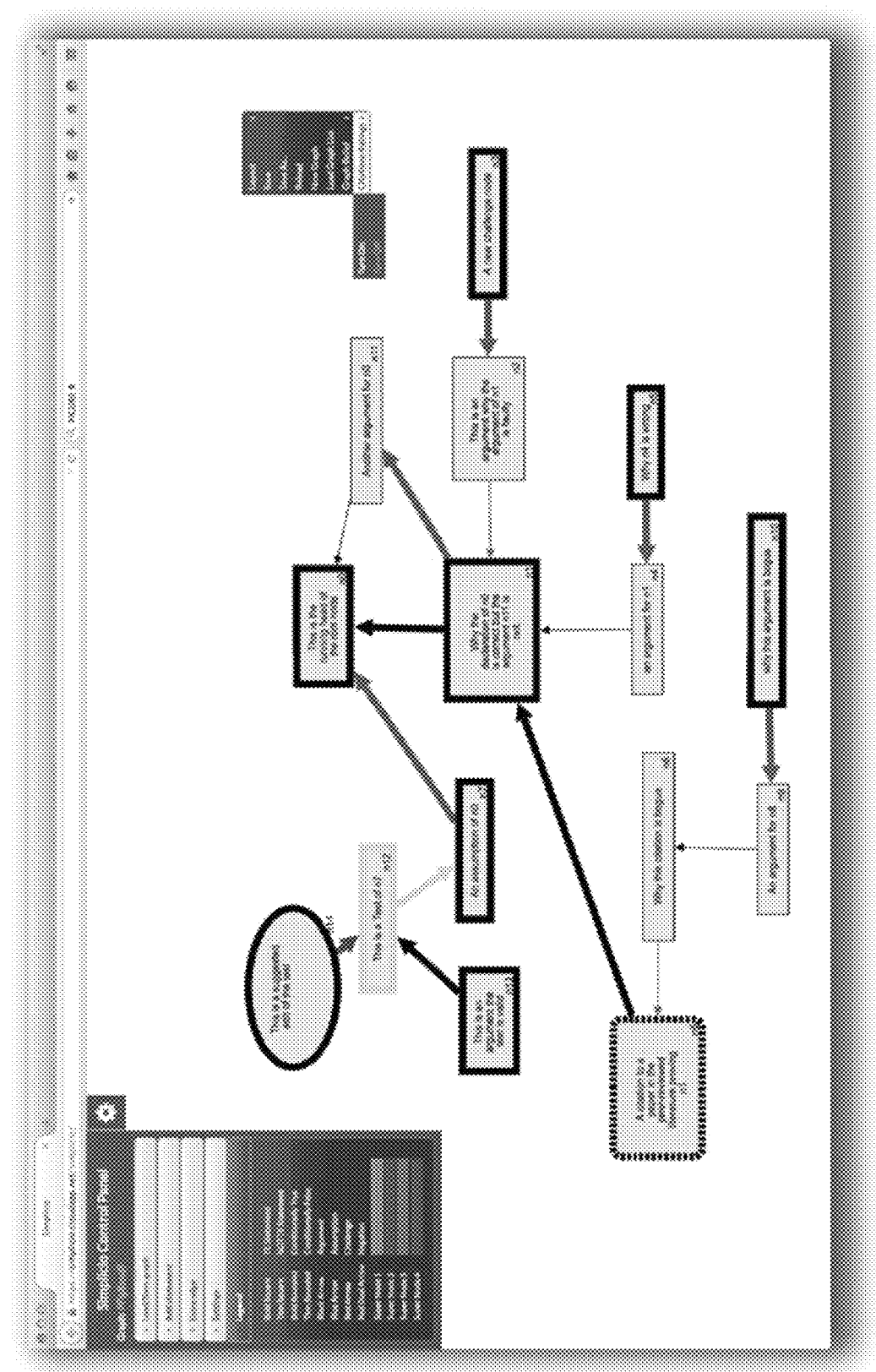
FIG. 8 shows a screenshot of an embodiment displaying a graph rated according to FIGS. 6(a) and 6(b).

FIG. 8 shows a possible extension of the graph of FIG. 5 after users have entered additional nodes n4, 115, n6, 117, n8, 119, n10, n11, n12, n13 and n14. The Simplicio Control Panel Controlpanel1 shown on the left is open, and the Legend button has been selected, opening the legend describing the color code of edges and nodes.

Note that after n11 was added as an argument for n0, an extra edge was added between n1 and n11. Also n1's associated Head and Declaration have been edited. N6 is a citation node, shown by the dashed border, that is serving as an argument of n1. N7 is an assumption of n0, shown by the blue edge. N12 is a Test of n7. N14 is a suggested edit of n12 (as indicated by its oval shape and dark blue arrow). N13 is an argument of n12. N8 is a challenge of n6, n9 is an argument for n8, and n10 is a challenge of n9. N5 challenges n4 which argues for n1.

The system has rated the graph according to FIG. 6. It may begin with nodes n3, n5, n10, n7, n13, or n14, all of which are Edepth 0. (Note n7 has an incoming Test edge but this doesn't affect the fact it has no incoming edge of type argument, challenge, or assumption and is thus Edepth 0). These nodes are all rated TE by block 6.4. Then it may update the Edepth 1 nodes, n2, 114, n9 (which are all NOT-TE at block 6.6 since they are all challenged by TE nodes) and n12 (which is TE at block 6.12 since it has a TE argument.) Next it may update the Edepth 2 node n8 (NOT TE at block 6.13 since its only argument is NOT TE). Next the system may update the Edepth 3 node n6 (TE at block 6.10). Next it may update the Edepth 4 node n1 (TE at block 6.12). Next it may update the Edepth 5 node n11 (NOT TE at block 6.6). Finally it may update the Edepth 6 root n0, which is TE at block 6.12. The topic node of this graph is TE because it has a TE argument and its only assumption is TE and it is unchallenged.

Figure 9:
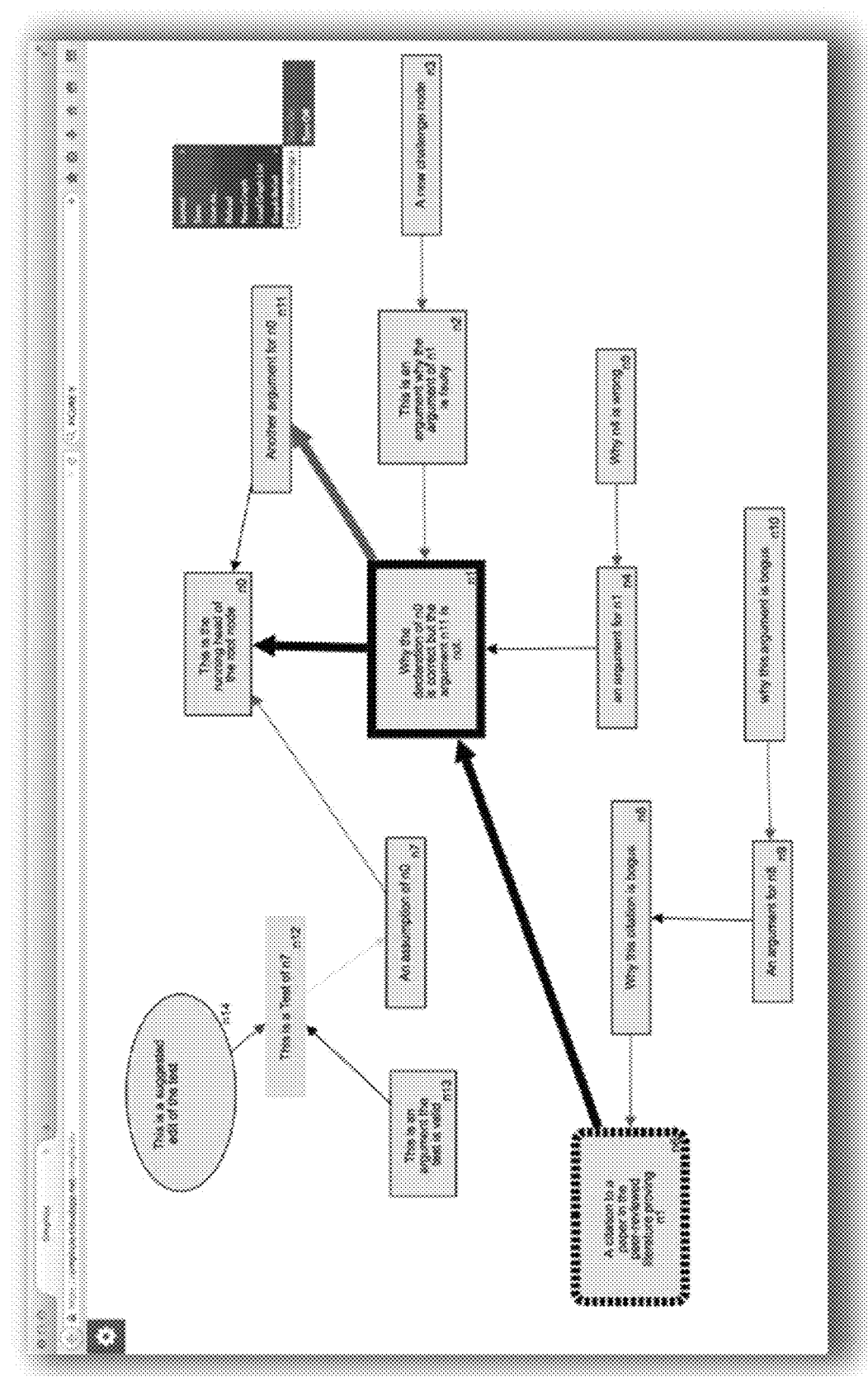
FIG. 9 shows a screenshot of an embodiment displaying the same graph as FIG. 8 rated according to FIGS. 7(a) and 7(B).

FIG. 9 shows the graph of FIG. 8, only after CITATIONS RATINGS have been turned on, instead of the Status rating. (in the upper right corner, the Layout dropdown menu (Dropdown1 displayed by the system when a user right-clicks on the whitespace) is visible, and the user has further selected "Citations Ratings" causing a further dropdown menu Dropdown14 to be displayed, allowing selection of "Turn Off" and in the Present picture greying out "Turn On". Since Turn On is greyed out in FIG. 9, and Turn Off is available, this indicates the system is currently displaying Citation ratings (they are currently turned on). This is in contrast to the Citations Ratings menu displayed in FIG. 8, in which Turn On was made available and Turn Off was greyed out, since FIG. 8 shows the system performing its default status rating, rather than the alternative "citations ratings".

Note that under Citations Ratings, the only TE nodes are nodes n6 and n1. N0 has a TE argument based on said citation node, namely the edge from n1, but its assumption n7 is NOT TE as it has no support from a citation, and hence n0 is NOT-TE by block 6.8 in FIG. 7. No other nodes have an argument based on a citation node (of which the only one in this graph is n6). For example, node n3 is NOT TE by block 7.3 and nodes n2 and n12 etc. are also NOT TE by block 7.3.

The illustrative embodiment supports an additional feature referred to as axiomatization, or sometimes stipulation or postulation. As was illustrated in FIG. 3, if users right-click on a node, the system may display a dropdown menu Dropdown2 including Axiomatize as an option. If the user selects the axiomatize option, the system may mark the node as axiomatized, storing data indicating that fact, and may display indication the node is axiomatized on the displayed graph, for example coloring the node green. When nodes are axiomatized, the status rating of nodes may be drawn from a wider set of values.

The motivation for supporting the axiomatize feature is that users may have irreconcilable differences over the truth of some statements. Axiomatization allows them to define a variable representing the truth of a node, and to rate the rest of the graph under the assumption the axiomatized node is true or TE, and also to work out the rating consequences under the assumption it is false or NOT-TE.

In a sense the system thus may provide all parties means for narrowing their disagreements, for example by repeatedly breaking arguments up into compound argument graphs until only relatively-concise well-described portions of the argument are challenged. And once they can refine the disagreement no further, the system may thus provide means to see what the consequences of one disputant being correct are (if the challenge is abandoned), and to see that the consequence if the other party is correct (the challenge is valid), in which case the tentative establishment of downstream statements would also be invalidated if their tentative establishment depends on the TE C or TE status of the challenged node.

The downstream propagation of the effects of the axiomatization may attach the variable representing a particular axiomatized node having a particular statement to precisely those nodes (and thus statements) depending on the tentative establishment of said node in order to be tentatively established, which may be determined purely from the graph structure according to the definition of tentative establishment, (without needing to understand the substance of any entries) and so may be simply assigned by the automated system.

In one embodiment, the status rating with axiomatization may take values among the set: {Tentatively Established, Not Tentatively Established, Tentatively Established Subject to Condition} which are abbreviated TE, NOT-TE, TE C respectively. For nodes that have rating TE C, there is further maintained a condition. A respective Boolean variable may be allocated and intended or designated to represent or correspond to the truth of each respective axiomatized node. The condition of each TE C node (and hence its associated declaration etc.) may be a Boolean expression over (some of) said Boolean variables and their negations.

The system may further maintain an additional datum "True" or "False" for each TE C node according to whether its condition would be true under the assumption that all the axiomatized nodes are true or respectively is false under this assumption that all the axiomatized nodes are true. As entries are made and edited in the data structure, the system may update the rating of nodes according to an algorithm.

A node may be rated as TE, if it would be established by an argument that would not be validly challenged for any possible assignment of the value TE to some axiomatized nodes and NOT-TE to other axiomatized nodes. Its truth doesn't depend on the assignment of T or F to the axiomatized nodes and their respective Boolean variables, and it is referred to as TE.

A node will be rated as TE C with condition, if the node would be TE for some assignments of TE and NOT-TE to the axiomatized nodes, and NOT-TE for other assignments of values to the axiomatized nodes. Its condition will be a Boolean expression over the respective Boolean variables corresponding to the axiomatized nodes, more specifically a Boolean expression that is defined by being true for precisely those assignments of T and F to the respective Boolean variables such that if the respective axiomatized nodes were set to TE or NOT-TE respectively, and the rest of the graph were updated, said node's rating would be TE.

FIG. 6 and the discussion has explained how to rate a graph if there are no axiomatizations. If there are axiomatizations, then a node is TE if it would be TE according to FIG. 6 no matter whether each of the axiomatized nodes is fixed to be TE or is fixed to be NOT TE and the rating of the rest of the graph is updated. If the node's rating according to FIG. 6 does not depend on the rating of any axiomatized node in the graph and is TE for all possible ratings of axiomatized nodes, then the node is TE. If there is a way to replace some of the axiomatized nodes with TE and some of the axiomatized nodes with NOT-TE and update and make the node TE, and another way to assign ratings to the axiomatized nodes that would make said node's rating NOT-TE, then said node may be rated TE C.

If a TE argument is modeled as a proof of its target, conditional on the target's Assumptions also being TE, and no disproof (TE challenge) being present, then a node may be considered TE if it has a proof and no disproof for any assignment to the axiomatized nodes. If its proof depends, however, on some axiomatized nodes being assumed true or false, or if a disproof would be established for some choice of values for the axiomatized nodes, then it may be TE C with a condition expressing the condition upon which the proof and/or lack of disproof depends.

The update process for embodiments supporting axiomatization may be further explicated with reference to FIGS. 10(a) and 10(b). To update a graph with axiomatized nodes, the system may first at block 6.1 sort the nodes in the graph by increasing EDepth. Here again the EDepth of a node may be the length of the longest path, following edge arrows, not including Test or Suggested Edit edges, that ends at said node. Next, at block 10.20, the nodes may be updated in order of increasing EDepth, updating each node in turn according to FIG. 10(b). Updating the nodes in order of EDepth ensures that when each node is updated, its parents, if it has any, have already been updated since they must all be of shorter EDepth, for if one were not of lesser EDepth, the longest path to it plus its edge to the said each node would be a longer path to said each node proving a contradiction to the hypothesis said one were not of lesser EDepth.

The update of a node according to FIG. 10(b) begins in block 10.1 by asking if the node is axiomatized, which may occur if a user with permission to do so had selected a button provided by the system to axiomatize the node, upon which the embodiment would store an annotation associated with the node indicating that it was axiomatized. If yes, then the nodes rating at block 10.2 is TE C, with the condition T_N, where T_N may be a Boolean variable allocated to the node (N may represent its node ID). Also it is considered TE C True, reflecting the fact that its condition is true if all of the axiomatization variables of the graph are assumed true. (Its condition T_N is true if T_N is set True, so it is True if all axiomatization variables are set true since T_N is one of them.) An illustrative embodiment displays nodes that are TE C with rounded corners to distinguish them from nodes that do not have conditional status, and draws the nodes which are TE C True with bold boundaries and bold outgoing edges as if they were TE, and the ones which are TE C False with thin boundaries and thin outgoing edges, as if they were NOT-TE.

Figure 11:
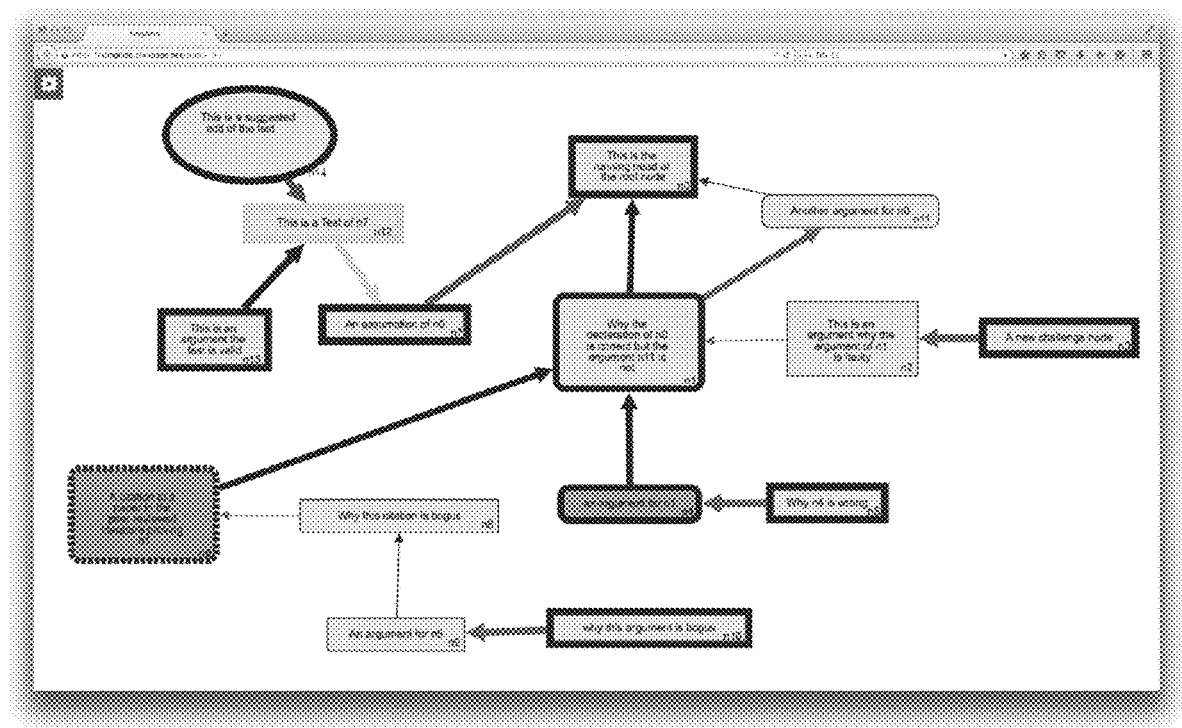
FIG. 11 shows a screenshot of an embodiment displaying the graph of FIG. 8 after a node has been axiomatized and the graph rated according to FIGS. 10(a) and 10(b).

FIG. 11 shows the graph of FIG. 8, after Nodes n6 and n4 have been axiomatized, as shown by their green color and rounded corners. Node n1 is TE C True as shown by its rounded corners and bold edge, and node n11 is TE C False as shown by its rounded corners and thin edge.

If the node is not axiomatized, the system determines at block 10.3 if the node is EDepth 0. If it is, then at block 10.4 it is TE. If not, then at block 10.5 the system asks whether it passes any of the following tests: either (has a Challenge from TE Node), OR (has NOT-TE Assumption), OR (Has arguments, but all of them are NOT-TE)? Any of those three alternatives cause the node to be declared NOT TE at block 10.6. (As usual note Citations may be considered a sub-type of arguments.)

Otherwise the system determines at block 10.7 if there is [(NO Challenge from a TE C Node) AND (NO TE C Assumptions) AND ((has TE Argument) OR (has No Argument))]? If all those conditions are met, the node may be set to TE at block 10.8. Another way of explaining is, any challenge from a TE C node may contribute a condition, because the node would not be True when the challenge node was True. Any condition on an assumption may contribute a condition, because the assumptions may be required to all be true for the node to be considered true. And if none of its arguments are TE, and it has TE C arguments, then they should contribute a condition because in this embodiment the node may only be considered true on the condition it has at least one true argument. If the answer is NO, at block 10.9, then the system may compute a condition X by combining the contributions of the parents' conditions. The condition X is set to equal $$(AND(C1, C2, \ldots, Cn) AND(OR(A1, A2, \ldots, An))$$
$$AND\ NOT(OR(D1, D2, \ldots, Dn)))$$

where
Ci are the conditions of TE C assumptions if any and
Di are the conditions of TE C challenges if any and
Ai are the conditions of TE C arguments if there are TE C arguments but no TE ones.

If there are TE arguments (or TE citations) supporting the node, they would count as if they were a TE C argument with condition always True, so the conditions of the other TE C arguments or citations become irrelevant, and there is no contribution to the condition of the node from its arguments and citations. This Boolean expression monitors exactly which assignments of True and False to the axiomatization variables $T\_N$ render the proper conditions on the parents of said node so that none of the Challenges' conditions are True, all of the assumptions' conditions (if any) are, and if it has no TE argument and at least one TE C argument, then at least one argument is True.

After X is computed, the system may next check at block 10.10 if X is tautologically true, that is, if every possible assignment of True or False to the axiomatization variables contained in the expression X will render the expression to have a true value, then at block 10.11 the system may set the node to TE. The node has been found to be TE independent of the nodes that have been axiomatized. Since in graphs there may typically be a finite number of nodes, and a small number of them may have normally been axiomatized, one may check for tautological truth by simply exhaustively checking the Boolean expression X, methodically running through the powerset of assignments of true or false to the axiomatization variables $T\_N$ contained within it to see if it is True for all assignments, or if it is False for all assignments. If it is true for all assignments, it may be referred to as tautologically true, and if it is false for all assignments it may be referred to as tautologically false.

Alternatively for each variable in X, one may check whether, for every possible assignment of the other variables, the Truth or Falsehood of X is the same whether $T\_N$ is set true or set false. If that happens, X is independent of $T\_N$, and may be simplified by replacing $T\_N$ within X by True and simplifying. If X is of form such that all variables within X may be so stripped out, so it depends on none of them, it may be found to be either tautologically True or tautologically False depending on the value reached.

Alternatively tautology may be checked using simplification rules. Some alternative embodiments may quit if they don't find a tautology in a cutoff time, and assume none exists.

If X is found instead to be tautologically false (the condition X is not made true by any assignment of True to some axiomatized node's variables and False to other axiomatized nodes' variables) then the node may be declared NOT TE at block 10.13. Typically in practice nodes at block 10.10 and at block 10.12 may be combined into one search over the powerset of variable assignments. Alternative embodiments may omit the blocks 10.10 and 10.12 going straight from block 10.9 to block 10.14.

While the tautology check is being done, the system may discover that the truth value of X is independent of some of the variables its expression contains. For example, if the expression X were $T\_1\ AND\ (T\_2\ OR\ NOT\ (T\_2))$, the truth value of X would be independent of $T\_2$. In such circumstances, the tautology checker may reduce the expression of X by setting variables X does not depend on to True or False within it, and reducing the expression, and replacing X by the reduced version of X. In this instance X may be reduced to $T\_1$. The system may save a list associated with each node that is TE C of the axiomatization variables its condition depends on, and may strike a variable from this list when it detects that the truth of falsehood of said condition is never changed by simply changing the truth or falsehood of said variable, and may display this list to users.

Finally if the condition X is found to be neither always true nor always false when evaluated for axiomatized node assignments, the node is rated TE C with condition X at block 10.14.

In FIG. 11, the graph of FIG. 8 has been modified by axiomatizing nodes n4 and n6. The rating of nodes that are not downstream from the axiomatized nodes, is not affected by the axiomatization and remains the same as it was in FIG. 8. So the Edepth 0—nodes n3, n5, n10, n7, n13, and n14, as well as the Edepth1 nodes n2, n12, and n9, as well as the Edepth 2 node n8, all have ratings the same as in FIG. 8. However the axiomatization of nodes n4 and n6 respectively renders n4 TE C with condition $T\_N4$ according to 10.2, and renders n6 TE C with condition $T\_n6$ according to 10.2. The axiomatization of n4 and n6 has been displayed in their green color. These are both also TE C True, since both conditions are true if the axiomatization variables (namely $T\_n4$ and $T\_n6$) are assumed true so the nodes are rendered with bold edges (and rounded corners, showing their conditional status). N6 is also shown with dashed border, which indicates it is a citation node. Then Edepth 4 node n1 is rated to be TE C with condition $(T\_n6 || T\_n4)$ (that is, $T\_n6$ OR $T\_n4$) according to blocks 10.9 and 10.14. Since this condition is true if all the axiomatization variables are true, namely here $T\_n4$ and $T\_n6$, node n1 is TE C True and drawn with bold border, as well as rounded corners to indicate its conditional status. Next Edepth 5 node n11 is rated as TE C with condition $NOT(T\_n6 || T\_n4)$ (that is (NOT $(T\_n6$ OR $T\_n4$))). Since this condition is false if all of the axiomatization variables are assumed true, node n11 is considered TE C FALSE and drawn with thin border. It also has rounded corners because it has conditional status. Under the assumption that both nodes n4 and n6 are false, node n11 has been tentatively established true. The condition of node n11 in some embodiments may be displayed to users who select an offered command to display it.

Finally Edepth 6 node n0 may be updated. This node is TE by block 10.11 because its condition X according to block 10.9 would be $((T\_n6 || T\_n4) || NOT(T\_n6 || T\_n4))$ that is to say (T_n6 OR T_n4) OR (NOT (T_n6 OR T_n4)). Since this is true for any assignment of T or F to T_n6 and T_n4 whatsoever, it is tautologically true. Hence Node n0 is rated TE and drawn with sharp corners and bold border. In essence, there are two conflicting arguments for n0. Under the hypotheses assumed in the axiomatization, a first of these is true. But when it is not, the second is true, so n0 may be considered TE.

Figure 24:
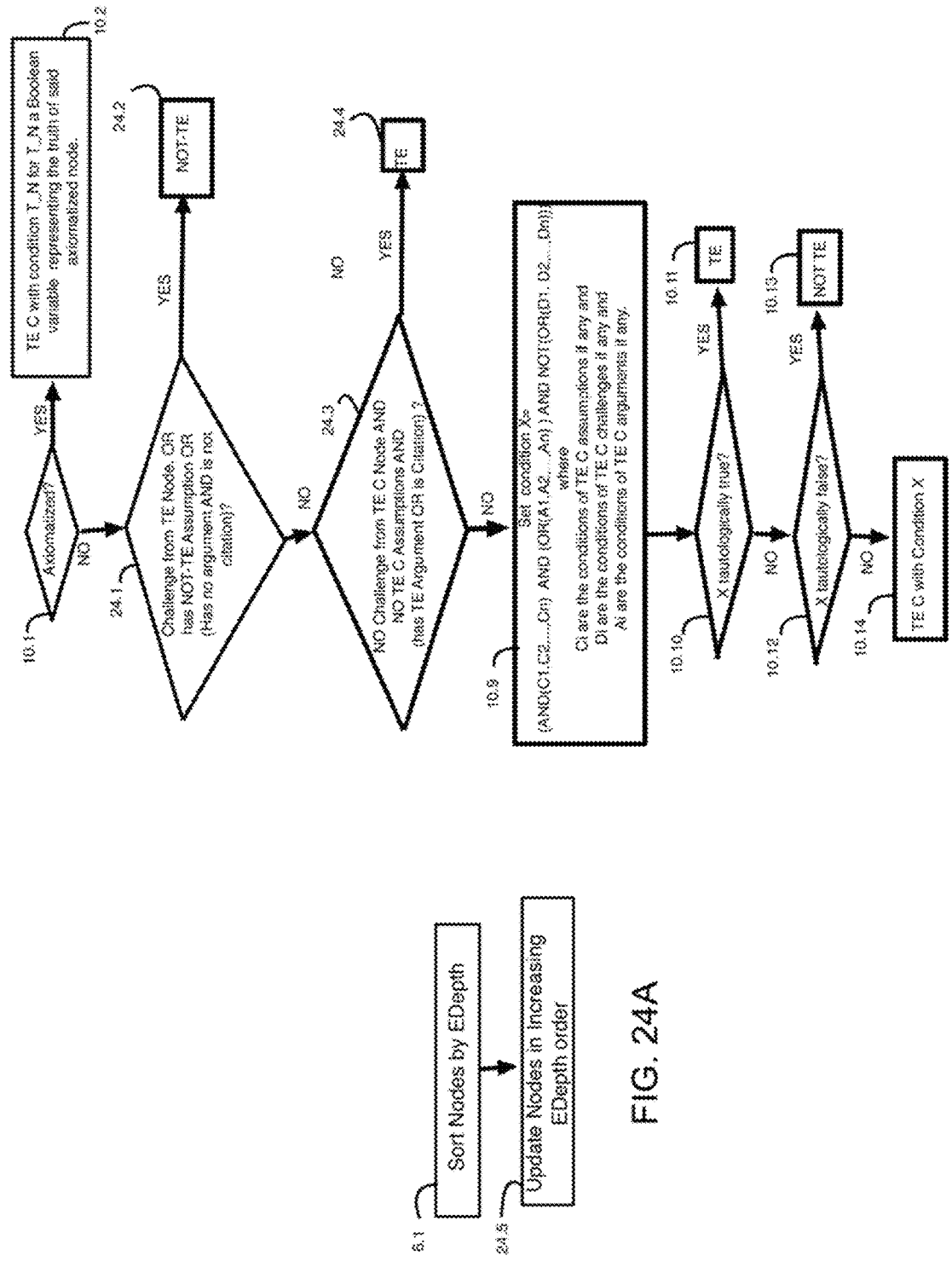
FIGS. 24(a) and 24(b) are flow charts for updating Citations Rating with axiomatization.

It is also possible to employ axiomatization with Citations Rating. FIG. 24 describes the modification. The conditions are handled as in FIG. 10, but again truth must be grounded in a citation, or an axiomatized node. An unaxiomatized EDepth-0 node will be handled by block 24.1 if it is not a citation because it will also have no argument, so it will be rated NOT-TE at block 24.2 It will be handled by block 24.4 if it is a citation. A node will be rated as TE if it has a TE argument or is itself a citation, and is not challenged by any TE or TE C nodes, and does not have any assumptions that are NOT-TE. It will be rated as NOT TE if it does not have a TE or TE C argument and is not itself a Citation, or if it has a TE challenge or not TE assumption. The conditional status is otherwise handled as before, for axiomatized nodes by block 10.2, and for other nodes it is inherited from parents according to block 10.9.

Figure 25:
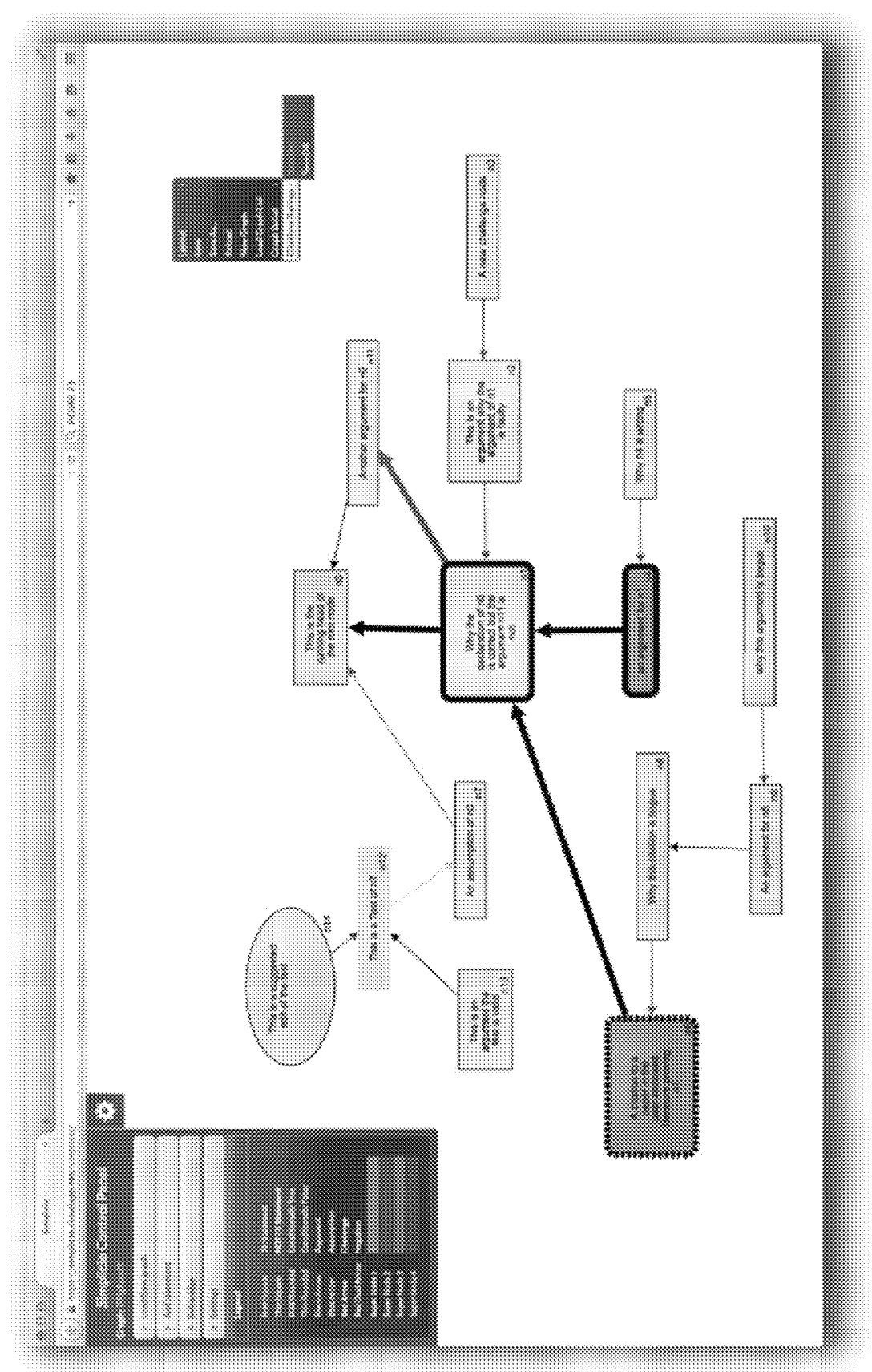

FIG. 25 shows a screenshot of the Graph of FIG. 11 with Citations rating turned on. Nodes n3, n5, n7, n10, n13, n14, n2, n9, and n12 are all NOT-TE because they are not supported by a TE argument or citation. N4 would also be, but since it is axiomatized, its rating is TE C T_n4, by block 10.2, which is TE True. (Continuing in EDepth order) n8 is NOT TE because it has no TE argument and is not a citation. N6 is a citation, but it is also axiomatized in the graph, so its rating by block 10.2 is TE C with condition T_n6, which makes it TE C True, so it is drawn with rounded corners and bold (dashed because it's a citation) border. The node n1 is TE C True with condition T_n6∥T_n4 by block 10.9. Next n11 is NOT TE because it has no support from a TE argument or citation, at block 24.2. Finally n0 is NOT TE because it has a NOT TE assumption, at block 24.2

Some embodiments may support additional node types that may have specific update rules. An illustrative embodiment may support n-way choice nodes, or negation nodes, which may be n-way choice nodes for n=2. The system may allow users to create negation nodes or n-way choice nodes by means similar to how they create and edit other types of nodes. For example, in the drop down menu Dropdown1 shown open on the dashboard Controlpanel1 in FIG. 4, the next alternative is Negation, which in this embodiment may create the new node, when the Add button is selected, as a Negation node to node n2. Alternatively some embodiments may offer an "Add n-way choice node" button, that when selected adds a set of n nodes, for "n" a user configurable parameter. Or alternatively an embodiment may offer to create an additional node alternative to a selected node, and its existing alternatives. Users may then add nodes to the set, and at any given time the system would consider that a choice is to be made between the alternatives that have been given, so that at most one of them is expected to be TE.

A motivation for supporting n-way choice nodes, or negation nodes, may be that they may help users to graph decisions in which they wish to make a forced choice between a number of alternatives. It is a principle of logic that one and only one of a proposition and its negation is true. Negation nodes may represent a statement in one node, and its negation in the other node. An alternative example may be that if a firm wishes to hire a candidate, they may wish to create a graph with a 4-way alternative to help decide which of 4 candidates they want to hire, or they may wish to create a graph with a 5 way alternative to help decide which of 4 candidates or a node representing none-of-the-above they wish to hire. The system may update ratings that consider one of a set of n-choice nodes to be TE only when there is an argument for it that is not validly challenged, and there is no such argument for any of the other choice nodes. An argument for one choice node is thus in a sense a challenge of the others.

N-way choice nodes may be represented as if every pair of them has a bi-directional edge between it. Or they may be represented by a hyper-edge that connects n nodes and has the same effects. (The only difference may be visual representation in displays.) The system maintains data indicating that they are alternatives in an n-way choice. Bidirectional edges between each pair may or may not be displayed on the graph depending on the embodiment, but they may be considered implicit. However, the system may enforce the rule that users may not be offered the permission to create any edge that would allow a closed directed loop on the graph, including any loops that would be formed using bidirectional edges assumed between each pair of members within each n-way set. With n-way alternative nodes or negation nodes, the definition of Edepth may restrict the paths defining the Edepth of each node to visit no more than 2 of the alternative nodes (nor the same one twice), so that for example no such path could go both ways along a bidirectional negation edge, but paths that go one way along a bidirectional negation edge (or jump between two alternatives in cases where the bidirectional edges are not displayed) may be allowed.

Motivated by the above discussion, in order to compute when there is an argument for a particular choice that nobody has a valid objection to, the system should ensure that nobody has a valid argument supporting an alternative choice, for that would in effect constitute a valid objection to said particular choice. So assuming no axiomatizations, a node in the n-way choice may be rated TE when there is a TE argument for it, and all its assumptions are TE, and it has no TE challenge, and there is no similar case for any other choice node, ie no other alternative also has a TE argument for it, and all its assumptions are TE, and it has no TE challenge. A node in an n-way choice may be rated NOT-TE when there is a TE argument for some other alternative, (and said other alternative's assumptions are TE and it has no TE challenges) whether or not there is a TE argument for said node itself. In the case where there are TE arguments for more than one alternative, all of the alternatives may be rated NOT-TE.

The embodiment may add axiomatization into this by rating a forced-choice node TE in those cases (ie assignments of TRUE or FALSE to axiomatization variables) when said forced-choice node would be made TE and none of its alternatives would be. So the node may be rated TE when there is a TE argument for it, and all its assumptions are TE, and it has no TE or TE C challenge, and there is no case for any other choice node, ie no other alternative also has a TE or TE C argument for it, and all its assumptions are TE or TE C, and it has no TE or TE C challenge. A node in an n-way choice may be rated NOT-TE when there is a TE argument for some other alternative, (and said other alternative's assumptions are TE and it has no TE or TE C challenges) whether or not there is a TE or TE C argument for said node itself.

Note the system, in some embodiments, may check to ensure that only one of a set of choice alternatives may be axiomatized, not offering users an option to axiomatize a node in a choice set while another one is axiomatized, just as the system may check and not allow a node to be axiomatized if a node that challenges it or is challenged by it is already axiomatized.

When n-way choice nodes are included, the EDepth of a node may be defined as the length of the longest path ending on the node comprised of argument, assumption, challenge, citation, and n-way choice edges, but including at most one n-way choice edge in each n-way set. That is to say, the longest path defining the Edepth of a node is not allowed to pass through more than 2 members of any set of forced-choice alternatives, nor the same member twice.

Now it may be seen that the E-depth of any two members of an n-way choice may not differ by more than 1. To show this, assume hypothetically the contradiction that the deepest member of the set was 2 or more deeper than a shallower alternative. The longest path to a set of alternatives may always contain the edge between two of the alternative nodes as its last, or else a longer path to an alternative would be immediate by tacking on the edge to it. Then the last edge may not have been from said shallower alternative to said deepest member, for then the latter would be 1 deeper not 2. So it may have been from another alternative. But this is also a contradiction, because then a deeper path may be constructed to said putative shallower one, by making the last edge of the path go to said (hypothesized) shallower node rather than said (hypothesized) deeper one. Hence there is a contradiction, and the maximum possible depth difference between two alternative nodes may be 1.

In one embodiment, a system may define a rating update for n-way choice nodes according to FIGS. 12(*a*), 12(*b*) and 12(*c*). First at block 12.1, the nodes in the graph may be sorted by EDepth. Then the system may go through the nodes in the graph in order of increasing EDepth from 0 on up, updating each node according to FIG. 12(*b*).

In FIG. 12(*b*), to evaluate a node, the system may first ask at block 12.3 whether it is or is not an n-choice node. If it is not, the system may then go to block 12.5, and update the node as has been previously described for non-choice nodes. Depending on the embodiment, FIGS. 10(*b*), 6(*b*), and 7(*b*) and 24(*b*) have been discussed as alternative update rules. If however the node is a choice node, then the system proceeds to evaluate it and the other choice nodes that are its alternatives according to FIG. 12(*c*). Note that since the set of partner nodes differ in depth by at most 1, updating all of the choice nodes when the shallowest one is updated may involve updating only nodes that have already had all of their respective parents updated. If one assumes hypothetically that there was an unupdated parent of one alternative, there may again be a contradiction because a longer path (longer than its assumed shallowest Edepth) to said shallowest alternative would pass through said un-updated parent (which must be at least as deep to still be un-updated) and said one of them that has not had all its parents updated and the negation connection between said one of them and said such shallowest alternative.

The system, as shown in FIG. 12(*c*), evaluates each of the n alternatives by rating it independently as if it were not a choice node and assuming its edges to the other choice nodes were not there, according to block 12.5 as if it were any other type of node. The rating that is computed in this way is saved as a temporary value. At the end of this step, the system may provide a list U1, U2, . . . , UN with a temporary value for each i in {1, 2, . . . , n}, each of the alternatives in the choice.

Next, at block 12.7, the system may form a list of n conditions Ci for i in {1, 2, . . . , n}. Ci will be TRUE if Ui was found to be TE. Ci will be FALSE if Ui was found to be NOT-TE. And Ci will be the condition condition_i of Ui, if Ui was found to be TE C with condition_i.

The motivation of this is Ci expresses under what conditions the node i is tentatively established, (with the bidirectional edges cut, not yet taking into account any support for its alternatives). If it's TE, it's established under all conditions, so Ci is True. If it's NOT TE it's established under no conditions, so Ci is False. And if it's TE C with some condition Xi, then Ci will be Xi If node i is axiomatized, then Ci will be T_Ni, that is the axiomatization variable declared by the axiomatization and assigned to the node of alternative i. The point of this may be that each Ci represents the states where alternative i has been independently established. This means, that for such conditions, none of the other nodes should be anything other than NOT-TE, (because proof of one node is disproof of another). For these conditions, this node may be considered true or established if not encumbered by a similar case for another alternative. If one alternative is axiomatized, however, that trumps even other nodes j that have a TE rating Uj. Axiomatization represents an assumption the node is in fact true, which may contradict other established arguments. (Embodiments may be configured so as to not present the option to users to create directly competing assumptions, that is axiomatizaton of two nodes such that one challenges or is an exclusive alternative to the other (as expressed using forced-choice nodes.) The point of axiomatization is to support users in making hypotheses that may contradict posted arguments and verifying their consequences for what can and can't be tentatively established under such hypotheses.

Next in block 12.8 a list $D_1, \ldots, Dn$ may be computed by the system for i in $\{1, \ldots, n\}$. Each Di may be defined as the conjunction of Ci with the negation of Cj for all j other than i in $\{1, \ldots, n\}$. For example, in a 3-way choice, D1 would be C1 AND (NOT(C2)) AND (NOT (C3)). D2 would be (NOT(C1)) AND C2 AND (NOT (C3)). D3 would be (NOT(C1)) AND (NOT(C2)) AND C3). Note that as stated, for any i such the Ci is TRUE, the system may set Dj to False for all alternatives j different than i, without bothering to compute the conjunction, because it is ANDed with a FALSE term, unless j is axiomatized. And for any i such that Ci is FALSE, Di may be set to FALSE and Ci may be omitted from all the other conjunctions, simplifying them, since it appears as its negation (which is then TRUE) which is conjoined into them, And conjoining TRUE with any logical expression X to form TRUE AND X does not affect its truth value, it is still the same as whatever X's value is.

If alternative i is axiomatized, then its rating is set to T_Ni, where T_Ni is an axiomatization variable declared by axiomatizing said node (alternative i, also labelled here as Ni.) If n is 2, so that there is a 2-way choice (which may also be known as negation nodes), the system may also set D_j to be NOT(T_Ni) when node i is axiomatized, for j the negation or partner of i. This may be because for a forced choice, assuming it is not the first choice may be considered to be assuming it is the second and vice versa. However for n>2, the assumption that one alternative is FALSE does not imply the assumption that any particular alternative is true. Then in block 12.9, the system may set each of the alternatives rating according to its Di. If Di is TRUE, node i is rated TE. If it is FALSE, node i is rated NOT TE. And otherwise, the node i is rated TE C with condition Di.

Figure 13:
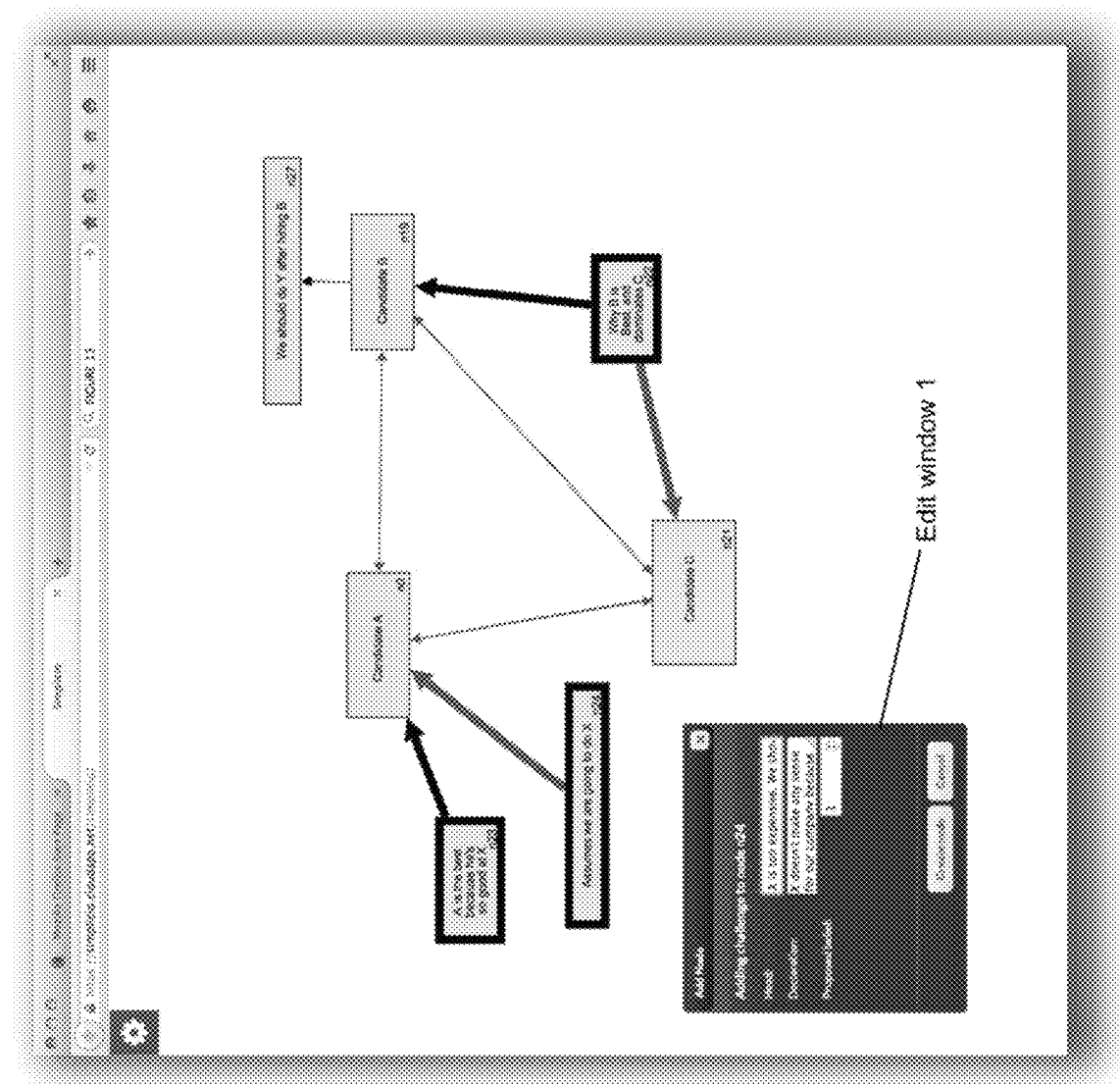
FIG. 13 shows a screenshot of an embodiment displaying an example rating with n-way nodes.

FIG. 13 shows an example graph with a 3-way choice node. Candidate A n0, Candidate B n19, and Candidate C n21 are 3 alternative choices, as shown by their being connected by double-pointed arrows. The ratings may be obtained according to FIG. 12 as follows. The EDepth 0 nodes n22, n23, n24), are all TE by blocks 12.5 and 10.4. Then the system may compute a temporary value U1 corresponding to Candidate A, n0, and temporary value U2 corresponding to Candidate B, n19, and a temporary value U3 corresponding to Candidate C n21. U1, and U2 are TE by blocks 12.6 and 10.8 and U3 is NOT-TE by blocks 12.6 and 10.6 since its node has a TE challenge. Next C1 and C2 are found to be TRUE and C3 is found to be FALSE by block 12.7. Then in block 12.8 D1 is set to TRUE AND NOT (TRUE) AND NOT (FALSE) which is FALSE and D2 is similarly set to FALSE and D3 corresponding to n21 is similarly FALSE. So all three nodes are rated NOT-TE ay block 12.9 and shown in thin borders, as are their outgoing edges. Finally EDepth 3 node n27 is rated NOT-TE because its only argument is rated NOT-TE.

In FIG. 13, the Add Node window Editwindow1 is shown opened, Adding challenge to node n24. The text "X is too expensive. We shou . . . " is being added to the running head of the new challenge node. The text "X doesn't make any sense for our company because . . . " is being added as the declaration of the new challenge node. This window may have been opened in response to a user right-clicking on node n24 and selecting to add a challenge from the dropdown the system draws.

Figure 16:
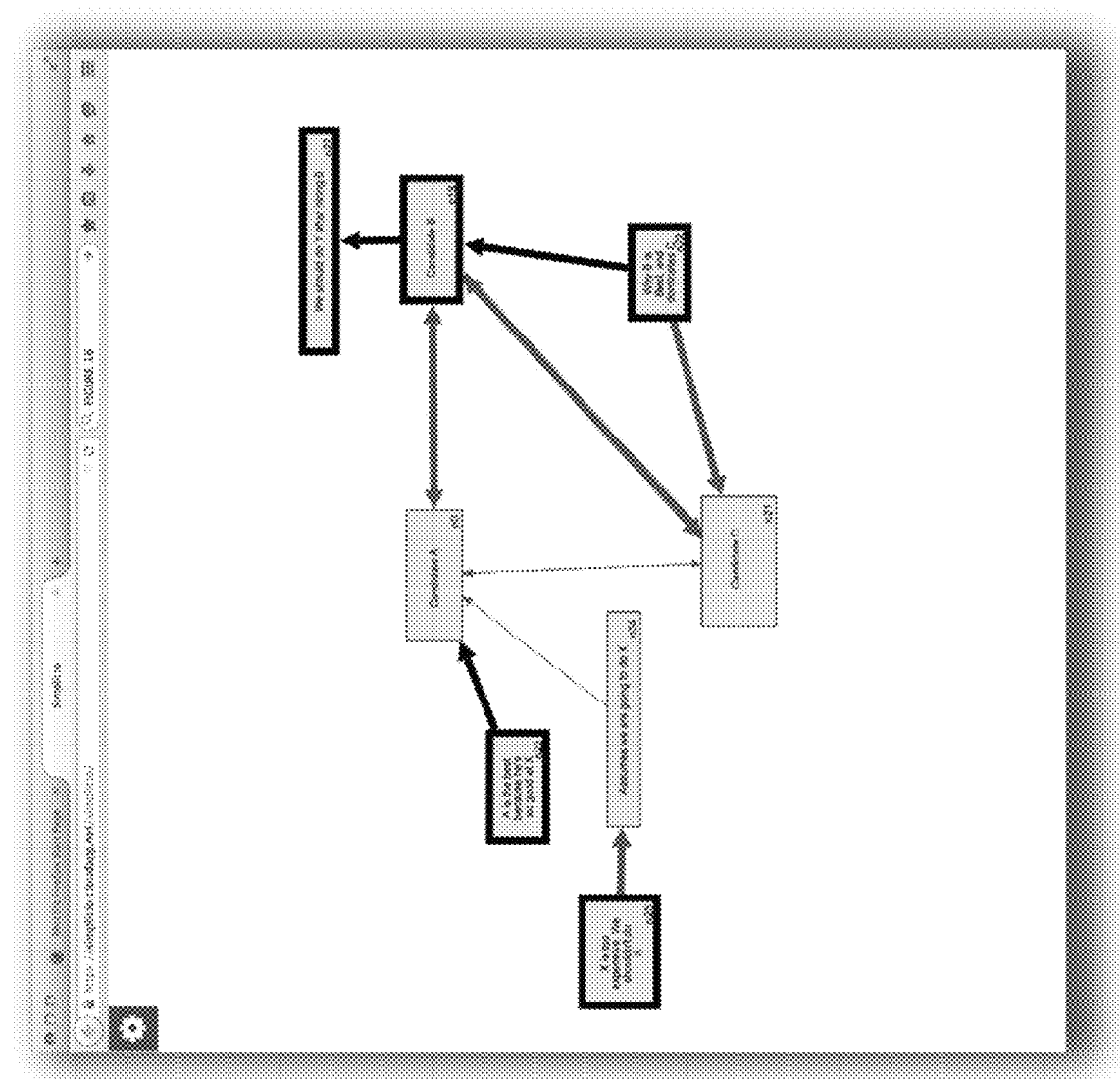
FIG. 16 shows a screenshot of an embodiment displaying the rating of the graph of FIG. 13 after an additional challenge is added.

FIG. 16 shows the graph of FIG. 13 after the Create Node button is selected by the user on the Add node window. The new challenge node n25 has been attached challenging n24. Now X too expensive . . . n25 is EDepth 0 and TE by blocks 12.5 and 10.4 as are the other Edepth 0 nodes n22 and n23. Edepth 1 node n24 is NOT TE by blocks 12.5 and 10.6 since it has a TE challenge. Next node n0 is EDepth 2 and nodes n19 and n21 are EDepth 3. This is because Edepth defining paths can only use at most one negation edge. The paths defining n0 as Edepth 2 can be n25 n24 n0 or n22 n21 n0 or n22 n19 n0. Node n19 is Edepth 3 because of path n25 n24 n0 n19, as is n21 because of path n25 n24 n0 n21. So the next node evaluated according to 12.2 is node n0. According to blocks 12.3 and 12.4, evaluate n0, n19, and n21 are then evaluated simultaneously.

The system may compute a temporary value U1 corresponding to Candidate A, n0, and temporary value U2 corresponding to Candidate B, n19, and a temporary value U3 corresponding to Candidate C n21. U1 is NOT-TE by blocks 12.6 and 10.6 because it has a NOT-TE assumption, n24. U2 is TE by blocks 12.6 and 10.8 because it has a TE argument n22. U3 is NOT-TE at blocks 12.6 and 10.6 because it has a TE challenge, n22.

Next C1 and C3 are found to be FALSE and C2 is found to be TRUE by block 12.7. Then in block 12.8 D1 and D3 are FALSE and D2 is TRUE. So nodes Candidate A n0 Candidate C n21 are rated NOT-TE at block 12.9 and shown in thin borders, as are their outgoing edges, but node Candidate B n19 is rated TE and shown in bold borders. There is an argument for it that is unchallenged, n22, and each of the other alternatives is not supported: n21 has a TE challenge and n0 has a TE challenged assumption. Finally node n27 is rated TE because it has a TE argument.

Figure 20:
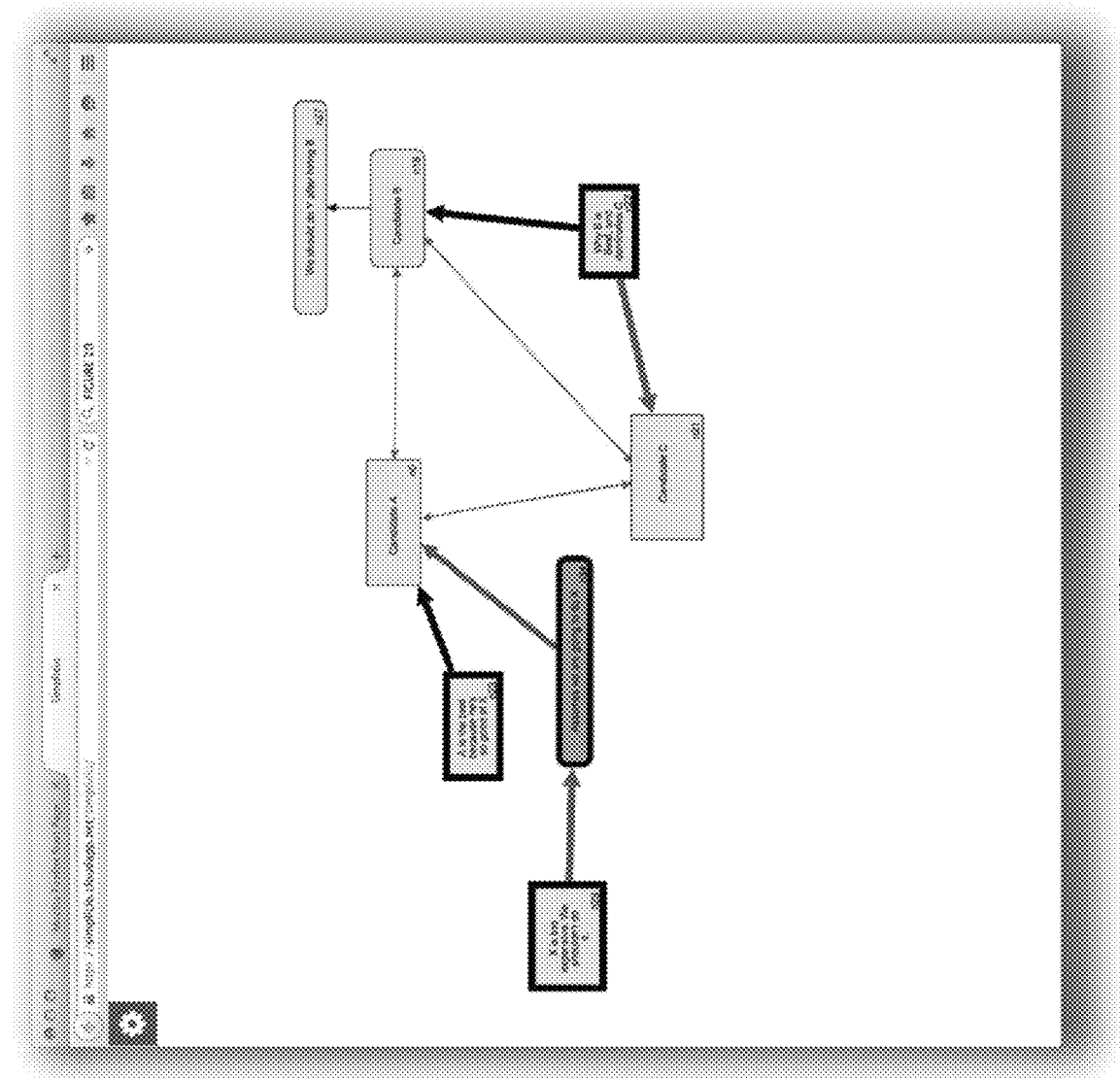
FIG. 20 shows a screenshot of an embodiment displaying the rating of the graph of FIG. 16 after a node is axiomatized.

FIG. 20 shows the graph of FIG. 15 after node n24 has been axiomatized. The system displays the node n24 in color, e.g., green, to indicate the axiomatization to users. The Edepth of all nodes is unaffected by the axiomatization, and Edepth 0 node2 n29, n23, and n22 thus have their rating unaffected. They are all still TE. By blocks 12.5 and 10.2 Node n24 now is rated TE C T_n24 that is, TE C with condition T_n24. It also is considered TE C True because its condition T_n24 is true if the axiomatization variables (in this case T_n24) are assumed true. Thus the embodiment draws node n24 with thick black borders to denote its True status, and with rounded corners to denote its conditional status. Next, as before, the ratings of nodes n0, n19, and n21 are computed simultaneously, starting by computing respectively U1, U2, U3. U1 is TE C T_n24 by blocks 12.6 and 10.14 because it inherits the condition of its assumption. U2 which corresponds to n19 is TE by block 10.8 because it has a TE argument. U3 is NOT TE because it has a TE challenge.

C1 corresponding to U1 is T_n24. C2 corresponding to U2 is TRUE. C3 corresponding to U3 is FALSE at block 12.7.

D1 corresponding to U1 is FALSE, because C2 is TRUE. D2 corresponding to U2, is C2 and NOT C1 and NOT (C3) by block 12.8, which may be computed as TRUE AND NOT(T_n24) AND NOT (FALSE) which reduces to NOT (T_n24) using the simplification rules that TRUE may be removed from conjunctions and NOT(FALSE) may be replaced by TRUE. In block 12.8 the system may simplify by replacing NOT(FALSE) with TRUE and NOT(TRUE) with FALSE and reducing an expression into which TRUE is conjoined by removing the TRUE, and reducing an expression into which FALSE is conjoined by replacing the whole expression with FALSE.

So at block 12.9 the system rates node n0 is NOT-TE (as D1 is FALSE), node n19 as TE C NOT(T_n24) which is TE FALSE since NOT(T_n24) is false if all the axiomatization variables for the graph are True and n21 is NOT-TE. Thus nodes n0 and n21 are drawn with thin borders and hard corners and n19 is drawn with rounded corners designating conditional status and thin borders designating TE C FALSE status. Finally node n27 is rated TE C False by 12.5 and 10.14, and drawn with rounded corners and thin border, because it inherits the condition of its only argument n19, which is NOT(T_n24). This example may represent how members of a corporation may use the system to evaluate which of three candidates they should hire. Different employees may contribute different nodes and arguments, allowing collaboration. As more information is added to the graph, the system evaluates whether any of the options is tentatively established as the best choice. The system may take into account information about various pertinent topics such as what future course of action might be best for the company, revising hiring decisions as this is updated. The example may represent also how the members may discuss what actions to take after deciding on a candidate. The rating of node n27, for example, may argue that the company should pursue option Y, conditional on the presumption the company won't pursue option X. If they have decided to pursue option X (as reflected in the axiomatization of n24) the graph still points out that they have unchallenged and indeed tentatively established arguments for both Candidate A and Candidate B, so there is not yet a clear victor. This may motivate an employee to find a valid argument that refutes n23 or n22, in order to resolve the conflict and come to a clear decision.

Note alternative stylistic displays of the computed rating information may be made available in alternative embodiments. In other embodiment users who save axiomatized graphs, may save the graph in addition to (rather than on top of) the existing common graph so that users may be able to visit and edit alternative axiomatization versions of a graph.

Note that there may be a 1 to 1 correspondence between nodes and the argument or statement or declaration or challenge or test or suggested edit or citation that maps into them, so the node's rating or the argument's rating (or the statement's rating, or etc.) is interchangeably referred to herein, meaning the same rating, and similarly in embodiments which support scores or likelihoods, there is a correspondence between a node's score or likelihood and the corresponding statements' score or likelihood, or the corresponding argument's score or likelihood, so that such term may be referred to interchangeably.

The modifications of the update rules to add conditional update status are also easy to understand. TE C X status is intended to mean that the node would be TE in the event that the condition X were to be true (which may mean that appropriate ancestor arguments and statements are TE in order to ensure the TE status). So whenever a node is relying on an ancestor being TE for its TE status, and that ancestor is in fact TE C C1, then said node also should have a factor C1 reflected in its conditional TE status. And if a statement has a negation which is TE C D1, then its TE status may pick up a term NOT(D1). If there is no TE or TE C challenge of an argument, and all of its assumptions are TE, then it is TE (in a one embodiment.)

By supporting the ability of users to enter multiple different combinations of likelihoods as updates, an alternative embodiment of the system may support the ability to build a precise and complex probabilistic model. A set of standard update rules that may be offered may include one combining arguments that are independent, another useful for combining arguments that are statistical assays of whether a statement holds, rather than causes of the argument holding. When such combination rules are chosen from the library, the system may mark the node in a characteristic way, to indicate that a particular rule was used. The system of such embodiment may continue to support the challenge and counterchallenge abilities, and users may thus challenge a node when they question its posited update rule. Thus this system may support the ability of users to create a transparently verifiable display that a precise and complex probabilistic argument tree arrives at particular likelihoods for particular nodes using only arguments and evidence that is unchallenged, or where the likelihood estimates take into account the challenges.

An alternative embodiment of a system may support the entry, in addition to Challenges, Arguments, Statements, and for each of these a PL field or multiple such fields, the entry of update rules. Other node types such as Arguments and Statements may have a field for update rule.

The flow chart for updating such an embodiment may be as in FIG. 12(a), except the update of a node in block 12.2 may first check if the node has an update rule entered, and may use the node's update rule instead of or in addition to the normal rule specified in FIG. 12(b). (Whether instead of or in addition to may depend on whether the update rule was specified to be used instead of the normal or in addition to it, for computing another rating or score as in the case of EL. One or both options may be supported.)

Figure 14A:
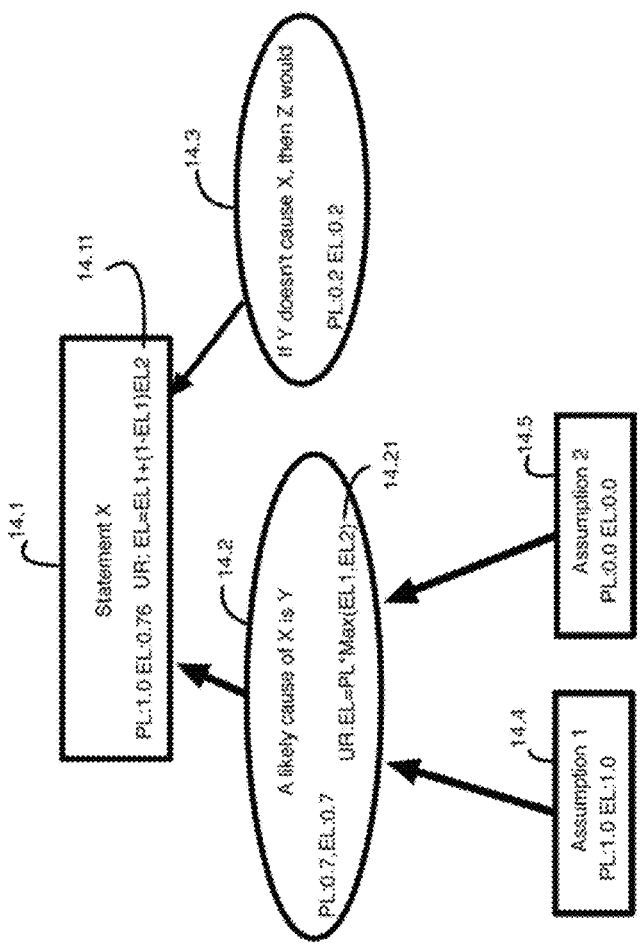
FIGS. 14(a) and 14(b) depict two other embodiments that support user entry of update methods.
Figure 14B:
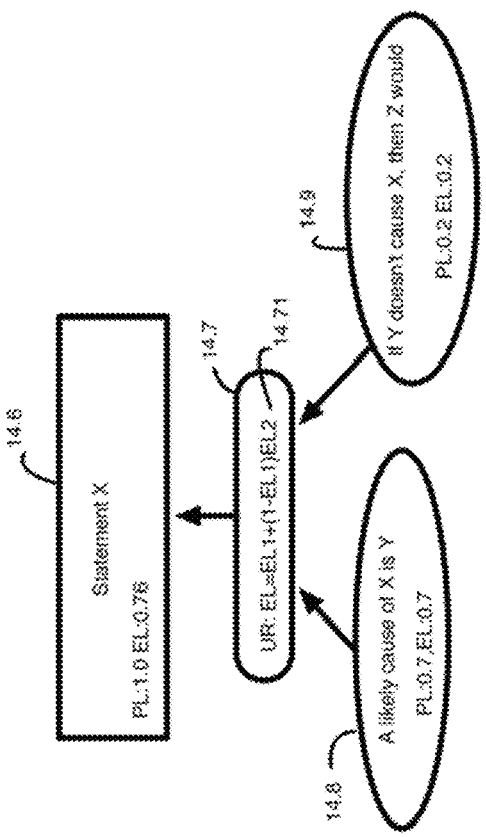

Examples of embodiments of systems that may support entry of alternative update rules are shown in FIGS. 14(a) and 14(b). In FIG. 14(a), an inference graph illustrates the kind that may be prepared using a system supporting entry of an update rule for statements with multiple arguments. A user has entered an update rule for node 14.1, whose statement may be Statement X. The system may offer certain users the ability to enter an update rule into a field when editing the node, the node statement, or an argument supporting the node, or when adding a new argument supporting the node. If no update rule is entered, the system may assume a standard rule, such as those in the embodiments above. The system may support several standard rules to choose from, and/or allow equations or simple programs to be written.

The system in the example may support entry into nodes of a PL or proposed likelihood and computation of an EL or Expected Likelihood, which may be a score or rating assigned to nodes and displayed to users. A user may have entered at node 14.2 the argument "A likely cause of X is Y", the PL 0.7, and the UR: EL=PL*Max(EL1,EL2) at block 14.21. He may have entered Assumption 1 in node 14.4 with PL:1.0 and Assumption 2 at node 14.5 with PL=0. He may have entered another argument for result at nodes 14.1, 14.3, entering as text in the argument field "If Y doesn't cause X, then Z would" with PL=0.2.)

Now when this system is updated, all nodes may be updated as TE using the method of FIGS. 12(a) and 12(b) (since there are no challenges as yet in the graph), but updating the likelihood, for the nodes where a UR was specified, the specified UR may be used instead. The UR at block 14.11 may be a standard type of UR that may be invoked by users who may be interested in combining causes that may each independently cause the statement. This may have a designation like "Add-Indy" and when editing a node with multiple arguments, there may be a button or a command "Use Add-Indy" available to users editing a node with more than one argument that when clicked may insert the update rule of block 14.11. For combining more than two arguments, the Use Add-Indy may use equations like $$EL_{stat}:=EL_{arg1}+(1-EL_{arg1})(EL_{arg2}+(1-EL_{arg2})$$
$$(EL_{arg3}+(1-EL_{arg3})(EL_{arg4}+\ldots))\ldots)$$

where stat represents the node being updated arg1 represents the first argument and argi the i-th argument . . . and EL represents an "Expected Likelihood" which may be a numerical rating updated for each node in some embodiments.

Alternatively the user may have added the Update Rule (UR) by keyboard, entering it into the UR field.

The UR at block 14.21 may be a standard type of UR that may be used for updating arguments where the user believes either argument being true might by itself establish the argument, rather than both being necessary. There may be a button or a command "Use Each-Sufficient" available to users editing an argument node with multiple assumptions that adds the update rule at block 14.21 or the user may have added it by hand, entering it into the UR field. There may be a small library of standard combination methods and users may be able to select easily from the library and paste into or include a standard update rule when editing a node. The system of the embodiment may also support entry of non-standard update rules in a language as shown here. In FIG. 14(a) the update has proceeded by updating at node 14.3 to EL=0.2 using a default equation since no other rule was specified, and updated at node 14.4 to EL=1.0 using a default equation (by default in this embodiment), and at node 14.5 to EL=0.0 using a default equation, and then updated at node 14.2 to EL=0.7 using specified ruled at block 14.21 with EL1 being the EL of Assumption 1 and EL2 set to the EL of Assumption 2. Then at node 14.1 EL=0.76 is updated using update rule at block 14.11 with EL1 set to the EL=0.7 of the first Argument (node 14.2) and EL2 set to the EL=0.2 of the second Argument, 0.76=0.7± (1−0.7)*0.2.

By supporting the ability of users to enter multiple different combinations of likelihoods as updates, the system supports the ability to build a precise and complex probabilistic model. A set of standard update rules that may be offered may include one combining arguments that are independent, another useful for combining arguments that are statistical assays of whether a statement holds, rather than causes of the argument holding. When such combination rules are chosen from the library, the system may mark the node in a characteristic way, to indicate that a particular rule was used. The embodiment of the system may continue to support the challenge and counterchallenge abilities, and users may thus challenge a node when they question its posited update rule. Thus this system may support the ability of users to create a transparently verifiable display that a precise and complex probabilistic argument tree arrives at particular likelihoods for particular nodes using only arguments and evidence that is unchallenged, or where the likelihood estimates take into account the challenges.

FIG. 14(b) depicts an alternative embodiment where, rather than allowing an update rule to be entered into a statement node with multiple arguments, the system may support the creation of connector nodes such as at node 14.7 that specify the update to be used in combining multiple arguments for a statement. The same update rule at block 14.11 has now been entered into node at node 14.7 as at block 14.71. The user who attempted to add a second argument at node 14.9 for Statement X may have been prompted to specify the update rule for this node. The shape of the node in the display may indicate the particular type of rule it uses. By requiring multiple arguments for a node to filter together through one or more connector nodes the system may make transparent what assumptions are being made in how the combination of causes or evidence is being performed, and facilitate challenges of the update-rule nodes themselves.

In an alternative embodiment yet, a score could be computed according to estimated likelihood as above, but using only TE nodes, or alternatively only nodes TE or TE C. These would estimate a value that may facilitate transparently discovering and representing the likelihood that nodes' statements are valid.

Embodiments may provide a system that supports abilities where users may have the following capabilities:
(1) To enter or edit arguments and statements into memory storage, in a data structure such that arguments may be associated with result statements and assumption statements. The system may represent this as a graph with directed edges from an argument node to its result nodes and from its assumption nodes. Two nodes may be identified if their statement is identical. Nodes may be specified and/or automatically recognized as negations.
(2) To view the associated graphical structure and to view arguments or statements associated with nodes of it, and to view the tentative establishment status of nodes and the challenge status of arguments, where the tentative-establishment status is updated periodically, for example after each edit or challenge or response, by the computer system according to an algorithm depending on the graph structure and the challenged nature of the arguments,
(3) To Challenge arguments, providing an argument associated with the challenge, or to challenge statements
(4) To Respond to challenged arguments by one or more of
  (a) editing the argument,
  (b) editing it in a way breaking it down into a compound argument, by building a subgraph structure with at least one additional statement,
  (c) challenging the challenge argument or other assumptions or arguments its TE status may depend on,
  (d) assuming the Conditional Axiom that said challenge is invalid, in which case the system may propagate CA tags to downstream (following edge directions in the graphical structure) results whose tentative-establishment would depend on a result of said challenged argument. These tags may link said challenge and its associated argument.

Responses may resolve the challenge, so that it is no longer considered in the update.

The system may also manage user permissions, so that users may for example retain ownership of arguments they have entered, keeping the exclusive right to respond to challenges on them, or so that some users may be excluded from modifying portions of the graph, for example so that two teams can retain rights to arguments and counter-arguments respectively. So not all users need have all of the above capabilities on all entries or fields.

The above capabilities may be made available to multiple users for one or more shared graphs. The users may have different permissions on different shared graphs.

The tentatively-established status of the statements may be computed by the system. When an argument is challenged, the update may propagate along the edges of the graph changing the status of any node whose previous tentatively established status depended on the TE status of said argument. When a new argument is made or a challenge is responded to, it may propagate forward changing the status to tentatively established as far as justified by the rule, for example as far as it continues to change the status of a result because it changes the status of an assumption of an argument for it.

The system may also provide abilities for users to see different sets of results depending on different assumptions. For example, a user may have the option to have the system display the tentative-establishment of graph nodes under the condition that any particular unanswered challenge is taken as a Conditional Axiom, or any set of unanswered challenges are taken as conditional axioms, or any unanswered challenge is not taken as conditional axiom, or any sets of challenges and nodes are and are not taken as conditional axioms, in other words the system may allow the user to simulate various alternative choices. It may also support choices such as modifying the graph so as to remove all challenges from some specific set of users. The system may also support users to define alternative algorithms for assigning a score to nodes of the tree in terms of the score at neighboring nodes on the graph. For example, users may have the capability to enter rules for combining scores at parent nodes in the tree (perhaps representing probabilities) into a score for the result of an unchallenged argument.

In an alternative embodiment, an argument may specify sets of its arguments that are necessary and sufficient for it to be valid, in which case it would be updated to TE when a sufficient set of its parent assumptions were TE rather than all of them. In such an embodiment, the users may be required to enter the specification of which subsets are necessary and sufficient in a way comprehensible to the computer program, for example as a logical formula in some language provided in the software or internally specified with some graphical representation.

Another option that may be embodied in the system is to only enable the construction of arguments consistent with planar graphs. A further restriction that may be added is that there may be only one argument for a certain specified final result. The system may enable insertion of new assumptions or arguments spreading the image, but preserving the planarity.

Statement nodes and argument nodes may be interchangeable terms, referring in either case to nodes containing statements that may have outgoing argument edges. When a new node is added by adding it to an existing node with an outgoing (from the existing node) edge to the new node, it may be reasonable to refer to the node as a statement node since it does not yet have a result. But as may be seen in the above examples, one may also refer to all the nodes as statement nodes, and define the argument or challenge or assumption property purely in terms of the edge that is attached.

For realistic problems, argument graphs may become quite complex so it may be preferable to facilitate the focus of users on important aspects. Two simple modifications facilitate this. One is that the model may elide some distinctions that were made before between statement nodes and argument nodes. The system may allow the creator or editor of a node to determine whether it has assumptions that must be established for it to apply. The system may thus allow a first statement node to be an argument for a second (and the second to be a result of the first). Supporting these constructions facilitates users to enter a compound graph without worrying as much about the details, which may be adjusted after challenges. The system may also support challenges against edges, so that a user may challenge the edge between said first statement and said second statement, thus allowing the first statement to be TE while challenging whether it indeed provides support for the second statement. An example of this is shown in FIGS. 15(a), 15(b) and 15(c).

Figure 15A:
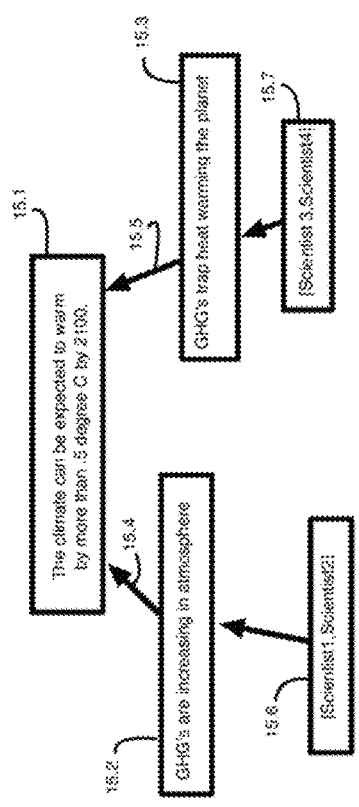
FIGS. 15(a), 15(b) and 15(c) show three illustrative edits of graphs prepared using an embodiment supporting statement-statement edges and supporting challenges of edges.
Figure 15B:
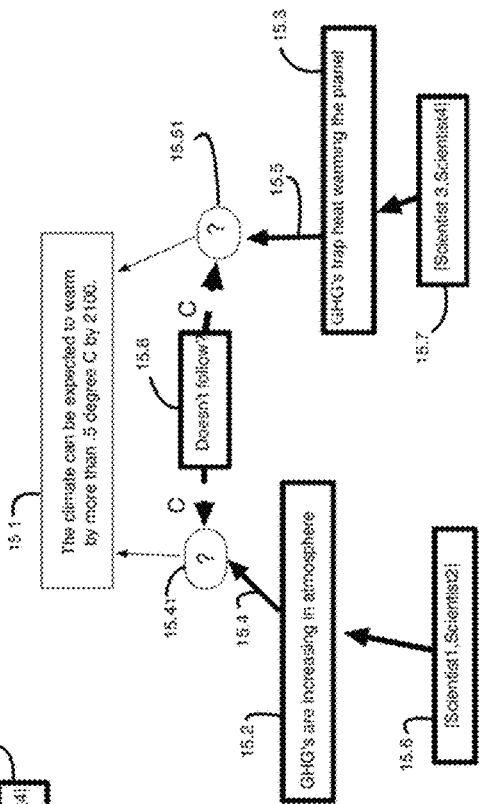

FIG. 15a shows a compound graph in which statement node at block 15.2 has an outgoing result edge 15.4 to statement node at block 15.1. FIG. 15b shows the graph after challenge at block 15.8 has been attached to edge 15.4 (and also to edge 15.5). Note edge 15.4 no longer extends to block 15.1, but rather encounters an inserted empty argument node at block 15.41, from which an edge continues to block 15.1, not bold because the argument node is not TE, because it is challenged by TE node at block 15.8 shown in bold, and that node at block 15.1 is no longer tentatively established. However nodes at blocks 15.2 and 15.3 are still TE. This is akin to accepting the first statement may be valid, but challenging whether it in fact implies the second statement. In some embodiments this may be represented simply as a challenge to the edge, but in the embodiment illustrated in the FIG. a challenge of an edge is shown as inserting an empty argument node in middle of the edge. A challenge of the edge may then be answered by editing said inserted empty argument node having as argument the first statement and as result the second statement. (In embodiments where the challenge doesn't automatically insert an empty argument node, the responding user may insert one. Also in such embodiments, node depth computations used to decide which order to update nodes in, may be modified to be computed as if an additional argument node had been inserted in the edge and challenged).

Figure 15C:
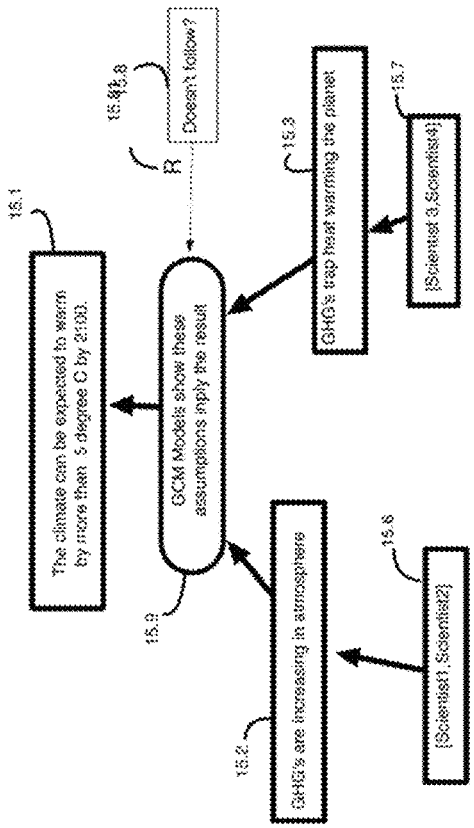

FIG. 15(c) shows the graph after that challenge has been responded to by inserting an argument node at block 15.9. This argument node may further be challenged in subsequent user actions.

This flexibility allows one or more users constructing an argument graph to put in only statement nodes sketching the argument, and to insert or edit argument nodes later if necessary to respond to challenges that users raise about some of the implication edges they had inserted.

FIGS. 15(*a*), 15(*b*) and 15(*c*) show three graphs prepared according to this system. FIG. 15(*a*) shows a compound graph that has been entered supporting the statement at block 15.1. Note that the user has chained statement nodes represented by rectangles one to another. Note all nodes are TE, as indicated visually by their thick borders and edges. FIG. 15(*b*) shows the graph after a user has challenged the edges 15.4 and 15.5 with challenge node at block 15.8. Block 15.8 is thus an example of a node with two results (child nodes). In this embodiment challenging an edge is displayed by inserting a dummy argument node into the edge (at blocks 15.41 and 15.51 respectively for edges 15.4 and 15.5). Because of the challenges, the dummy nodes and their outgoing edges are marked in light lines, as NOT-TE, and block 15.1 is also no longer TE because it has no TE argument. FIG. 15(*c*) shows the situation after a user has responded to the challenges by editing the dummy nodes. In this case the user has merged the dummy nodes into at block 15.9 which she has made an argument node, having blocks 15.2 and 15.3 as assumptions. (One way the user might do this is by deleting one of the dummy nodes and editing the other in an appropriate fashion, including adding edges.) This is indicated by the round edged rectangle used to display the node at block 15.9. Of course, other transparent conventions for indicating status and node type could be adopted instead of specifically thicker borders and varied shape. The challenge at block 15.8 has been marked with an R at block 15.81 for Resolved and has been greyed out and is ignored in status updates. It may at some point be deleted from view of users. Note that node at block 15.1 is now TE again. In other embodiments, the node at block 15.9 would have no special marking after being edited, and also it may be necessary for the responding user to challenge the challenging node at block 15.8 in order to restore the TE status of node at block 15.9 and hence of block 15.1.

It may be understood that the flow charts of FIGS. 6(*a*) and 6(*b*) provide one means of examining the graph and assigning to each node a status in such a way that for all nodes on the graph, a node is TE if and only if there is a valid argument for it and no valid challenge of it. The definition of valid argument may be to some extent conventional, but a reasonable convention is that if a node has assumptions and they are TE, and it has no challenge that is not NOT-TE, then it is TE, or if it doesn't have assumptions but there is a TE argument for it, and no challenge that is not NOT-TE then it is TE. A node with no parents conventionally has been taken has to be TE, which allows graphs with TE nodes to be built. Ratings with some specified nodes axiomatized have been updated, meaning that the specified nodes' ratings may be hypothetically set to TE or NOT-TE, and the rating extended to other nodes on the graph according to having every node be TE if it has all TE assumptions or no assumptions and a TE argument and no TE challenge. When such hypothetical assignments are made, the ratings of some nodes in the graph may change from NOT-TE to TE. Those nodes are then said to be TE C, with the condition being the particular axiomatization that caused them to become TE.

So the rating of all nodes may be found by finding a rating assignment for all nodes such that each node's rating is TE if it has no parents; or if all its assumptions are TE and it has no TE or TE C challenge or negation and has at least one TE argument or else has TE assumptions; and otherwise it is not going to be TE, and the node may be TE C C1 for C1 some condition, if it would be TE precisely if C1 were assumed true, where C1 may be an assumption that some set of other nodes are set to TE or are set to NOT-TE and updates were done downstream in the graph, i.e., if the update of the graph were performed with the change that the or some ancestor nodes which have been axiomatized were TE, and the condition C1 is equivalent to that these particular nodes have been axiomatized.

It is to be understood that some alternative update procedures may achieve the same end. For example, one may only update nodes that need to be changed, after an edit, rather than starting back at the depth 0 nodes.

Alternative embodiments may support somewhat different conventions yet still provide a rating of nodes showing which have been established by valid or not-validly challenged arguments. One may support challenges of edges, and statement to statement edges, or not. Another alternative convention may demand that a depth zero node, a node with no parents, be of a certain form in order to be considered TE, for example it may be required to contain a link to a refereed paper in a scientific literature database. This convention would insist that all arguments be grounded in peer-reviewed publications. The update rule may be changed to accommodate such conventional changes.

An embodiment of a system may support numerous inference graphs. Any particular inference graph may be indexed by its Topic or Target or Root Statement, which may be a Result statement that the graph may be created around determining whether the statement may be rationally inferred or not, TE or NOT-TE. A user may create a new single-node graph by entering a Target Statement, and then users may modify the graph adding arguments and challenges and other statements that may be connected by edges. Users may have a facility to search for existing graphs, to see if one exists on a particular Target, or possibly on related Targets. It may be that for many users, a primary goal will be to check a particular Target statement and whether it is TE. To facilitate this, it may be helpful to present a simple display to the user. A user viewing the graph may be presented a sub-graph focused on and isolating the Target node, from which he may be readily able to determine whether the Target is TE because of the way it is presented, (for example if it is outlined in bold or color), and indicating which parent nodes are responsible for the status, because an incoming TE edge may also be bold in the display, but eliding the rest of the graph if it is very complex. He may then be able to further expand the display, for example by selecting nodes within the existing display to be expanded, which may allow him to trace back and understand the argument establishing the status.

The system may also support a command that allows a user to select a node such as the target node and expands all nodes in the tree that contribute directly to the TE or NOT-TE status of that node. Whenever the status of a node is updated, unless it is a leaf, if it is updated to TE there may be one or more parent nodes responsible. These may be its TE supporting argument nodes and/or TE assumption nodes. Likewise if it is updated to NOT-TE there will be responsible parents which may be any TE challenges and/or NOT-TE assumptions or (if there are no assumptions or TE challenges), NOT-TE arguments. So the system may walk backward through these responsible nodes, for each one adding to the depiction its responsible parent nodes to depict a responsible sub-graph.

In an embodiment the system may provide the user with options to:
1) For a default or selected existing graph, view simplified sub-graphs showing the result node and responsible incoming edges and/or parent nodes and the establishment status of these nodes and edges,
2) View a hypertext based representation of a node in a graph followed by listing of its parents and/or children, that when the hypertext in the representation of a parent or child node is selected (eg clicked) then displays the hypertext based representation of that node followed by its parents and/or children in turn, and that further indicates TE status or lack thereof of displayed nodes.
3) View other representations of an existing graph or sub-graphs of it showing TE status of nodes,
4) Enter a new node into a new graph,
5) Enter a new node into an existing graph,
6) Select an existing node and take an action pertaining to it which may include
   (a) Adding a new node connected to it by an edge of type Challenge (of the existing node), Assumption (of it), Argument (for the existing node), Result (of the existing node, in which case the existing node would be an argument for or assumption of the new node).
   (b) Connecting said existing node to another existing node by adding an edge, which edge may challenge the another existing node or be challenged by it, or which may make the existing node have an assumption of the another existing node or make the another existing node have the existing node its assumption, or such that the another existing node may be an argument for the existing node, or the existing node may be an argument for the another existing node.
   (c) Responding to a challenge to the node by editing the node,
   (d) Responding to a challenge to the node by editing the node and adding one or more nodes connected directly to it or connected to other nodes connected to it,
   (e) Editing the node,
   (f) Deleting the node together with its in and out edges. (An indicator that the result or assumption was deleted may be made at the node the edge came from or went to, respectively, i.e. at the nodes that the deleted node was a result of or was an assumption of, respectively. This may take the form of a faint or greyed out edge in a display.) (If it has an outgoing edge to a node that it is a sufficient argument for, as opposed to a necessary assumption of, a different indication may or may not be supported, depending on variations in the embodiment.)
   (g) viewing the node and associated data and text,
   (h) challenging the node by adding a new challenge node connected to it by an edge.
7) Select an existing edge and
   (a) Challenge it, inserting into the graph a challenge node for the edge, or
   (b) Replace the edge by inserting in the middle of the existing edge an argument node having as assumption the parent of the edge and as result the child of the edge (where directed edges are said to point from parent to child.)
   (c) The embodiment illustrated in FIG. 15 and others may combine (a) and (b), so that when an edge is Challenged (as in (a) a dummy argument node for it is inserted in the edge (as in (b)) as well as a challenge node directed to the dummy argument node. See FIG. 15(*b*).

Associated with each node there may be
1) a document or assertion consisting of some text and possibly associated data such as images or video and possibly one or more links to internet or intranet cites, this may be referred to as the "content" or the "statement" or the "argument" or the "declaration" of the node, 2) a designation of how the incoming edges are combined in performing rating updates, typically chosen from a set of alternatives including assumption, argument, challenge, and possibly negation, suggested edit, and/or test. The update rules specify how the rating updates are done in terms of the status and designation of the parent nodes.

3) A PL or PB Field, into which a numerical-valued Proposed Likelihood or proposed belief may be entered. There may be one PL field for each outward directed edge.

4) A rating that may be updated as to whether the node is TE, NOT-TE or TE C, and if TE C may further compute an associated condition or expression and may further compute a value or True or False according as such condition is true or false under certain circumstances 5) A likelihood rating that may be updated to provide an Estimated Likelihood (EL) or Belief B for the node.

6) A set of outgoing edges to other nodes that the node impacts and the designation of each edge as challenge, negation, or result, these may be referred to as the node's "consequence" or "child" nodes, 7) a set of incoming edges from other nodes that impact the node (its "parent" nodes) and the designation of each as challenge, negation, assumption, sufficient condition, or possibly other classifications.

In some embodiment variants, there may be an "other" designation. If other is selected an alternative update rule may be supplied by the user. An embodiment may also support other standard combination methods.

8) The nodes may have associated also a running head, which may be another field where the user may enter text. This may be displayed in graphical or other representations.

9) A node name or node number identifying the node. The node may, for example, be indexed or referenced using this number or name in hypertext or graphical depictions.

When a user enters or edits a node, he may enter or edit the data in one or more of these fields, edges, designations, etc. This allows, for example, a user to enter a node with a statement she would like to establish, and then one or more parent nodes providing arguments for it or verifying its assumptions, and then enter parent nodes for those and parent nodes for those freely, without having to worry in the chain whether the last was a statement or an argument. If the user sets one node to be considered as an argument for another, it may independently contribute to the others TE status, but if it is considered as an assumption it's TE status may be considered as a necessary condition for the other node's TE status. Users may be facilitated to design such treatment as they see fit, and to challenge nodes if they don't find their designations adequately justified.

Figure 17:
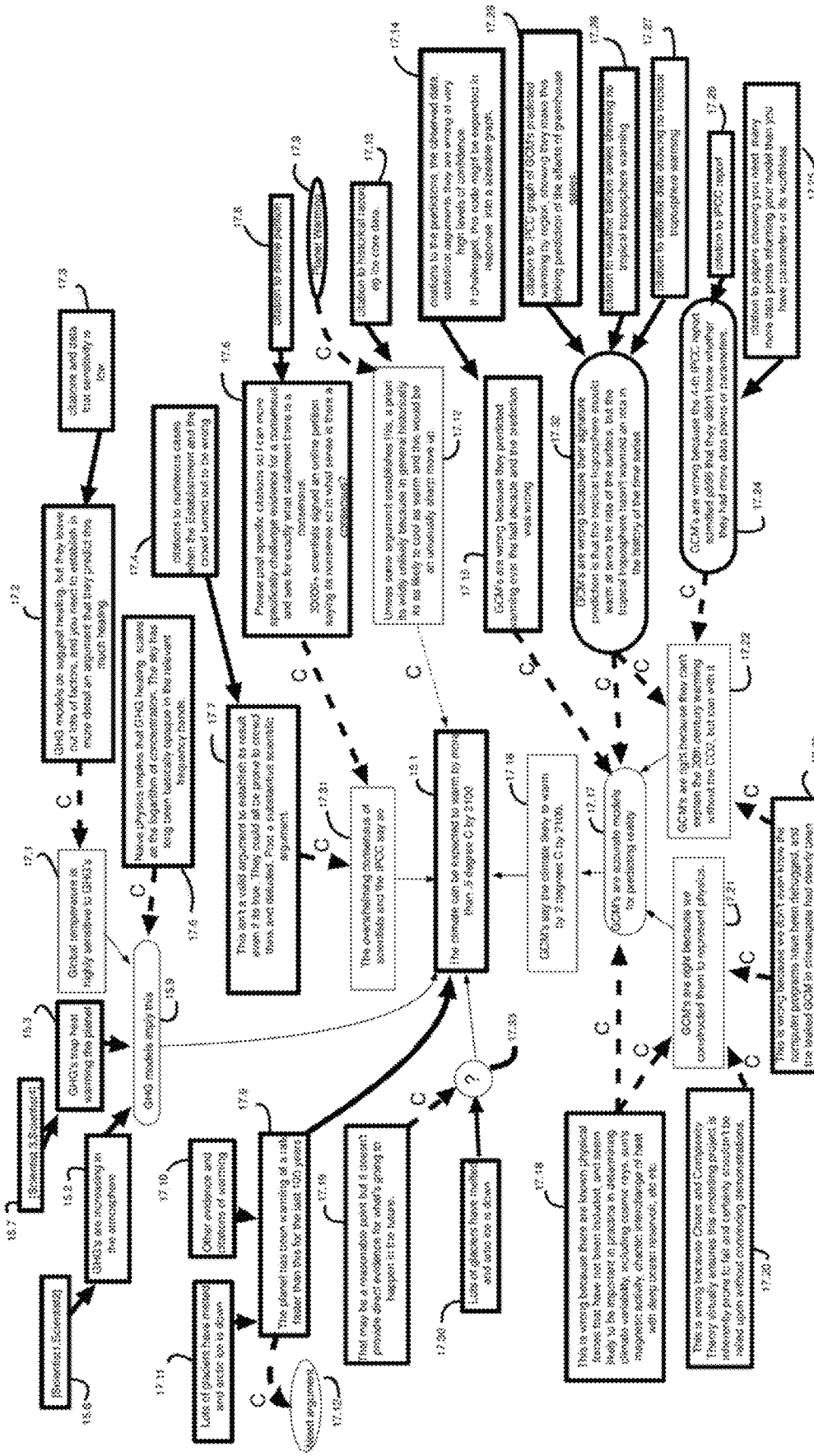
FIG. 17 shows a somewhat mature graph after a number of edits and challenges for a debate concerning climate change, illustrating that graphs may become somewhat complex for some users.

FIG. 17 shows the graph of FIG. 15(c) after considerably more editing by various users. It indicates that these graphs may become fairly complex over time, which relates to the discussion of FIGS. 18(a), 18(b), 18(c) and 18(d).

Note that blocks 15.1, 15.9, 15.2, 15.3, 15.6, and 15.7 are still present. Many other nodes have been added. Note that argument nodes (nodes with assumptions) are represented by round-edged rectangles and statement nodes (nodes without assumptions) are represented as rectangles. (This differs from other embodiments that have been discussed that don't distinguish between nodes with assumptions and without in displaying the node representation and reserve round corners to indicate conditional status.) Two nodes at blocks 17.12 and 17.9 have been represented in two different locations each, in one as an oval and in the other as a rectangle. The oval designation is used to indicate simply an icon for another existing node inserted into the graph, for clarity and to represent drawing of an edge across the graph. In an alternative representation or embodiment, these duplicate icon nodes may be omitted and the edges drawn all the way, or color coding or some other graphical technique may be used to represent the connections. In embodiments where icon nodes of this type are utilized, clicking on the node or hovering over it with the mouse pointer may highlight or color or center in the FIG. the central copy of the represented node. In FIGS. 17(a), 17(b) and 17(c), the reference numbers may be considered part of the graph itself, the names of the nodes that may be displayed in a representation.

FIG. 18(a) represents simple alternative depictions which may be displayed to a user first viewing the graph of FIGS. 17(a), 17(b) and 17(c). FIG. 18(a) shows the graph as it may be displayed to a user first opening the graph. A target node for the graph is displayed, at block 15.1, along with edges from representations of parent and child nodes. In alternative embodiments, a fuller depiction of the parent and child nodes may be drawn. A virtue of this depiction is simplicity. The user may see instantly whether the result is or is not TE (by noting whether it is outlined in bold or color, say). The user may see which incoming arguments establish it as TE by their bold outline. If the node was not TE, the user would see instantly whether there was an incoming bold challenge line preventing it from being TE, and/or whether it had assumption nodes that were not TE. (The illustration shows a node without assumptions, but if it had assumptions those would also be represented by incoming edge markers in bold or otherwise as whether they were TE or not, and in some embodiments incoming edges from assumptions will be marked as such, for example with an "A".) The graph shown may be interactive, so that selecting one of the incoming (or outgoing) node tokens for opening, for example by clicking on the token with a mouse, may cause the system to expand the token to into a fuller node representation, with its own incoming and outgoing edges. FIG. 18(b) shows the graph displayed after a user has clicked on the *17.9 token in FIG. 18(a). The node at block 17.9 has been expanded, showing its in and out edges, and its running head and the label, in this case the reference number of the block (17.9) may be displayed in the FIG. in the embodiment. In this way users may selectively open up the graph, looking only at interesting portions, for example starting at the Target Result and seeing it is established, and then following backward to see the argument that established it, and what its assumptions were and how they were established. There may also be an option to remove selected nodes from the displayed portion of the graph.

For a case in which the Target Result was not established, they may click backwards to a bold Challenge or to a NOT-TE assumption, to expand backward tracing the root statements that have been challenged without a satisfactory response.

Thus, in summary, FIG. 18(a) shows the first window that may be displayed to a new user choosing to view the graph of FIG. 17. The user may immediately be able to determine the result is established, and that this was done according to node 17.9's TE status from the highlights, and if she clicks on one of the node icons in the display, the display may be expanded by expanding said node. FIG. 18(b) shows the displayed graph after a click expanding node 17.9. FIG.

18(*c*) shows an alternative hypertext inline depiction that may be displayed of the same subgraph as in FIG. 18(*a*). In an alternative embodiment, this hypertext inline version rather than the depiction of FIG. 18(*a*) may be the first FIG. displayed to a new user opening the graph of FIG. 17. Or in an alternative embodiment, they may be displayed side by side, in parallel frames or windows. FIG. 18(*d*) shows the hypertext version after the line for 17.9 in the hypertext is clicked. The node clicked is expanded with its edges below directly below the previous data, which may scroll upward or eventually be deleted.

Another feature may be the alternative text based representation of the nodes, as represented in FIG. 18(*c*) FIG. 18(*d*), FIG. 19(*a*) and FIG. 19(*b*). FIG. 18(*c*) shows a hyper-text based display representing the sub-graph shown in FIG. 18(*a*). In the hyper-text based display, the top line displayed gives summary information about a single node, in this case the Target node. This is followed by lines each giving summary information about one of said nodes' parents and/or children. The sequence of lines may organize the nodes by type, and also sequence them in a salient fashion.

The ordering may be customizable. The lines may themselves be hypertext, so that if a line is selected and opened (for example by clicking on it with the mouse pointer) the summary for that node may be printed below, followed by its edges in turn. FIG. 18(*d*) shows what may be printed after the second line, *17.9, in FIG. 18(*c*) is clicked. The line is expanded followed by the lines for its edges. FIG. 19(*a*) shows that if the mouse pointer hovers over one of the hyperlinks, the fuller text entered into the node may be displayed, for example in a pop-up. The pop-up window 19.1 shows the full text of the Target node 15.1 in the graph of FIG. 17.

FIG. 19(*b*) shows that if a line corresponding to a node or edge is selected, for example by right-clicking, the system may make available to the user a menu of commands. Said commands may include (among other possibilities):

"Edit" which may pop a window showing the data associated with the node and allow the user to edit the node, possibly supporting as well the commands below so that editing may involve changing or adding in and/or out edges, Challenge which may pop a window in which the user may enter a challenge argument against the node and insert the challenge in the graph, View which may pop a window displaying the contents of the node, Delete which may delete the node from the graph along with any edges in or out, Add Assumption of which may add an assumption node to the node and allow the user to specify if the assumption node is an existing node or else to add new data and or text into the assumption node and to add other edges to the assumption node, Add Argument for which may add a new incoming supportive edge and allow the user to specify if it is from an existing node or else to add a new node (argument or statement) and possibly other edges to or from said new node, Challenge Result Of which may allow the user to select a particular child of said node and insert a challenge into the edge challenging whether the node actually implies the child node, for example as the challenge 15.8 in FIG. 15, Add Result to which may allow the user to add an outgoing edge to another node in the graph, or to enter a new node and add an edge to it, About which may allow the user to pop a window showing permission and editing information and such metadata about the node, Respond which may allow the user to respond to a challenge to the node, Axiomatize which may allow the user to axiomatize the node or axiomatize away a challenge to the node, Display Graph which may allow the user to pop a window showing the graphical depiction, e.g. as in FIG. 18(*b*) rather than FIG. 18(*d*), and may also have options such as popping the full graph as in FIG. 17.

An example standard ordering may elevate or prioritize nodes of status that if changed, would change the status of said reference node, showing these higher and closer to the reference node in the hyper-text display. This would facilitate searching back into the graph to find an appropriate place to modify or challenge an argument so as to change the result. Subject to this relevance criterion, lines may be ordered by type of edge. In the described embodiment, first incoming edges are listed followed by outgoing edges but other conventions could be chosen.

So for a top node that is NOT-TE, if there are any NOT-TE assumptions, these may be presented first, since changing them would be critical for changing its status, followed by TE Challenges to the node, which would also need to be changed to change the status, followed by TE assumptions, TE Arguments for the node, NOT-TE Challenges to the node, NOT-TE results of the node (which may be made TE if the node were made TE), and TE results of the node, followed by challenges by the node of TE nodes, followed by challenges by the node of nodes that are not TE. For a top node that is TE this embodiment would prioritize assumptions that are TE (changing them would change its status), followed by challenges that are not TE, followed by arguments that are TE, arguments that aren't TE, and then followed by outgoing edges: Results that aren't TE, Results that are TE, Nodes the node is challenging that aren't TE. Other standard orders could be chosen. The ordering could be customizable by the user.

An alternative embodiment may always prioritize in a fixed order such as from highest to lowest: assumption, argument, challenge of, result, challenge to another node, and then within each category prioritize TE first followed by TE C followed by NOT-TE. An embodiment may further prioritize by EL, if it updates an EL for the nodes.

The hypertext based graph viewer may print a line describing a particular node of the graph first, followed by lines describing its neighbors in a prescribed order and indentation. The lines themselves may be hypertexts, and when one is clicked or otherwise selected for opening, the hypertext based graph viewer may print a line describing that node followed by lines describing its neighbors. Thus one may explore the graph by a series of clicks. The lines may contain and display a number or name for the node, and/or a running head, and/or an abbreviation of the nature of the link (such as: Cha for challenge of, Ass for Assumption of, Arg for Argument for, OCh for (outgoing) challenge by the node of another, Res for result). The lines may also display an EL value of one is computed. They may also indicate by bold face and/or color and/or stars or prominent icon, whether a node is TE or not. They may also have hypertext giving the condition of nodes that are TE C.

Nodes that are TE C may have a condition depending logically on a number of axiomatized nodes, and a description may be given as generated by the update rule in terms of formula over the names of axiomatized nodes. The names may be hyperlinked to the nodes, so that users may readily explore down into the nature of the axiomatizations. Clicking on a name, the viewer may print the associated axiomatized node.

If the hypertexts are selected in another way, for example with a rightclick, a menu of editing options may be provided to modify the graph as it pertains to the referenced node or its neighbors, as illustrated in FIG. 19(b). If the hypertext for a line is selected in another way, such as hovering the mouse pointer over it, it may display or pop a more extensive window showing its contents as illustrated in FIG. 19(a).

The first line displayed may give a running head of the Result or Target node for the graph. It is marked in the illustration with a highlight (*) and in bold to make clear it is a TE node. Its number, name, or designation (in this case 15.1) may be given. In embodiments where an EL is computed, the EL may be displayed. Below this node the nodes it has edges to may be printed. Each hypertext line may similarly give an abbreviation of the connection type, a * and bold for TE, a running head, an EL FIG., its condition if it is TE C, and possibly other things such as if the edge itself is challenged, the identifier and information of the challenge node.

In an alternative embodiment, nodes may be of the following types:
1. Statement
2. Conditional
3. Citation
4. Suggested Edit
5. Virtual Argument
6. Test
7. Negation Each of these may be represented on the graph by a particular icon. For example, the statement may be represented by a rectangle, the conditional by a round edged rectangle, a citation by a small star, a suggested edit by a scalloped-edge cloud shape, a virtual argument by a circle with a "?" on it inserted in the middle of an edge so the edge points into the circle and then out of it to its destination, and a test node may be represented by a rectangle like another statement, but recognizable by its outgoing test edge, which may be iconically colored, say blue. A negation node may be represented by an icon of the same type as the node it is a negation of, or simply by a rectangle, but it may be recognizable by the double-ended arrow negation edge into the node it is a negation of. A negation node when added may automatically be given Running head NOT:"X" where X is the running head of the node it is a negation of. For example a node whose running head was "Cows are brown" would have a negation whose running head may be: NOT: Cows are brown. This running head may be automatically inserted by the system when the negation is created. Likewise the negation may have an automatically entered Declaration which is NOT:"Declaration1" where by "Declaration1" it is meant the contents or text of the Declaration of the node of which it is the negation.

A conditional node may be otherwise identical to a Statement node, except that conditional node has incoming assumption edges, and may be represented with a different icon. In an alternative embodiment conditional nodes may simply be represented exactly as Statement nodes, or may be replaced with statement nodes. In this case the existence of assumptions may be clear to the users because the assumption edges are marked in a different color, such as light blue. A citation node may represent some citation into the outside literature or some external source. It may have an outgoing argument edge into one or more Statement, virtual argument, suggested edit, test or conditional nodes. A node it's connected to may state in its declaration what particular declaration the citation is being taken as supporting. A suggested edit node may be connected by a suggested edit edge to a node it is suggesting a change in. A test node may be connected by a test edge to a node it is assaying, called its subject or child node. In most embodiments neither test edges nor suggested edit edges will affect or be considered in the rating update process, although test edges may be used in the belief update process. A virtual argument node may be inserted automatically in an edge when the edge is challenged, so that the incoming challenge edge has a node to point to. When the virtual argument node is edited to insert a declaration, it may be converted to a normal argument node.

A node may have:
1. Identifier typically automatically generated as next node number available or in some embodiments the identifier of the form graphname.nodenumber can be used to refer to it from within other graphs).
2. Running head (may have character limit).
3. Declaration (a editable and viewable file that will typically support hypertext and images)
4. metadata (such as last edited, last edited by, owner, . . . )
5. List of Assumptions (if any)
6. List of Arguments (if any)
7. List of incoming Challenges (if any)
8. List of Results (if any) (i.e., outgoing Argument edges)
9. List of outgoing Challenge edges (if any)
10. List of incoming test edges
11. List of outgoing test edges
12. Whether it has a negation
13. Rating (automatically updated, as detailed below)
14. Belief B, (automatically updated as detailed below)
15. Proposed Belief PB (field entered by user, default 1.0 if not entered.)
16. Expected Likelihood (field entered by user, if node has outgoing assay edge).
17. Node type
18. Edit history (saved and viewable by users).
19. A number of complaints that it is Frivolous, and a number of votes that it is Interesting (this may only be kept for challenges or responses after the issue is raised by challenger or responder).
20. A number of likes and a number of dislikes.
21. An axiomatization status. By default this may be "NOT Axiomatized", but some users may have the ability to launch a duplicate graph except with a node set to "Axiomatized True" and users may also have the ability to generate a display of the graph that would result if some set of nodes axiomatization status were set.
22. A page of comments, like you might find at the bottom of a blog post, which a class of users may add to.
23. A user dependent display status, determining whether this node is displayed when the user views the graph. The default may be to only show certain nodes, e.g. the topic node and some neighbors. The user may be able to click on nodes and expand their neighbors, toggling this status at the neighbors. Users may also have access to commands allowing toggling classes of nodes, e.g. whether NOT-TE nodes are displayed or not.

Edge Types may include:
1. Challenge
2. Responded-to-Challenge
3. Negation
4. Argument 5. Assumption
6. Suggested Edit
7. Test An edge may have:
1. A type (Argument, Assumption, etc. as above)
2. A TE status (taken from the TE status of its parent).
3. A parent (which it is from) and a child (which it points to).
4. One or more owners, who created it, can delete it, and/or may own the virtual argument node if the edge is challenged.
5. Edges of a given type may have a given iconic representation. For example, challenges may be represented by a red arrow, responded-to challenges by a pale and/or dashed red arrow, negation edges by a bi-directed red arrow (with an arrowhead pointing each way), arguments by a black arrow, Assumptions by a blue arrow, Tests by a purple arrow, Suggested edits by a brown arrow.

In some embodiments each node may have a quantity computed for it called "Belief" and designate B, which may correspond to an estimate for the likelihood the node's declaration is true.

A node may also specify a Proposed Belief or PB. If users do not specify a different value, the default PB for every node may be 1.

Tests (or sometimes called Assays) are another edge type. They are directed from a Test node to any other node that may be called its target.

In some embodiments, when the test edges are included, the graph may include cycles, or in others cycles may not be permitted. The test node may propose a likelihood its target node's declaration is true. This may be designated P(1|A), the likelihood the node has a 1 given the test A. This may be called the Likelihood Estimate LE of the test node. This may simply be a user-entered number associated with the test edge and/or node.

The Likelihood Estimate may represent to users the probability some observed test results would be observed if the declaration was true divided by the sum of the probability said observed test results would be observed if the declaration was true Plus the probability that said observed test results would be observed if the target declaration failed to hold. (Other users may choose to challenge the Test node, for example if they propose some argument why the entered Likelihood estimate does not accurately represent this quantity.) In some embodiments a log likelihood may be used instead. It may be a user-entered number, in some embodiments modified by the application of a logarithm or other function. In any case it may be a number entered by a user that may enter into the computation of the Beliefs of nodes as described below.

The test node T may itself have a B(T) which estimates the belief the node T itself is true. The test edge does not affect ratings of nodes, or the calculations of depth of nodes used for sequencing rating updates. Its only use may be for computing Beliefs of nodes. Other edges than a single test edge outgoing from a test node may be disallowed in some embodiments.

A belief B may be computed for each of the nodes in the graph by the following Monte Carlo algorithm.

The following is repeated enough times until it is satisfied that enough data points has been collected for statistical accuracy that is desired. In practice, it may be repeated a number of times, and then the current results are displayed to the users, and then repeating is continued more times to refine the estimate in background, updating the displayed numbers from time to time until a satisfactory accuracy has been achieved.

An update of the graph may be performed as follows that assigns a value of 0 or 1 to each node and a weight W to the total configuration or example. For each Edepth-0 node, the system assigns it a 0 or a 1 according to its PB. With probability PB the system assigns it a 1 and with probability 1-PB the system assigns it a 0. Then updating as follows is continued throughout the graph in E-depth order. A node will be updated to 1 if it would be TE if all of its 1 parents were TE and all of its 0 parents were NOT-TE. Conversely it will be updated to 0 if it would be NOT-TE under the same substitution. So if it has any value 1 challenges, or value 0 assumptions, or if it has one or more value 0 arguments but no value 1 argument, then it will be updated to value 0. And otherwise it will be updated to value 1. Then, after that step, if the node has a PB different from 1, you randomize further and with likelihood 1-PB you set the value to 0, even if the above step made it 1. A node that is axiomatized, is assigned 1 with likelihood its PB and 0 with likelihood 1-PB, determining the protocol so axiomatization represents defining the node to be true as entered by the user, including the users assignment of intrinsic probability, unless it is one of a set of n-choice nodes. In the latter case, the axiomatized node is set to 1 and the other alternatives to 0 (defining the protocol so as to have axiomatization represent assuming that choice and not the others.)

After running through the whole graph assigning 0's and 1's in this way a single configuration is created. The next step is to assign a weight to this configuration. This is done by multiplying together the LE for each test edge from a test with a 1 value to a node with a 1 value, and multiplying together by (1-LE) for each test edge from a test with a 1 value to a node with a 0 value, and multiplying by ½ for every Test edge from a Test with 0 value independent of the target value. The product of these terms is the weight W of the configuration, or example.

At each node two quantities W1 and W0 are maintained and updated. W0 is the total weight of configurations having a 0 at this node. W1 is the total weight of configurations having a 1 at this node. B at the node is updated as W1/(W0+W1)

The B's for nodes may be displayed on the node, for example in the lower left hand corner, or there may be an option to have the boundaries of each node be proportional in thickness and or darkness to its Belief.

Figure 22A:
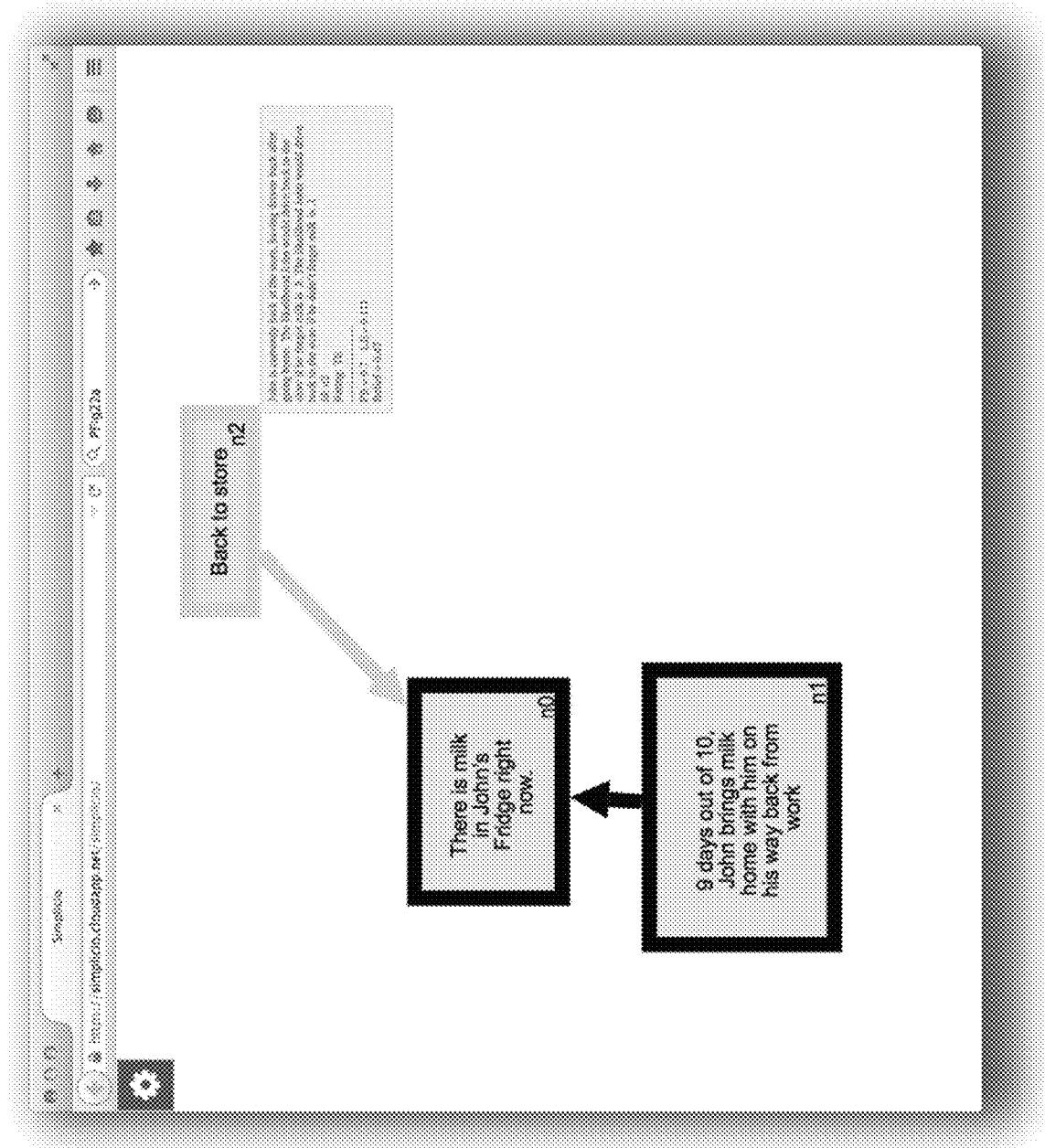
FIGS. 22(a) and 22(b) are screenshots showing a graph illustrating how Monte Carlo examples are generated and Beliefs are updated.
Figure 22B:
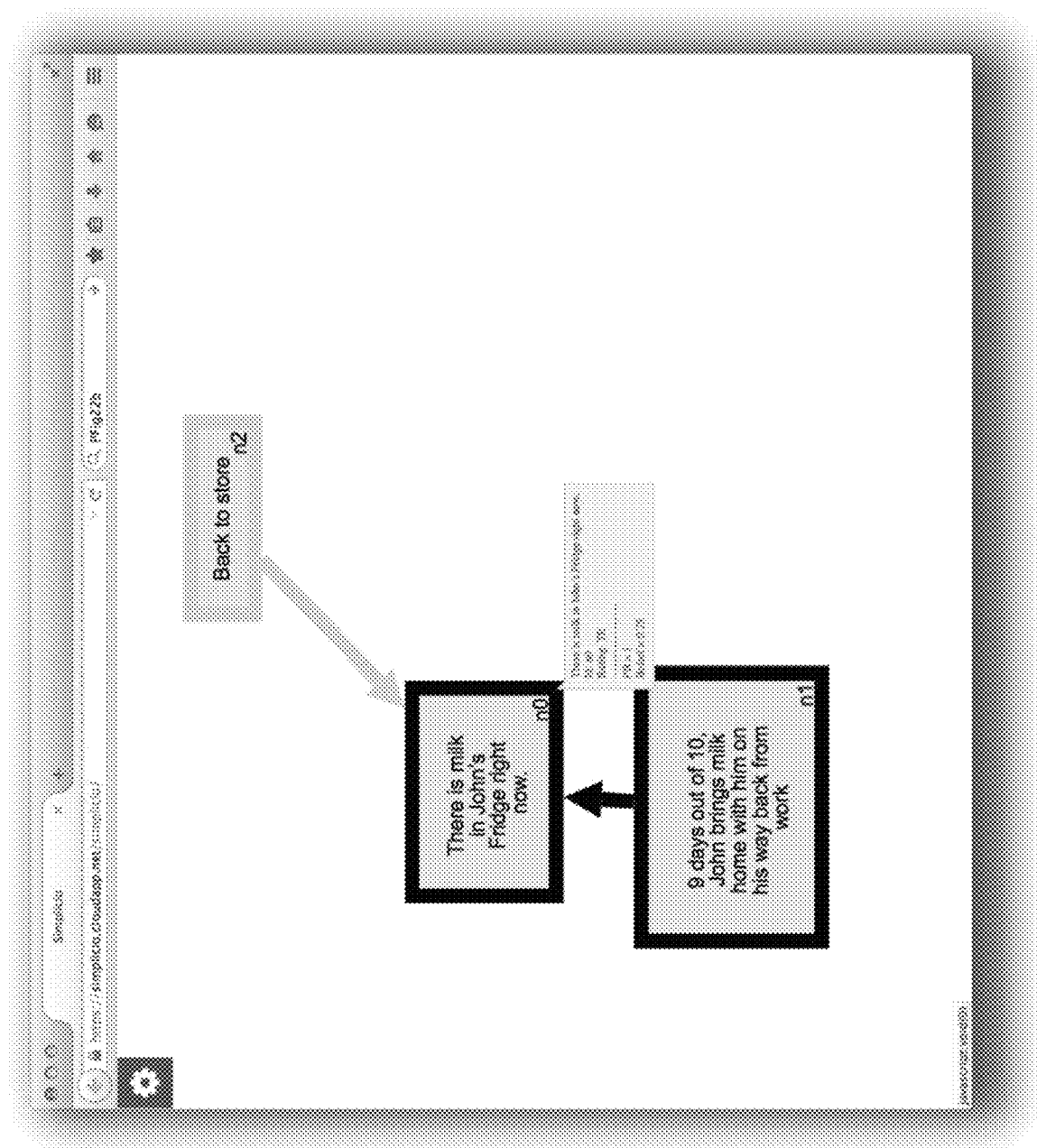

An example of this procedure is illustrated at FIGS. 22(a) and (b), representing screen shots of a simple graph containing a Topic node n0 with running head and declaration "There is milk in John's Fridge right now." The running head of node n0 is displayed by the system in the yellow popup window in FIG. 22(b) in response to the mouse hovering over the node. (Mouse pointer not shown in screenshot.) This window also shows the nodes rating (TE), its PB 1 and its Belief (computed by the system) 0.75. The user did not enter a PB for the node, so its default value is 1.0. An argument node n1 with running head and declaration "9 days out of 10, John brings milk home with him on his way back from work" has a PB 0.9 (PB not shown). A test node with running head "Back to store" and a declaration "John is currently back at the store, having driven back after going home. The likelihood John would drive back to the store if he has no milk in his fridge is 0.8. The likelihood John would drive back to the store if he didn't forget milk is 0.1" This declaration is shown in FIG. 22(a) in response to the mouse pointer hovering over node n2, as is the nodes rating (TE), PB (0.7) LE=0.111 and Belief, computed by the system, 0.47. The Likelihood Estimate of this node is 0.111 (which was entered by a user and may represent 0.1/(0.8+0.1). (An alternative embodiment may support users to enter other information from which an LE is automatically computed, such as allowing users to enter a number LE1 to represent the likelihood of the test given the subject true, and a number LE0 to represent the likelihood of the test given the subject false, and then the system may automatically compute LE=LE1/(LE1+LE0).)

The PB of this node, which was entered by a user, is 0.7. This may, for example, represent the user's estimate that there is a 70% chance John went back to the store. There is a 30% chance he was mistaken about that, and he has no idea where John went.

The B values for the nodes in FIGS. 22(a) and 22(b) may be computed by the Monte Carlo process and updated by the system. Monte Carlo instances may be generated as described above as follows. Each instance will have a value for each node in the graph. For the first instance the system chooses a 1 or a 0 for n1 with likelihood 0.9 of being 1 and 0.1 of being 0, since n1 has a PB of 0.9. cf block 21.12. A 1 or 0 is chosen for n2 with likelihood 0.7 of being 1 and 0.3 of being 0, (again cf block 21.12 and because n2 has PB of 0.7) n0 is set to 1 if a 1 exists for n1 and a 0 otherwise, because its PB is 1.0. A weight is then computed for this instance which is 0.111 if the instance value found for n0 was a 1 and the instance value found for n2 was a 1, and is 0.889 if the instance value found for n0 was a 0 and the instance value found for n2 was a 1 and which is otherwise ½.

There are thus the following possibilities:

n1: 1, n0: 1, n2: 1, weight: .111
n1: 1, n0: 1 n2: 0 weight: .5
n1: 0, n0: 0, n2: 1 weight: .889
n1: 0, n0: 0, n2: 0 weight: .5

The first of these may be generated about 0.9*0.7 of the time. The second may be generated about 0.9*0.3 of the time. The third may be generated about 0.1*0.7 of the time. The fourth may be generated about 0.1*0.3 of the time.

Thus the expected increase in W1 per MC instance is 0.204=(0.9*0.7*0.111+0.9*0.3*0.5) And the expected increase in W0 per MC instance, representing the total weight of instances seen having node n0 be 0 is 0.077=0.1*0.7*0.889+0.1*0.3*0.5) W0+W1=the expected weight of an instance is 0.282. And the Belief estimated for Node 0 will tend to 0.723.

Note that the Monte Carlo estimate thus may tend to the likelihood one would compute for finding the n0 node in the 1 position given one was told its value was generated by the process of a cause giving likelihood 0.9 of making it 1, and a test which was known to be 70% reliable and which resulted in a value predicting that the likelihood the node was in state 1 was 0.111.

Likewise the belief in node 1 is the same 0.723. The belief in node 2 has expected value per instance of 0.468=(0.9*0.7*0.111+0.1*0.7*0.889)/0.282.

Note that the Belief the system shows for n2 (FIG. 22a, 0.47) and the belief the system shows for n0 (FIG. 22b, 0.75) are close to the theoretical values but not exactly spot on. This is because the system illustrated was using only a small number of Monte Carlo examples in its calculation so there is some random variation. More accurate (but slightly slower) valuations may be provided by using more examples in the algorithm.

Note that the result makes intuitive sense. The Test n2 says, because he probably went back to store, he probably forgot milk. The argument n1 says, he probably got milk. The computed result for whether he did or not, is in the middle. Also, the node n2, which was accorded only 70% chance of being correct in the first place, is estimated at only 47% likely. The fact its result contradicts the argument makes it more likely to be mistaken in this case. Similarly, the belief the argument is valid dropped from its proposed 0.9 to 0.75 because it was contradicted by the Test result.

One may see that the algorithm given for generating instances will generate only certain instances, and it generates them with a certain likelihood. It thus may define a probability distribution over those states of the system that may arise under the probability model and may sample proportionally to its probability under this distribution. The Belief assigned to a node then converges to the sum over all states accessible to the system for which that node is assigned a 1, or considered true, according to their probability.

Figure 23:
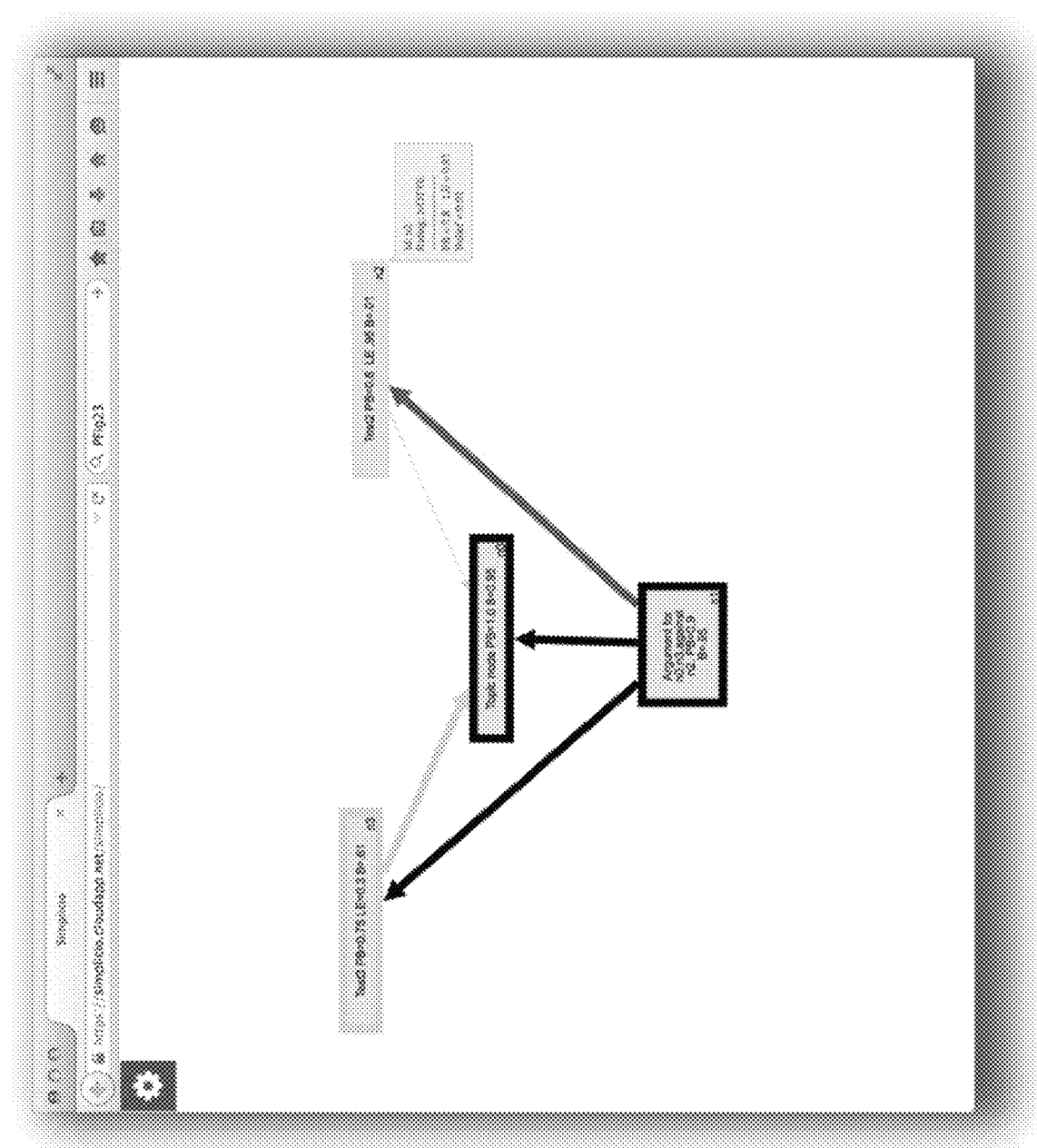
FIG. 23 is a screenshot showing a graph illustrating how the Monte Carlo examples are generated and Beliefs are updated.

A second example graph is illustrated in FIG. 23. There are now two test nodes, n2 and n3, and one argument node n1, which challenges n2 and supports n3. n0 has a PB of 1. n1 has a PB of 0.9. n2 has a LE of 0.95 and a PB of 0.8. n3 Has a LE of 0.3 and a PB of 0.75 So there are the following possible MC instances and weights.

| n1 | n0 | n2 | n3 | weight  | probability | expected weight |
|----|----|----|----|---------|-------------|-----------------|
| 1  | 1  | 0  | 1  | .3 * .5 | .9 * .75    | .10125          |
| 1  | 1  | 0  | 0  | .5 * .5 | .9 * .25    | .05625          |
| 0  | 0  | 1  | 0  | .05 * .5| .1 * .8     | .00200          |
| 0  | 0  | 0  | 0  | .5 * .5 | .1 * .2     | .00500          |
|    |    |    |    |         |             | .16450          | where the probability gives the expected fraction of instances the Monte Carlo is likely to generate of the corresponding type, and the weight is the weight given to the instances, the expected weight column is the product of the previous two, and the last row on it is the sum of the expected weight of any kind of example. The 0.9 probability represents the draw of the value for 1. Then the value for n0 is determined, because its PB is 1. The value of n2 will be determined to be 0 if n1 was a 1. If n1 was a 0, then n2 will be 1 with probability its PB and 0 with probability 1—its PB or 0.2. If n1 was a 1 then n2 will be 0 because it is challenged by a 1 node. If n1 is a 1, then n3 will be 1 with probability its PB or 0.75, and a 0 with probability 0.25. The weight reflects the LE's assigned to the edges of the instances. For example, the 0.05*0.5 weight of the third row is the product of (1-LE) for n2 and ½ for n3. The total expected weight is 0.16450. The B computed for n0 will tend to the sum of the weights of the rows with n0=1 divided by 0.1645 or (0.10125+0.05625)/0.1645=0.95744. This is also the B for n1. The B for n2 may tend to 0.002/0.1645=0.01215 And the B for n3 may tend to 0.10125/0.1645=0.61550.

In the system to make the FIG. transparent, the values for PB and LE have been entered not only into their fields in the respective nodes, but also written them into the running head so they would be visible on the diagram. The mouse over node n2 induces the system to display the yellow bubble showing the systems calculation of Belief for n2 yields 0.01.

The Belief update procedure may be further understood with reference to FIGS. 21(a)-21(f). FIG. 21(a) shows the update procedure at the top level. The system first initiates two variables, W0 and a W1 at each node in the graph, to all initially start at 0 at block 21.1.

Then in block 21.16 the system starts asking whether enough Monte Carlo examples have been evaluated that the likelihoods have converged enough. Initially, the answer will be NO, as none have been evaluated, so the system will go to block 21.17. An embodiment of the system may use various criteria for deciding if enough examples have been evaluated. One criterion may be if a certain number of examples have been evaluated, like 100. An alternative criterion may be to evaluate the Belief for all the nodes by the equation in block 21.20 after a certain number of examples have been evaluated, like 50, and then again every time 50 more examples have been evaluated, and to cease evaluation when the largest change in belief at any node over the last 50 is less than 0.01. Other criteria may also be used. When enough examples have been generated, then block 21.20 sets the belief at each node in terms of its W1 and W0.

In block 21.17, a new Monte Carlo Example is generated by the process of FIG. 21(*b*). An example will consist of an assignment of a value 0 or 1 to each node in the graph. All the nodes in the graph have been previously sorted by order of their EDepth. Recall the EDepth of each node is defined to be the length of the longest path through the graph ending at the node following edge direction, going over at most one direction of a negation or n-choice edge, and not using assay (test) or suggested edit edges. In FIG. 21(*b*), the nodes are processed in order of increasing E-Depth, and for each it is updated using the process of FIG. 21(*c*), generating a value of 0 or 1 for the node. When all nodes have been so updated, the example is constructed.

In FIG. 21(*c*), a node is updated by first asking at block 12.3 if it is an n-choice node (assuming the embodiment supports those.) If yes, at block 21.3 a value is generated for it and its partners by using FIG. 21(*d*). If not, at block 21.4 a value is generated for it by using FIG. 21(*e*).

In FIG. 21(*d*) for n-choice nodes, the system first asks if any of the partners are axiomatized at block 21.5. If yes, then at block 21.6, a value 1 is generated for the axiomatized node and 0 for the partners. If no, at block 21.7, the system first generates a temporary value Ui for each partner i as if the others didn't exist. That is, the system pretends for each of the partners, that it wasn't a partner and didn't have n-choice or negation edges to the other partners, and generate a temporary or placeholder value for it as would be performed according to FIG. 21(*e*). For alternative i, the value generated this way is called Ui.

After generating the Ui, final values are assigned to each of the alternatives as follows. If one Ui is 1 and the rest 0, then the system generates final value 1 for node i, and final value 0 for the other partners. If two or more temporary values are 1 and the rest 0, the system selects one of the 1 valued partners at random, and generate final value 1 for it and 0 for all others. If all Ui are 0, then the system generates a 0 as final value for all the alternatives (or in an alternative embodiment, the system may pick one at random to be 1 and the rest 0.) These final values get added to the example under construction, and the construction of the example proceeds in block 21.2 if there are other nodes yet to assign values in the example, or in block 21.6 if the example is complete after the n-choice nodes are assigned values.

FIG. 21(*e*) explains how a value of 0 or 1 is assigned to a node that is not an n-choice node (and how the temporary values are generated for n-choice nodes). The system first asks at block 21.8 if the node is axiomatized. (If the node is an n-choice node, the answer will be no since this case was handled in at block 21.6, so at block 21.9 is not appropriate for them.) If the node is axiomatized, at block 21.9, the value 1 is generated for the node with probability PB of the node, else the value 0 is generated. This may be sensible because the axiomatization of a node assumes the node is valid, and the PB may be a stated probability that holds when the node may be valid. This formulation supports users to declare and assume probabilistic nodes. An alternative embodiment could instead replace at block 21.9 with an assignment of 1 to the axiomatized node. In block 21.6 for n-choice nodes, a value of 1 was used for the axiomatized node because n-choice nodes may be interpreted by users who choose to as inherently calling for 1 of them to be on. An alternative embodiment could generate a 1 according to the formulation of block 21.9 for n-choice nodes with a stated PB not equal 1.

If the node is not axiomatized, at block 21.10, the system next asks if it has a challenge from a value 1 node, or an assumption edge from a value 0 node, or if it has arguments, but all are from value 0 nodes. If any of these are true, at block 21.11, the value 0 is generated for the node. Otherwise, at block 21.12, the value 1 is generated for the node with probability PB of the node, else its value is set to 0.

A Monte Carlo Example is complete after the system generates a value for each node in the graph using FIG. 21(*b*) and FIG. 21(*c*), and then (d) and/or (e). Then the system returns to block 21.19, in FIG. 21(*a*), and generate a weight for the example 21.19 using the method of FIG. 21(*f*). The weight for an example is initiated at 1 at block 21.13. Then the system multiplies it by the LE of each Test Edge from a Test Node with value 1 in the example to a target node with value 1 in the example at block 21.14. Then the system multiplies it by (1-LE) of each Test Edge from a Test Node with value 1 in the example to a target node with value 0 in the example at block 21.15. Then the system multiplies it by ½ for each Test Edge from a Test Node with value 0, independent of the value of the target node at block 21.18. This generates the weight of the example at block 21.19. Then the system returns to block 21.21. In block 21.21 the system runs through all the nodes in the graph and update for each an associated number w1 or w0. For each node which has value 1 in the example, the system adds the weight of the example to its w1. For each node which has value 0 in the example, the system adds the weight of the example to its w0. Then the system returns to block 21.16 and determines if the system has enough examples yet. If the answer is yes, then the system sets the belief at each respective node in the graph to be its respective value for w1/(w1+w0) at block 21.20. Supporting axiomatization as discussed axiomatizes the PB of a node as its likelihood. At the same time, users may be able to infer which other nodes this axiomatization is affecting by which other nodes TE status is conditional on this axiomatization variable. The embodiment may support both personal and shared axiomatizations by Users. Users in one embodiment may right-click on a node and select "Axiomatize" from a drop down menu. When they do that they are offered to set an axiomatized PB for the node that will be used for generating MC examples as above. These axiomatizations may, however, only affect the local display that they see, not what is seen by others. This allows users to consider various options of axiomatization and probabilistic estimates, and see the results. Axiomatizations may become global, that is saved into a shared graph, if the user shares the graph. This may require a different level of user-privilege.

In an alternative embodiment, instead of evaluating the beliefs of the nodes by this Monte Carlo procedure, one could replace the randomized selection of examples by an exhaustive generation of all examples that have non-zero probability according to the Monte Carlo process. This is straightforward to do by replacing the random choices in at blocks 21.9 and 21.12 and 21.7 by a sequential search over the alternatives. For each such example exhaustively generated the system may compute an associated probability with which the MC process would generate it. This is straightforward because it gets a factor PB or (1-PB) for each node at which such a choice is made depending on which choice (1 or 0 respectively). It also gets a weight as before from FIG. 21(*f*). Each example is then weighted by the product of the weight and its probability. For graphs with no more than 10 or so depth 0 nodes that have PB not equal to 1, this alternative may be faster and more precise.

Another feature of an embodiment is a stylized display that allows users to rapidly understand the graphs.

In particular, graphs may be created around a topic declaration, that it may be desired or proposed to prove or disprove. After the topic sentence is added to start the graph, arguments, assumptions, challenges, and other nodes may be added to it, and then others added to them and so on. For example if a user right-clicks the mouse button on a displayed node, the system may drop a menu allowing the user to select the kind of node to attach, and then provide a window to enter the relevant information into the new node. The display may attach nodes in a stylized way, with assumption nodes below and argument nodes below a node, With assumption nodes to the left of argument nodes for the same node, challenge edges running right to left and above the argument edges for the node, test edges running left to right. Edges of a given type may tend to be displayed pointing in a particular direction. In another embodiment, argument edges tend to be drawn up and to the left, assumption edges up and to the right, challenge edges from right to left, and assay edges from left to right. This yields a fixed representation to which users may become accustomed.

In an alternative embodiment the nodes may be regarded as belonging to two opposing teams PRO and CON. In some embodiments with Pro's edges (whether argument, assumption or challenge) may be drawn mostly vertical and Con's edges whether argument assumption or challenge, may be drawn mostly right to left, argument going vertical and challenge going right to left. A node with multiple edges may have a primary edge which may be user designated or else may be the node it was added to the graph with. In the current embodiment it is by default the edge it was added to the graph with. Nodes that are Pro may be displayed shaded in one color, say blue, and nodes that re Con may be displayed in another color, say red. The system may maintain permissions so that certain users are able to edit Pro nodes and certain users are able to edit Con nodes.

An edge may be classified as Pro if it is an argument or assumption for a Pro node or if it is a challenge for a Con node. An edge may be classified as Con if it is an argument or assumption for a Con node or a challenge for a Pro node.

A node may be classified as Pro if it is the topic sentence or if it's primary edge is Pro. A node may be classified as Con if it is the Negation of the Topic or if its primary edge is Con. By drawing the Con edges horizontal and the Pro edges vertical the system may facilitate rapid analysis by users.

In an alternative embodiment, permissions may be handled as follows. Each node has one or more owners, including the creator, but he may be part of a team or class of individuals empowered to edit the node and respond to challenges, the creator's team. Team debates are supported in which members of one team argue for one side, having editing privileges on nodes controlled by that side, but having the ability to issue challenges to nodes controlled by the other side. Suggested edits may be posted at nodes, in one embodiment as comments on a comment stream. In an alternative embodiment suggested edits may be posted as a suggested edit node, with a suggested edit edge pointing to the node the edit is suggested for. In either case there may be like/dislike buttons associated with suggested edits that are enabled only for team members, so that the votes of team members may be counted.

The owners of a node can edit it and respond to challenges to it. A wide class of users called "Authors" may challenge any node or add edges to any node or add new nodes connected by an edge. In some embodiments only the owner of a node may add assumptions to it, but Authors may add arguments for it or claim it challenges another node or add its negation to the graph. Adding the negation node to the graph may add a node that has running head "NOT:X" where X is the running head of the first node, and that has declaration: "NOT:Y" where Y is the declaration of the first node. The "NOT" should be in very bold letters. The running head and declaration of either node may not be edited without removing the Negation edge. The owner of the negation node by default may be its creator (the author who added it to the graph). In an alternative embodiment the owner of the negation node may be the owner of the node, as both may be changed together in lockstep.

When a node is challenged, the owner of the node may respond to the challenge by editing the node and indicating the challenge has been responded to (e.g. by using a "Responded to Challenge" button that may be made available to him during the edit.) This may have the effect of transforming the challenge edge into a "responded-to challenge" edge. He may also be able to flag the challenge node as frivolous, which may launch frivolous/legit buttons below the challenge node allowing users to vote and the current vote to be read. (Doing so, flagging the node, may also display an ARE YOU SURE accompanied by a warning such as one that: "a claim of frivolity is an assertion of deliberate misconduct, and that frivolous assertions of misconduct are themselves misconduct punishable by disbarment. A challenge is considered frivolous only if the intent of the user is to obfuscate rather than clarify.") The owner of the challenge node may then be able to edit his challenge, in which case he may have the opportunity to turn the edge back into a challenge edge. He may at that time flag the response as frivolous, which may generate a similar message but if accepted by the user, launch frivolous/legit buttons below the responding node.

In an alternative embodiment, the owner of a node may edit it in response to a challenge, and then issue a challenge to the challenge saying it had been responded to. The response node may include automatically a track-marked copy (or a link to such a copy) of the challenged node, showing the response, if any. If the response included addition of or modification of supporting nodes (such as arguments or assumptions) the response node may include a list of links to or names of the added nodes.

There may also be possible to add a special kind of challenge called a frivolous flag or simply a flag node. A flag node may come with a vote button, that solicits opinion from users as to whether the node was frivolous. The use of frivolous flags on public (or otherwise) graphs may be noted, and users found to employ flags too frequently or when they are not supported later by votes or when moderators determine they are frivolous, may be excluded. Users who post nodes that are deemed frivolous may be excluded. A Flag node may be treated as automatically axiomatized if it is sustained by a vote and challenged, and the priority displayed version of a topic (if user does not select another one) may be the version with sustained challenged flag nodes axiomatized.

A class of users called "Initiators" may be able to launch new graphs by entering a new topic node. There may be 2 subclasses of Initiators, those who can edit the topic node after the graph has been launched and edited further by others, and those who can't. In an embodiment, Initiators own the topic node like any other node's owner and can edit it. The website may also enable user-initiated publicly debated topics where the topic is frozen, or at least requires approval of moderator to edit. Also enabled may be user-initiated topics where the topic node may be refined just like any other.

The present disclosure has the philosophy: participants are working to discover what may be established, and therefore should be enabled to refine the topic declaration just as any other node, so they are. A class of users called "Super-Initiators" may be able to launch new graphs by entering a new topic node, and restrict who can edit the graph, and who can view it. (Part of a business plan may be to sell access to different classes of privilege for varying amounts. The ability to keep the graph private to your selected viewers may allow enterprises, for example, to use the system for planning.)

A class of users called "Forkers" may axiomatize nodes. This may launch another graph identical to the one the operation is performed on, including ownerships and axiomatizations of the nodes, except with the node specified being axiomatized as specified. That means its status is fixed in this graph to TE (or in some embodiments maybe NOT-TE) as per the axiomatization. When a renewed challenge is flagged as frivolous, the axiomatized graph with the challenge axiomatized as false may become the default graph displayed to users. When a response is flagged as frivolous, the axiomatized graph with the challenge axiomatized as true may become the default graph.

Users who enter the system may see a searchable list of existing topics. A given topic may exist in several prioritized axiomatizations. The highest priority graph, displayed by default, may be the one with only nodes labelled as frivolous axiomatized, and these nodes that are axiomatized and frivolous only optionally displayed. (There may be an available display of what other axiomatizations are available. Topics may be organized in some form of ontological hierarchy with the least important bits indexing the branching axiomatization, or simple linear alphabetic, by topic, but then with the topics further expandable to drop down variants listing axiomatizations.) The designation may be made by a super-user of some class. For high visibility public graphs it may be made by a moderator with the aid of the vote and request from the author flagging the challenge or response. This moderator may more generally be the initiator or super-initiator who created the graph. A broader class of Forkers may be able to create a forked graph with a node axiomatized, without however making it the default graph for the topic. Indeed, most users may have this power. In this case people may vote with their feet for an alternative axiomatization. The most popular or most recently edited axiomatization may be presented at or near the top of the prioritized list of available axiomatizations for a graph.

Users who wish to change a node's Declaration or running head but don't have privilege to edit it and don't wish to dispute its TE status in the interim by Challenging may add a "Suggested Edit" Node to it. This will be ignored by the Rating status update. Suggested edits may be accepted or partially accepted or declined or challenged by the owner. If the edit is accepted or partially accepted, the node owner may retain or also transfer ownership of the edited node. To promote the flow of ideas in public graphs, the default may be set that if no response of any of the above types happens for some period of time, the edit will be automatically made if the edit node has more likes than not. (Owners of sufficient privilege may be able to set a flag on some or all of their nodes so that such automatic edits are not done.)

Users who wish to insist on an edit if their edit is declined, or partially accepted, may challenge the node if they can supply a Declaration stating why it is wrong (one not containing such a Declaration could be entered into the system by a malicious user but would be frivolous) and may also create a parallel node having their edit. (Authors may generally challenge nodes, and may generally add new nodes, so this combination is available to them without bothering suggesting an edit first. However suggesting an edit first may be considered good style at least when you don't think the Declaration is wrong (as opposed to improvable)).

Authors whose edits are declined or partially accepted, may be presented a button to create a duplicate node comprising their edit. Such a node may come with frivolous/legit vote button. If there are multiple nodes with identical in and out edges, except for incoming challenge edges, that are thus different versions of the same node, (one or more versions being challenged) these may be displayed as if above one another in some dimension at a location, with the edges to a given target fusing, or as a multi-node that can be expanded to show detailed structure.

In some embodiments there may also be a provision for users to comment on the nodes by clicking a comment button, which will allow them to enter a comment pertaining to the node or to previous comments on the node. The comments may typically be visible at the bottom of the node's view page. The comments may be extendable into graphs by adding challenges or arguments for the comments, recursively so that a challenge to a comment, which may be a comment below it of type challenge, could itself have replies that may be challenges or arguments. Below a comment on the view page, there may be a button "Support" and a button "Challenge" which may when clicked open a window in which a user may enter a comment of the corresponding type. The status of comments in the comment string may then be maintained according to whether it is TE or NOT-TE, depending on whether it is validly challenged and/or supported by other established replies of type challenge or support respectively. Each comment's status as well as its type may be visible in the boldness of the top level name for the comment. That is, instead of the comments having a reply button, the comments have a challenge button and a support button, with separate icons, and the boldness of the header or the icon at the beginning of a response in the display indicates whether that response or comment is TE in the comment board.

Figure 26:
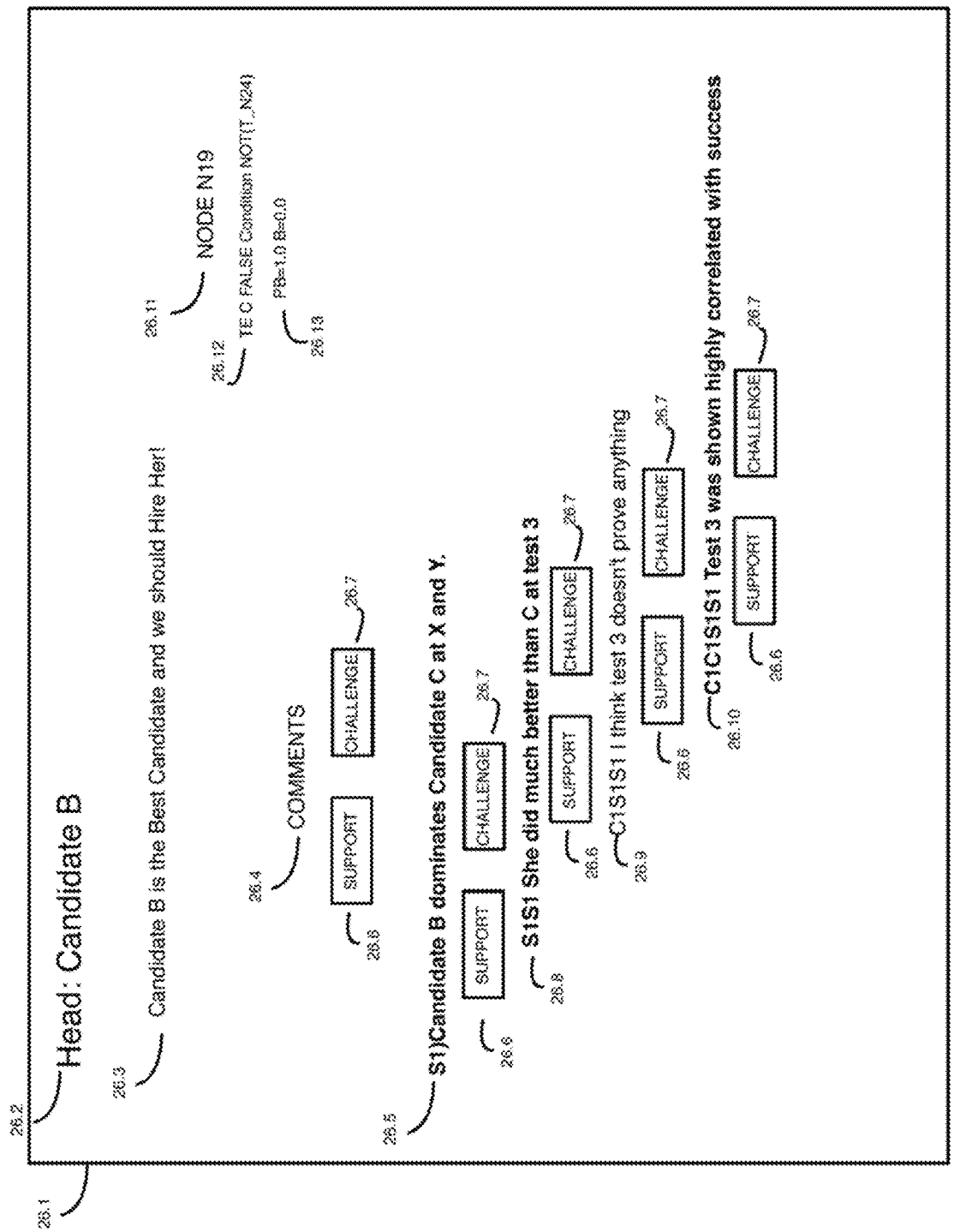
FIG. 26 shows a depiction of the View window of node n19 in FIG. 20 illustrating the comment statements and their rating.

FIG. 26 depicts the VIEW window 26.1 of the node N19 in FIG. 20. The system may display this if node N19 is rightclicked and the VIEW option is selected from the VIEW dropdown menu, dropdown2. 26.2 shows the Head or Running Head. 26.3 shows the Declaration. This may include FIGS. and images and video. It may be intended as the declaration the node is making and establishing. 26.11 shows the node designation. 26.12 shows the rating of the node, which may be TE C False with condition NOT (T_N24). 26.13 shows the Proposed belief PB which may have been entered by a user or set to 1.0 by default because a user chose not to enter a PB, and the Belief may have been calculated as 0.0 and displayed as B. 26.4 shows there may be a comment section supported at the bottom. The comment section may be unusual in having multiple comment buttons, 26.6 Support and 26.7 Challenge. A user clicking Support may get a window to enter a supporting argument and a user clicking challenge may get a window to enter a challenge argument. 26.5 is a support argument that has been entered for the node. It has been designated S1 as first support argument. 26.8 shows a support argument that has been entered for 26.5. It has been designated S1S1 as first support argument for S1. If there was a second it may be S1S2. 26.9 shows a challenge that has been entered for 26.8 C1S1S1, the first challenge of S1S1. 26.10 shows a challenge entered to 26.9 using its challenge button 26.7. 26.10 is shown in bold because it is considered TE by 6.4 because it is Edepth0 in the comment graph, it has no challenge or argument itself. Then 26.9 is shown as not in bold because it is NOT TE according to 6.6 it has a TE challenge. Then 26.8 and 26.5 are shown in bold because they are TE according to 6.10 and 6.12 respectively because they have respectively no argument (nor TE challenge) and a TE argument (and no TE challenge).

A rebuttal may be considered invalid if it has been validly rebutted and valid if it hasn't. The system may check for and not allow construction of circular arguments, and since there are no circular arguments, the definition of validity may simply bottom out in the stipulation that a challenge or an argument that nobody has chosen to rebut is valid. Alternative grounding conditions support other definitions of validity, such as a restriction to being grounded in the peer reviewed literature It will be appreciated by those of ordinary skill in the art that further modifications to and variations of the above-described system and method of supporting inference on computers and mobile devices may be made without departing from the inventive concepts disclosed herein. Accordingly, the disclosure should not be viewed as limited except as by the scope and spirit of the appended claims.

The present technology may also be configured as below.

(1) An apparatus including:
a processing device configured to: receive first information indicating statements and arguments, and which statement of the statements is an intended result of an argument; receive second information indicating challenges to the statements or the arguments; establish a correspondence between the statements and the arguments to nodes in a graph; and rate whether a first node of the nodes is established by an argument graph using only arguments that are not validly challenged.

(2) The apparatus according to (1),
wherein the first information indicates which statement of the statements is an assumption of an argument, and wherein the processing device rates whether the first node of the nodes is established by the argument graph using only assumptions that are not validly challenged and the arguments that are not validly challenged.

(3) The apparatus according to (1) or (2),
wherein the first node is validly challenged when a challenge node exists that is established by an argument graph using only assumptions and arguments that are not validly challenged.

(4) The apparatus according to any one of (1) to (3), wherein the first node is validly challenged when a challenge node exists for the first node.

(5) The apparatus according to any one of (1) to (4),
wherein the first node is not validly challenged when every challenge to the first node is validly rebutted by a counter challenge to said challenge or an argument graph thereof.

(6) The apparatus according to any one of (1) to (5),
wherein the processing device is further configured to receive third information indicating which of the statements or the nodes is designated as a citation, and
wherein the first node is not rated as established unless the first node is a citation node or an argument for the first node exists from another node of the nodes that is rated as established.

(7) The apparatus according to any one of (1) to (6),
wherein the processing device is further configured to receive third information indicating which of the statements, nodes or edges is designated as a suggested edit, and
wherein, when a first edge of the edges is designated as the suggested edit, the first edge is not considered as an argument, assumption or challenge in rating the nodes.

(8) The apparatus according to any one of (1) to (6),
wherein the processing device is further configured to: receive third information indicating a set of choice nodes, rate at most one of each set of choice nodes as established, and rate a first choice node of the choice nodes as established, when an argument graph exists for the first choice node such that no node in an argument graph thereof is validly challenged and no argument exists for other of the choice nodes in the set of choice nodes to which the first choice node belongs.

(9) An apparatus including:
a processing device configured to: receive first information indicating nodes in a graph and directed edges, said edges indicating which first node of the nodes provides an argument for another node of the nodes, which second node of the nodes provides an assumption for another second node of the nodes, and which third node of the nodes provides a challenge to another third node of the nodes; receive second information indicating text or data associated with the nodes; rate a first edge of the edges as established when the first edge originates at an established node of the nodes; and rate a node of the nodes as established (i) in a case when each incoming assumption edge thereof is established and no incoming challenge edge is established, and (ii) in a case when at least one incoming argument edge exists, at least one of the at least one incoming argument edge exists is established.

(10) The apparatus according to (9),
wherein the nodes in the graph are rated in order of increasing EDepth, and
wherein the EDepth is a length of a longest path in said graph ending at said node corresponding thereto extending only over challenge, argument, assumption and citation edges.

(11) The apparatus according to (9) or (10),
wherein the processing device is further configured to: receive third information indicating which of the nodes is a citation nodes, and wherein a second node of the nodes is only rated as established when the second node is a citation node or has an established incoming argument edge.

(12) The apparatus according to any one of (9) to (11),
wherein the processing device is further configured to: select a node of the nodes and a statement associated therewith is designated as axiomatized, and rate other nodes of the nodes in the graph as the other nodes would be rated when an axiomatized node is established.

(13) The apparatus according to any one of (9) to (12), wherein the processing device is further configured to: select a edge of the edges and attach a challenge to or insert a node within the selected edge and attach a challenge edge to the selected edge.

(14) An apparatus including:
a processing device configured to: receive first information indicating nodes and directed edges of a graph, said edges indicating which first node of the nodes provides an argument for another node of the nodes, which second node of the nodes provides an assumption for another second node of the nodes and which third node of the nodes provides a challenge to another third node of the nodes; receive second information indicating text or data associated with the nodes; and determine a belief for each respective node estimating (i) a likelihood that each incoming assumption edge thereof is from a true node, (ii) when the node has at least one argument edge, at least one of the at least one argument edge is from a true node, and (iii) no incoming challenge edge thereof is from a true node.

(15) The apparatus according to (14),
wherein the processing device is configured to: determine which node of the nodes provides a test for a fourth node, and receive third information indicating a likelihood a result of the test implies the fourth node is true when the test node itself is true and determine a numerical belief for all of the nodes in said graph.

(16) The apparatus according to (14) or (15),
wherein the processing device is configured to: receive third information indicating a new node entered by a user selecting an existing node of the nodes, selecting an edge type and providing text or data as a declaration for said new node, connect said new node to said existing node using an edge of said edge type.

(17) The apparatus according to any one of (14) to (16),
wherein the processing device is configured to: display an indication of a reward in association with display of the graph for a successful or non-trivial challenges.

(18) A method including:
receiving, by a processing device, first information indicating statements and arguments, which statement of the statements is an intended result of an argument; receiving, by the processing device, second information indicating challenges to the statements or the arguments; establishing, by the processing device, a correspondence between the statements and the arguments to nodes in a graph; and rating, by the processing device, whether a first node of the nodes is established by an argument graph using only arguments that are not validly challenged.

(19) The method of according to (18),
wherein the first information indicates which statement of the statements is an assumption of an argument, and wherein the rating whether the first node of the nodes is established is by the argument graph using only assumptions that are not validly challenged and the arguments that are not validly challenged.

The invention claimed is:
1. A data processing apparatus comprising:
a processing device configured to:
receive, over a communication network, first information in natural language text from a user indicating statements and arguments, in which the first information indicates which statement of the statements is an intended result of a given argument;
receive, over the communication network, second information in natural language text from the user indicating challenges to the statements or the arguments;
establish a correspondence between the statements and the arguments to generate nodes in an argument graph, the nodes representing the statements, arguments, and challenges;
when a new first node is added to the argument graph based on new node information received over the communication network, rate all of the nodes in the argument graph in order of increasing EDepth to update the argument graph and send, over the communication network, the argument graph as updated,
wherein the EDepth of a given node of the nodes in the argument graph is a length of a longest path in said argument graph beginning at a node having no ancestors and ending at the given node and extending only over challenge, argument, assumption and citation edges,
wherein each first node of the nodes in the argument graph determined to have a same first EDepth is rated before each second node of the nodes which is a descendant of said first node and is determined to have a same second EDepth greater than the same first EDepth, and
wherein a node to be rated is rated as established based on status of verification of validity of an inference corresponding to the node to be rated and by determining (i) whether all challenge edges incoming to the node are not established, (ii) whether all assumption edges incoming to the node are established, and (iii) whether, when there are one or more argument edges incoming to the node, at least one argument edge incoming to the node is established; and
provide to the user the updated argument graph indicating the status of verification of validity of the inference corresponding to the rated node and whether the rated node is established.

2. The apparatus of claim 1, wherein the first information indicates which statement of the statements is an assumption of a second given argument, and wherein the processing device rates whether the node to be rated of the nodes is established by the argument graph using only assumptions that are not validly challenged and the arguments that are not validly challenged.

3. The apparatus of claim 1, wherein the node to be rated is validly challenged when a challenge node exists that is established by at least a portion of the argument graph using only assumptions and arguments in the at least a portion of the argument graph that are not validly challenged.

4. The apparatus of claim 1, wherein the node to be rated is validly challenged when a challenge node exists for the node to be rated.

5. The apparatus of claim 1, wherein the node to be rated is not validly challenged when every challenge to the node to be rated is validly rebutted by a counter challenge to said challenge or at least a portion of the argument graph corresponding thereto.

6. The apparatus of claim 1, wherein the processing device is further configured to receive third information indicating which of the statements or the nodes is designated as a citation, and wherein the node to be rated is not rated as established unless the node to be rated is a citation node or an argument for the node to be rated exists from another node of the nodes that is rated as established.

7. The apparatus of claim 1, wherein the processing device is further configured to receive third information indicating which of the statements, the nodes or edges of the argument graph is designated as a suggested edit, and wherein, when a first edge of the edges is designated as the suggested edit, the first edge is not considered as an argument, assumption or challenge in rating the nodes.

8. The apparatus of claim 1, wherein the processor is further configured to:
receive third information indicating a set of choice nodes of the argument graph, rate at most one of each set of choice nodes as established, and
rate a first choice node of the choice nodes as established, when at least a portion of the argument graph exists for the first choice node such that no node in the at least a portion of the argument graph is validly challenged and no established argument exists for other of the choice nodes in the set of choice nodes to which the first choice node belongs unless said choice node is validly challenged.

9. The apparatus of claim 1, wherein the first information indicates directed edges in the argument graph, said directed edges indicating which third node of the nodes provides an argument for another different node of the nodes, which fourth node of the nodes provides an assumption for another different second node of the nodes, and which fifth node of the nodes provides a challenge to another different third node of the nodes, wherein the second information indicates text or data associated with the nodes, and wherein the node to be rated is rated as established (i) in a case when each incoming assumption edge thereof originates at a given established node of the nodes and no incoming challenge edge originates at a given established node, and (ii) in a case when at least one incoming argument edge exists, at least one of the at least one incoming argument edge originates at a given established node of the nodes.

10. The apparatus of claim 9, wherein the processing device is further configured to receive third information indicating which of the nodes is a citation node, and wherein a sixth node of the nodes is only rated as established when the sixth node is a citation node or has an incoming argument edge originating at a given established node of the nodes.

11. The apparatus of claim 9, wherein the processing device is further configured to select a node of the nodes and a statement associated therewith to be designated as axiomatized, and rate other nodes of the nodes in the argument graph as the other nodes would be rated when the axiomatized node is rated as established.

12. The apparatus of claim 9, wherein the processing device is further configured to select an edge of the directed edges of the argument graph, attach a challenge to or insert a new node within the selected edge, and attach a challenge edge to the selected edge.

13. The apparatus of claim 1, wherein the first information indicates directed edges in the argument graph, said directed edges indicating which third node of the nodes provides an argument for another different node of the nodes, which fourth node of the nodes provides an assumption for another different second node of the nodes and which fifth node of the nodes provides a challenge to another different third node of the nodes, wherein the second information indicates text or data associated with the nodes, and wherein the processing device is configured to determine a belief as a numerical value indicating status of verifying validity of an inference for each respective node of the argument graph, based on estimating (i) a likelihood that each incoming assumption edge thereof is from a true node, (ii) when the node has at least one argument edge, at least one of the at least one argument edge is from a true node, and (iii) no incoming challenge edge thereof is from a true node.

14. The apparatus of claim 13, wherein the processing device is configured to:
determine which node of the nodes provides a test for a sixth node; and
receive third information indicating a likelihood a result of the test implies the sixth node is true when a test node itself is true.

15. The apparatus of claim 13, wherein the processing device is configured to:
receive third information indicating a new node for the argument graph entered by a user selecting an existing node of the nodes, selecting an edge type and providing text or data as a declaration for said new node; and
connect said new node to said existing node using an edge of said edge type.

16. The apparatus of claim 13, wherein the processing device is configured to display an indication of a reward in association with display of the argument graph for a successful or non-trivial challenge.

17. A method carried out by a computer comprising:
receiving, over a communication network, by a processing device, first information in natural language text from a user indicating statements and arguments, in which the first information indicates which statement of the statements is an intended result of a given argument;
receiving, over the communication network, by the processing device, second information in natural language text from the user indicating challenges to the statements or the arguments;
establishing, by the processing device, a correspondence between the statements and the arguments to generate nodes in an argument graph, the nodes representing the statements, arguments, and challenges;
when a new first node is added to the argument graph based on new node information received over the communication network, rating, by the processing device, all of the nodes in the argument graph in order of increasing EDepth to update the argument graph and sending, over the communication network, the argument graph as updated,
wherein the EDepth of a given node of the nodes in the argument graph is a length of a longest path in said argument graph beginning at a node having no ancestors and ending at the given node and extending only over challenge, argument, assumption and citation edges,
wherein each first node of the nodes in the argument graph determined to have a same first EDepth is rated before each second node of the nodes which is a descendant of said first node and is determined to have a same second EDepth greater than the same first EDepth, and
wherein a node to be rated is rated as established based on status of verification of validity of an inference corresponding to the node to be rated and by determining (i) whether all challenge edges incoming to the node are not established, (ii) whether all assumption edges incoming to the node are established, and (iii) whether, when there are one or more argument edges incoming to the node, at least one argument edge incoming to the node is established; and
providing to the user the updated argument graph indicating the status of verification of validity of the inference corresponding to the rated node and whether the rated node is established.

18. The method of claim 17, wherein the first information indicates which statement of the statements is an assumption of a second given argument, and wherein the rating whether the node to be rated of the nodes is established by the argument graph is by using only assumptions that are not validly challenged and the arguments that are not validly challenged.

* * * * *